(12) United States Patent
Ellis

(10) Patent No.: US 9,107,475 B2
(45) Date of Patent: *Aug. 18, 2015

(54) MICROPROCESSOR CONTROL OF BLADDERS IN FOOTWEAR SOLES WITH INTERNAL FLEXIBILITY SIPES

(71) Applicant: Frampton E. Ellis, Jasper, FL (US)

(72) Inventor: Frampton E. Ellis, Jasper, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,625

(22) Filed: Feb. 15, 2013

(65) Prior Publication Data

US 2013/0160322 A1     Jun. 27, 2013

Related U.S. Application Data

(63) Continuation of application No. 13/472,645, filed on May 16, 2012, now Pat. No. 8,562,678, which is a continuation of application No. 13/457,990, filed on Apr. 27, 2012, now Pat. No. 8,567,095, which is a (Continued)

(51) Int. Cl.
*A43B 17/00* (2006.01)
*A43B 19/00* (2006.01)
(Continued)

(52) U.S. Cl.
CPC ............... *A43B 13/181* (2013.01); *A42B 3/12* (2013.01); *A43B 3/0005* (2013.01); *A43B 7/144* (2013.01);
(Continued)

(58) Field of Classification Search
CPC .... A43B 7/1425; A43B 7/1435; A43B 7/144; A43B 7/1445; A43B 7/32; A43B 13/189; A43B 13/14; A43B 13/20; A43B 3/00; A43B 1/0054; A43B 3/0005
USPC ............ 36/28, 29, 103, 30 R, 35 B, 153, 154, 36/25 R, 100, 101, 88, 146, 161, 15, 31
See application file for complete search history.

(56) References Cited

U.S. PATENT DOCUMENTS

| 193,914 | A | 8/1877 | Berry |
| 280,791 | A | 7/1883 | Brooks |

(Continued)

FOREIGN PATENT DOCUMENTS

| AU | 200963 | 5/1958 |
| CA | 1138194 | 12/1982 |

(Continued)

OTHER PUBLICATIONS

European Search Report EP-05825112.5-2318 (Jul. 14, 2010).

(Continued)

*Primary Examiner* — Jila M Mohandesi
(74) *Attorney, Agent, or Firm* — Mendelsohn, Drucker & Dunleavy, P.C.

(57) ABSTRACT

A sole section adapted for use in a sole of a shoe or other footwear which includes at least a bottom sole portion. The sole section includes at least two inner bladders each of which contains a fluid, and at least a part thereof is located in a single frontal plane cross-section of the sole. The sole section also includes a duct and/or valve providing fluid communication between the inner bladders, an electronic control system including a microprocessor that controls the fluid communication and an outer bladder. The inner bladders are inside the outer bladder and separated from the outer bladder at least in part by an internal sipe formed by a portion of an inner surface of said outer bladder and a portion of an outer surface of each of said inner bladders. The surface portions of the sipe oppose each other and can slide relative to each other.

26 Claims, 66 Drawing Sheets

Related U.S. Application Data continuation of application No. 13/357,332, filed on Jan. 24, 2012, now Pat. No. 8,561,323, which is a continuation of application No. 11/802,930, filed on May 25, 2007, now Pat. No. 8,256,147, which is a continuation-in-part of application No. 11/802,033, filed on May 18, 2007, now Pat. No. 8,291,618, and a continuation-in-part of application No. 11/282,665, filed on Nov. 21, 2005, now Pat. No. 8,141,276.

(60) Provisional application No. 60/808,819, filed on May 26, 2006, provisional application No. 60/802,779, filed on May 24, 2006, provisional application No. 60/802,103, filed on May 22, 2006, provisional application No. 60/801,381, filed on May 19, 2006, provisional application No. 60/700,179, filed on Jul. 18, 2005, provisional application No. 60/679,182, filed on May 9, 2005, provisional application No. 60/677,538, filed on May 4, 2005, provisional application No. 60/672,407, filed on Apr. 18, 2005, provisional application No. 60/634,781, filed on Dec. 9, 2004, provisional application No. 60/634,782, filed on Dec. 9, 2004, provisional application No. 60/633,664, filed on Dec. 6, 2004, provisional application No. 60/629,385, filed on Nov. 22, 2004, provisional application No. 60/629,384, filed on Nov. 22, 2004, provisional application No. 60/629,523, filed on Nov. 22, 2004.

(51) Int. Cl.
| | |
|---|---|
| A43B 13/18 | (2006.01) |
| A43B 13/14 | (2006.01) |
| A43B 7/14 | (2006.01) |
| A43B 13/20 | (2006.01) |
| F16F 7/00 | (2006.01) |
| A42B 3/12 | (2006.01) |
| A43B 7/32 | (2006.01) |
| B32B 3/26 | (2006.01) |
| B32B 3/30 | (2006.01) |
| A43B 3/00 | (2006.01) |

(52) U.S. Cl.
CPC ............. *A43B 7/1425* (2013.01); *A43B 7/1435* (2013.01); *A43B 7/1445* (2013.01); *A43B 7/32* (2013.01); *A43B 13/14* (2013.01); *A43B 13/187* (2013.01); *A43B 13/189* (2013.01); *A43B 13/20* (2013.01); *B32B 3/266* (2013.01); *B32B 3/30* (2013.01); *F16F 7/00* (2013.01); *Y10T 428/24331* (2015.01); *Y10T 428/24562* (2015.01); *Y10T 428/2933* (2015.01)

(56) References Cited

U.S. PATENT DOCUMENTS

| | | | |
|---|---|---|---|
| 288,127 | A | 11/1883 | Shepard |
| 500,385 | A | 6/1893 | Hall |
| 532,429 | A | 1/1895 | Rogers |
| 584,373 | A | 6/1897 | Kuhn |
| 1,283,335 | A | 10/1918 | Shillcock |
| 1,289,106 | A | 12/1918 | Bullock |
| D55,115 | S | 5/1920 | Barney |
| 1,458,446 | A | 6/1923 | Schaeffer |
| 1,622,860 | A | 3/1927 | Cutler |
| 1,639,381 | A | 8/1927 | Manelas |
| 1,701,260 | A | 2/1929 | Fischer |
| 1,735,986 | A | 11/1929 | Wray |
| 1,853,034 | A | 4/1932 | Bradley |
| 2,004,906 | A | 6/1935 | Simister |
| 2,120,987 | A | 6/1938 | Murray |
| 2,147,197 | A | 2/1939 | Glidden |
| 2,155,166 | A | 4/1939 | Kraft |
| 2,162,912 | A | 6/1939 | Craver |
| 2,170,652 | A | 8/1939 | Brennan |
| 2,179,942 | A | 11/1939 | Lyne |
| D119,894 | S | 4/1940 | Sherman |
| 2,201,300 | A | 5/1940 | Prue |
| 2,206,860 | A | 7/1940 | Sperry |
| D122,131 | S | 8/1940 | Sannar |
| D128,817 | S | 8/1941 | Esterson |
| 2,251,468 | A | 8/1941 | Smith |
| 2,328,242 | A | 8/1943 | Witherill |
| 2,345,831 | A | 4/1944 | Pierson |
| 2,433,329 | A | 12/1947 | Adler et al. |
| 2,434,770 | A | 1/1948 | Lutey |
| 2,470,200 | A | 5/1949 | Wallach |
| 2,546,827 | A | 3/1951 | Lavinthal |
| 2,627,676 | A | 2/1953 | Hack |
| 2,718,715 | A | 9/1955 | Spilman |
| 2,762,134 | A | 9/1956 | Town |
| 2,814,133 | A | 11/1957 | Herbst |
| 3,005,272 | A | 10/1961 | Shelare et al. |
| 3,087,261 | A | 4/1963 | Russell |
| 3,100,354 | A | 8/1963 | Lombard et al. |
| 3,110,971 | A | 11/1963 | Chang |
| 3,170,250 | A | 2/1965 | Scholl |
| 3,171,133 | A | 3/1965 | Steffen |
| 3,186,004 | A | 6/1965 | Carlini |
| 3,204,678 | A | 9/1965 | Worcester |
| 3,242,500 | A | 3/1966 | Derr |
| 3,248,738 | A | 5/1966 | Morgan |
| 3,253,355 | A | 5/1966 | Menkin |
| 3,305,947 | A | 2/1967 | Kalsoy |
| 3,308,560 | A | 3/1967 | Jones |
| 3,407,406 | A | 10/1968 | Werner et al. |
| 3,416,174 | A | 12/1968 | Novitske |
| 3,469,576 | A | 9/1969 | Everts et al. |
| 3,512,274 | A | 5/1970 | McGrath |
| 3,535,799 | A | 10/1970 | Onituska |
| 3,600,714 | A | 8/1971 | Cade et al. |
| 3,806,950 | A | 4/1974 | Spencer-Foote |
| 3,806,974 | A | 4/1974 | Di Paolo |
| 3,824,716 | A | 7/1974 | DiPaolo |
| 3,834,046 | A | 9/1974 | Fowler |
| 3,849,801 | A | 11/1974 | Holt et al. |
| 3,863,366 | A | 2/1975 | Auberry et al. |
| 3,872,511 | A | 3/1975 | Nichols |
| 3,958,291 | A | 5/1976 | Spier |
| 3,964,181 | A | 6/1976 | Holcombe, Jr. |
| 3,995,320 | A | 12/1976 | Zafuto |
| 3,997,984 | A | 12/1976 | Hayward |
| 4,003,145 | A | 1/1977 | Liebscher et al. |
| 4,023,213 | A | 5/1977 | Rovani |
| 4,030,213 | A | 6/1977 | Daswick |
| 4,035,846 | A | 7/1977 | Jencks |
| 4,043,058 | A | 8/1977 | Hollister et al. |
| 4,059,910 | A | 11/1977 | Bryden |
| 4,060,855 | A | 12/1977 | Rappleyea |
| 4,064,565 | A | 12/1977 | Griffiths |
| 4,067,063 | A | 1/1978 | Ettinger |
| 4,068,395 | A | 1/1978 | Senter |
| 4,083,125 | A | 4/1978 | Benseler et al. |
| 4,096,649 | A | 6/1978 | Saurwein |
| 4,098,011 | A | 7/1978 | Bowerman et al. |
| 4,128,950 | A | 12/1978 | Bowerman et al. |
| 4,128,951 | A | 12/1978 | Tansill |
| 4,141,158 | A | 2/1979 | Benseler et al. |
| 4,145,785 | A | 3/1979 | Lacey |
| 4,149,324 | A | 4/1979 | Lesser et al. |
| 4,161,828 | A | 7/1979 | Benseler et al. |
| 4,161,829 | A | 7/1979 | Wayser |
| 4,170,078 | A | 10/1979 | Moss |
| 4,172,495 | A | 10/1979 | Zebuhr et al. |
| 4,183,156 | A | 1/1980 | Rudy |
| 4,194,310 | A | 3/1980 | Bowerman |
| 4,205,401 | A | 6/1980 | Frisch |
| D256,180 | S | 8/1980 | Turner |
| D256,400 | S | 8/1980 | Famolare, Jr. |
| 4,217,705 | A | 8/1980 | Donzis |
| 4,219,945 | A | 9/1980 | Rudy |

(56) References Cited

U.S. PATENT DOCUMENTS

| | | |
|---|---|---|
| 4,223,457 A | 9/1980 | Borgeas |
| 4,227,320 A | 10/1980 | Borgeas |
| 4,235,026 A | 11/1980 | Plagenhoef |
| 4,237,627 A | 12/1980 | Turner |
| 4,240,214 A | 12/1980 | Sigle et al. |
| 4,241,523 A | 12/1980 | Daswick |
| 4,245,406 A | 1/1981 | Landay |
| 4,250,638 A | 2/1981 | Linnemann |
| 4,258,480 A | 3/1981 | Famolare, Jr. |
| 4,259,792 A | 4/1981 | Halberstadt |
| 4,262,433 A | 4/1981 | Hagg et al. |
| 4,263,728 A | 4/1981 | Frecentese |
| 4,266,349 A | 5/1981 | Schmohl |
| 4,268,980 A | 5/1981 | Gudas |
| 4,271,606 A | 6/1981 | Rudy |
| 4,272,858 A | 6/1981 | Hlustik |
| 4,274,211 A | 6/1981 | Funck |
| 4,297,797 A | 11/1981 | Meyers |
| 4,302,892 A | 12/1981 | Adamik |
| 4,305,212 A | 12/1981 | Coomer |
| 4,308,671 A | 1/1982 | Bretschneider |
| 4,309,832 A | 1/1982 | Hunt |
| 4,316,332 A | 2/1982 | Giese et al. |
| 4,316,335 A | 2/1982 | Giese et al. |
| 4,319,412 A | 3/1982 | Muller et al. |
| D264,017 S | 4/1982 | Turner |
| 4,322,895 A | 4/1982 | Hockerson |
| D265,019 S | 6/1982 | Vermonet |
| 4,335,529 A | 6/1982 | Badalamenti |
| 4,340,626 A | 7/1982 | Rudy |
| 4,342,161 A | 8/1982 | Schmohl |
| 4,345,338 A | 8/1982 | Frieder, Jr. et al. |
| 4,348,821 A | 9/1982 | Daswick |
| 4,354,284 A | 10/1982 | Gooding |
| 4,354,319 A | 10/1982 | Block et al. |
| 4,361,971 A | 12/1982 | Bowerman |
| 4,366,634 A | 1/1983 | Giese et al. |
| 4,370,817 A | 2/1983 | Ratanangsu |
| 4,372,059 A | 2/1983 | Ambrose |
| 4,375,108 A | 3/1983 | Gooding |
| 4,398,357 A | 8/1983 | Batra |
| 4,399,620 A | 8/1983 | Funck |
| D272,294 S | 1/1984 | Watanabe |
| 4,432,099 A | 2/1984 | Grick et al. |
| 4,449,306 A | 5/1984 | Cavanagh |
| 4,451,994 A | 6/1984 | Fowler |
| 4,454,662 A | 6/1984 | Stubblefield |
| 4,455,765 A | 6/1984 | Sjöswärd |
| 4,455,767 A | 6/1984 | Bergmans |
| 4,468,870 A | 9/1984 | Sternberg |
| 4,484,364 A | 11/1984 | Mitchell et al. |
| 4,484,397 A | 11/1984 | Curley, Jr. |
| 4,494,321 A | 1/1985 | Lawlor |
| 4,505,055 A | 3/1985 | Bergmans |
| 4,506,462 A | 3/1985 | Cavanagh |
| 4,521,979 A | 6/1985 | Blaser |
| 4,527,345 A | 7/1985 | Lopez |
| D280,568 S | 9/1985 | Stubblefield |
| 4,538,301 A | 9/1985 | Sawatzki et al. |
| 4,542,598 A | 9/1985 | Misevich et al. |
| 4,546,559 A | 10/1985 | Dassler |
| 4,547,979 A | 10/1985 | Harada |
| 4,557,059 A | 12/1985 | Misevich et al. |
| 4,559,723 A | 12/1985 | Hamy et al. |
| 4,559,724 A | 12/1985 | Norton |
| 4,561,195 A | 12/1985 | Onoda et al. |
| 4,570,362 A | 2/1986 | Vermonet |
| 4,577,417 A | 3/1986 | Cole |
| 4,578,882 A | 4/1986 | Talarico, II |
| 4,580,359 A | 4/1986 | Kurrash et al. |
| 4,624,061 A | 11/1986 | Wezel et al. |
| 4,624,062 A | 11/1986 | Autry et al. |
| 4,638,577 A | 1/1987 | Riggs |
| 4,641,438 A | 2/1987 | Laird et al. |
| 4,642,917 A | 2/1987 | Ungar |
| 4,650,487 A | 3/1987 | Chaglassian |
| 4,651,445 A | 3/1987 | Hannibal |
| D289,341 S | 4/1987 | Turner |
| 4,654,983 A | 4/1987 | Graham |
| 4,658,515 A | 4/1987 | Oatman |
| 4,667,423 A | 5/1987 | Autry |
| 4,670,995 A | 6/1987 | Huang |
| 4,676,010 A | 6/1987 | Cheskin |
| 4,694,591 A | 9/1987 | Banich et al. |
| 4,697,361 A | 10/1987 | Ganter et al. |
| D293,275 S | 12/1987 | Bua |
| 4,715,133 A | 12/1987 | Hartjes et al. |
| 4,724,622 A | 2/1988 | Mills |
| D294,425 S | 3/1988 | Le |
| 4,727,660 A | 3/1988 | Bernhard |
| 4,730,402 A | 3/1988 | Norton et al. |
| 4,731,939 A | 3/1988 | Parracho et al. |
| 4,747,220 A | 5/1988 | Autry et al. |
| D296,149 S | 6/1988 | Diaz |
| D296,152 S | 6/1988 | Selbiger |
| 4,748,753 A | 6/1988 | Ju |
| 4,754,561 A | 7/1988 | DuFour |
| 4,756,098 A | 7/1988 | Boggia |
| 4,757,620 A | 7/1988 | Tiitola |
| 4,759,136 A | 7/1988 | Stewart et al. |
| 4,768,295 A | 9/1988 | Ito |
| 4,769,926 A | 9/1988 | Meyers |
| 4,772,407 A | 9/1988 | Carlson |
| 4,777,738 A | 10/1988 | Giese |
| D298,684 S | 11/1988 | Pitchford |
| 4,783,910 A | 11/1988 | Boys |
| 4,784,462 A | 11/1988 | Priaroggia |
| 4,785,557 A | 11/1988 | Kelley et al. |
| 4,790,848 A | 12/1988 | Cronin |
| 4,802,289 A | 2/1989 | Guldager |
| 4,817,304 A | 4/1989 | Parker et al. |
| 4,827,631 A | 5/1989 | Thornton |
| 4,833,795 A | 5/1989 | Diaz |
| 4,837,949 A | 6/1989 | Dufour |
| D302,900 S | 8/1989 | Kolman et al. |
| 4,853,980 A | 8/1989 | Zarotti |
| 4,854,057 A | 8/1989 | Misevich et al. |
| 4,858,340 A | 8/1989 | Pasternak |
| 4,864,737 A | 9/1989 | Marrello |
| 4,864,738 A | 9/1989 | Horovitz |
| 4,866,861 A | 9/1989 | Noone |
| 4,876,807 A | 10/1989 | Tiitola et al. |
| 4,890,398 A | 1/1990 | Thomasson |
| 4,894,932 A | 1/1990 | Harada et al. |
| 4,894,933 A | 1/1990 | Tonkel et al. |
| 4,897,936 A | 2/1990 | Fuerst |
| 4,906,502 A | 3/1990 | Rudy |
| 4,922,631 A | 5/1990 | Anderie |
| 4,923,057 A | 5/1990 | Carlson et al. |
| 4,934,070 A | 6/1990 | Mauger |
| 4,934,073 A | 6/1990 | Robinson |
| D310,131 S | 8/1990 | Hase |
| D310,132 S | 8/1990 | Hase |
| 4,947,560 A | 8/1990 | Fuerst et al. |
| 4,949,476 A | 8/1990 | Anderie |
| D310,906 S | 10/1990 | Hase |
| 4,972,527 A | 11/1990 | Wallace |
| 4,979,794 A | 12/1990 | Evans |
| 4,982,737 A | 1/1991 | Guttmann |
| 4,989,349 A | 2/1991 | Ellis, III |
| D315,634 S | 3/1991 | Yung-Mao |
| 5,010,662 A | 4/1991 | Dabuzhsky et al. |
| 5,012,597 A | 5/1991 | Thomasson |
| 5,014,365 A | 5/1991 | Schulz |
| 5,014,449 A | 5/1991 | Richard et al. |
| 5,024,007 A | 6/1991 | DuFour |
| 5,025,573 A | 6/1991 | Giese et al. |
| 5,027,864 A | 7/1991 | Conti et al. |
| 5,048,203 A | 9/1991 | Kling |
| D320,302 S | 10/1991 | Kiyosawa |
| 2,052,130 A | 10/1991 | Barry et al. |
| 5,052,130 A | 10/1991 | Barry |
| 5,077,916 A | 1/1992 | Beneteau |
| 5,079,856 A | 1/1992 | Truelsen |

(56) References Cited

U.S. PATENT DOCUMENTS

| | | |
|---|---|---|
| 5,083,320 A | 1/1992 | Halstead |
| 5,092,060 A | 3/1992 | Frachey et al. |
| 5,095,545 A | 3/1992 | Lane |
| D327,164 S | 6/1992 | Hatfield |
| D327,165 S | 6/1992 | Hatfield |
| 5,131,173 A | 7/1992 | Anderie |
| D328,968 S | 9/1992 | Tinker |
| D329,528 S | 9/1992 | Hatfield |
| D329,739 S | 9/1992 | Hatfield |
| 5,153,945 A | 10/1992 | Kobayashi et al. |
| D330,972 S | 11/1992 | Hatfield et al. |
| D332,344 S | 1/1993 | Hatfield et al. |
| D332,692 S | 1/1993 | Hatfield et al. |
| 5,175,889 A | 1/1993 | Infusino |
| 5,191,727 A | 3/1993 | Barry et al. |
| 5,204,998 A | 4/1993 | Liu |
| 5,224,280 A | 7/1993 | Preman et al. |
| 5,224,810 A | 7/1993 | Pitkin |
| 5,237,758 A | 8/1993 | Zachman |
| 5,247,742 A | 9/1993 | Kilgore et al. |
| 5,259,070 A | 11/1993 | De Roza |
| 5,259,071 A | 11/1993 | Scott et al. |
| 5,263,203 A | 11/1993 | Kraemer et al. |
| D345,249 S | 3/1994 | Sell, Jr. |
| 5,294,360 A | 3/1994 | Carlson et al. |
| 5,306,438 A | 4/1994 | Carlson et al. |
| D347,105 S | 5/1994 | Johnson |
| 5,317,819 A | 6/1994 | Ellis, III |
| 5,343,639 A | 9/1994 | Kilgore et al. |
| 5,353,459 A | 10/1994 | Potter |
| 5,353,523 A | 10/1994 | Kilgore |
| 5,361,410 A | 11/1994 | Sigl |
| 5,369,896 A | 12/1994 | Frachey et al. |
| 5,382,373 A | 1/1995 | Carlson et al. |
| 5,383,929 A | 1/1995 | Ledergerber |
| 5,462,781 A | 10/1995 | Zukowski |
| 5,496,367 A | 3/1996 | Fisher |
| 5,496,370 A | 3/1996 | Hamas |
| D372,114 S | 7/1996 | Turner et al. |
| 5,539,934 A | 7/1996 | Ponder |
| 5,543,194 A | 8/1996 | Rudy |
| 5,544,429 A | 8/1996 | Ellis, III |
| 5,555,584 A | 9/1996 | Moore, III et al. |
| 5,572,805 A | 11/1996 | Giese et al. |
| 5,635,755 A | 6/1997 | Kinghorn |
| 5,653,755 A | 8/1997 | Ledergerber |
| 5,675,844 A | 10/1997 | Guyton et al. |
| 5,678,327 A | 10/1997 | Halberstadt |
| D388,594 S | 1/1998 | Turner et al. |
| 5,751,881 A | 5/1998 | Konda et al. |
| 5,813,141 A | 9/1998 | Cho |
| 5,813,142 A | 9/1998 | Demon |
| 5,823,852 A | 10/1998 | Chu |
| 5,846,063 A | 12/1998 | Lakic |
| D409,362 S | 5/1999 | Turner et al. |
| D409,826 S | 5/1999 | Turner et al. |
| D410,138 S | 5/1999 | Turner et al. |
| 5,909,948 A | 6/1999 | Ellis, III |
| 5,913,412 A | 6/1999 | Huber et al. |
| 5,930,918 A | 8/1999 | Healy et al. |
| 5,933,984 A | 8/1999 | Carlson et al. |
| 5,947,238 A | 9/1999 | Jolly et al. |
| 5,956,777 A | 9/1999 | Popovich |
| 5,976,451 A | 11/1999 | Skaja et al. |
| 5,979,078 A | 11/1999 | McLaughlin |
| 5,987,781 A | 11/1999 | Pavesi et al. |
| 6,023,857 A | 2/2000 | Vizy et al. |
| 6,073,271 A | 6/2000 | Alexander et al. |
| 6,095,486 A | 8/2000 | Ivers et al. |
| 6,098,209 A | 8/2000 | Bainbridge et al. |
| 6,115,941 A | 9/2000 | Ellis, III |
| 6,115,945 A | 9/2000 | Ellis, III |
| 6,158,910 A | 12/2000 | Jolly et al. |
| 6,163,982 A | 12/2000 | Ellis, III |
| 6,178,560 B1 | 1/2001 | Halstead et al. |
| 6,187,043 B1 | 2/2001 | Ledergerber |
| 6,226,801 B1 | 5/2001 | Alexander et al. |
| D444,293 S | 7/2001 | Turner et al. |
| 6,253,466 B1 | 7/2001 | Harmon-Weiss et al. |
| 6,308,439 B1 | 10/2001 | Ellis |
| 6,308,813 B1 | 10/2001 | Carlson |
| D450,916 S | 11/2001 | Turner et al. |
| 6,314,662 B1 | 11/2001 | Ellis |
| 6,351,853 B1 | 3/2002 | Halstead et al. |
| 6,360,453 B1 | 3/2002 | Ellis |
| 6,360,457 B1 | 3/2002 | Qui et al. |
| 6,391,405 B1 | 5/2002 | Bonk et al. |
| 6,446,271 B1 | 9/2002 | Ho |
| 6,457,261 B1 | 10/2002 | Crary |
| 6,487,795 B1 | 12/2002 | Ellis |
| 6,493,881 B1 | 12/2002 | Picotte |
| 6,519,780 B2 | 2/2003 | Goodwin |
| 6,530,092 B2 | 3/2003 | Pope |
| 6,537,639 B1 | 3/2003 | Huang |
| 6,571,490 B2 | 6/2003 | Tawney et al. |
| 6,584,706 B1 | 7/2003 | Ellis |
| 6,591,428 B2 | 7/2003 | Halstead et al. |
| 6,591,429 B1 | 7/2003 | Jaszai |
| 6,591,519 B1 | 7/2003 | Ellis |
| 6,629,376 B1 | 10/2003 | Ellis |
| 6,658,671 B1 | 12/2003 | Von Holst et al. |
| 6,662,470 B2 | 12/2003 | Ellis |
| 6,668,470 B2 | 12/2003 | Ellis |
| 6,675,498 B1 | 1/2004 | Ellis |
| 6,675,499 B2 | 1/2004 | Ellis |
| 6,681,408 B2 | 1/2004 | Ku |
| 6,708,424 B1 | 3/2004 | Ellis |
| 6,722,058 B2 | 4/2004 | Lucas et al. |
| 6,729,046 B2 | 5/2004 | Ellis |
| 6,789,331 B1 | 9/2004 | Ellis |
| 6,795,625 B1 | 9/2004 | Ishii et al. |
| 6,810,606 B1 | 11/2004 | Ellis, III |
| D500,585 S | 1/2005 | Wahoske et al. |
| 6,837,951 B2 | 1/2005 | Rapaport |
| 6,845,573 B2 | 1/2005 | Litchfield et al. |
| 6,846,534 B2 | 1/2005 | Bonk et al. |
| 6,848,200 B1 | 2/2005 | Westin |
| 6,851,204 B2 | 2/2005 | Aveni et al. |
| 6,865,825 B2 | 3/2005 | Bailey, Sr. et al. |
| 6,918,197 B2 | 7/2005 | Ellis |
| 6,946,050 B2 | 9/2005 | Dojan et al. |
| 6,957,000 B2 | 10/2005 | McAlpine et al. |
| 6,971,193 B1 | 12/2005 | Potter et al. |
| 6,976,321 B1 | 12/2005 | Lakic |
| 6,990,755 B2 | 1/2006 | Hatfield et al. |
| 7,037,571 B2 | 5/2006 | Fish et al. |
| 7,076,890 B2 | 7/2006 | Grove et al. |
| 7,086,179 B2 | 8/2006 | Dojan et al. |
| 7,093,379 B2 | 8/2006 | Ellis |
| 7,123,801 B2 | 10/2006 | Fitz |
| 7,127,834 B2 | 10/2006 | Ellis |
| 7,132,032 B2 | 11/2006 | Tawney et al. |
| 7,140,129 B2 | 11/2006 | Newson et al. |
| 7,168,185 B2 | 1/2007 | Ellis |
| 7,168,188 B2 | 1/2007 | Auger et al. |
| 7,174,658 B2 | 2/2007 | Ellis |
| 7,194,826 B2 | 3/2007 | Ungari |
| 7,219,449 B1 | 5/2007 | Hoffberg et al. |
| 7,254,908 B2 | 8/2007 | Ungari |
| 7,264,908 B2 | 9/2007 | Kaneko et al. |
| 7,334,349 B2 | 2/2008 | Sokolowski et al. |
| 7,484,318 B2 | 2/2009 | Finkelstein |
| 7,591,084 B2 | 9/2009 | Santa Ana |
| 7,676,960 B2 | 3/2010 | DiBenedetto et al. |
| 7,805,756 B2 | 9/2010 | Ellis |
| 7,985,265 B2 | 7/2011 | Moser et al. |
| 8,080,057 B2 | 12/2011 | Kronowitz |
| 8,125,796 B2 | 2/2012 | Ellis |
| 8,141,276 B2 | 3/2012 | Ellis |
| 8,164,170 B2 | 4/2012 | Ellis |
| 8,203,196 B2 | 6/2012 | Lim |
| 8,205,356 B2 | 6/2012 | Ellis |
| 8,256,028 B1 | 9/2012 | Ibon et al. |
| 8,256,147 B2 | 9/2012 | Ellis |

(56) References Cited

U.S. PATENT DOCUMENTS

| | | |
|---|---|---|
| 8,291,485 B2 | 10/2012 | Ellis |
| 8,291,618 B2 | 10/2012 | Ellis |
| 8,312,529 B2 | 11/2012 | Ellis |
| 8,332,924 B2 | 12/2012 | Ellis |
| 8,468,722 B2 | 6/2013 | Battlogg et al. |
| 8,561,323 B2 | 10/2013 | Ellis |
| 2001/0032351 A1 | 10/2001 | Nakayama et al. |
| 2002/0002730 A1 | 1/2002 | Dennis et al. |
| 2002/0023291 A1 | 2/2002 | Mendoza |
| 2002/0034598 A1 | 3/2002 | Bonk et al. |
| 2002/0152541 A1 | 10/2002 | Halstead et al. |
| 2002/0152542 A1 | 10/2002 | Dennis et al. |
| 2002/0166157 A1 | 11/2002 | Pope |
| 2003/0046830 A1 | 3/2003 | Ellis, III |
| 2003/0079276 A1 | 5/2003 | Forsyth et al. |
| 2003/0096899 A1 | 5/2003 | Pearce |
| 2003/0200598 A1 | 10/2003 | Jessie |
| 2004/0002665 A1 | 1/2004 | Parihar et al. |
| 2004/0226077 A1 | 11/2004 | Toth |
| 2005/0039346 A1 | 2/2005 | Thomas et al. |
| 2005/0076536 A1 | 4/2005 | Hatfield et al. |
| 2005/0144808 A1 | 7/2005 | Vito et al. |
| 2005/0246824 A1 | 11/2005 | Berger et al. |
| 2005/0262739 A1 | 12/2005 | McDonald et al. |
| 2006/0010717 A1 | 1/2006 | Finkelstein |
| 2006/0137221 A1 | 6/2006 | Dojan et al. |
| 2006/0179683 A1 | 8/2006 | Weiss et al. |
| 2006/0230636 A1 | 10/2006 | Kokstis et al. |
| 2006/0248749 A1 | 11/2006 | Ellis |
| 2006/0248750 A1 | 11/2006 | Rosenberg |
| 2007/0084081 A1 | 4/2007 | Fallon |
| 2007/0094896 A1 | 5/2007 | Hatfield et al. |
| 2008/0083140 A1 | 4/2008 | Ellis |
| 2008/0229614 A1 | 9/2008 | Santa Ana |
| 2008/0313791 A1 | 12/2008 | Nagely |
| 2009/0200661 A1 | 8/2009 | Ellis |
| 2009/0210056 A1 | 8/2009 | Forsell |
| 2010/0114311 A1 | 5/2010 | Becker |
| 2011/0175744 A1 | 7/2011 | Englert et al. |
| 2012/0174434 A1 | 7/2012 | Ellis |
| 2012/0186003 A1 | 7/2012 | Heger et al. |
| 2012/0210603 A1 | 8/2012 | Ellis |
| 2012/0224819 A1 | 9/2012 | Ellis |
| 2012/0226353 A1 | 9/2012 | Ellis |
| 2013/0205480 A1 | 8/2013 | Nagely et al. |
| 2013/0296755 A1 | 11/2013 | Duncan et al. |
| 2014/0109299 A1 | 4/2014 | Kwan et al. |
| 2014/0109304 A1 | 4/2014 | Kwan et al. |
| 2014/0250726 A1 | 9/2014 | Meschter |

FOREIGN PATENT DOCUMENTS

| | | |
|---|---|---|
| CA | 1176458 | 10/1984 |
| DE | 23257 | 5/1956 |
| DE | 1888119 | 12/1963 |
| DE | 1918131 | 6/1965 |
| DE | 1918132 | 6/1965 |
| DE | 1287477 | 1/1969 |
| DE | 1290844 | 3/1969 |
| DE | 2036062 | 7/1970 |
| DE | 1948620 | 5/1971 |
| DE | 1685293 | 7/1971 |
| DE | 1685260 | 10/1971 |
| DE | 2045430 | 3/1972 |
| DE | 2522127 | 11/1976 |
| DE | 2525613 | 12/1976 |
| DE | 2602310 | 7/1977 |
| DE | 2613312 | 10/1977 |
| DE | 2706645 | 8/1978 |
| DE | 2654116 | 1/1979 |
| DE | 2737765 | 3/1979 |
| DE | 2805426 | 8/1979 |
| DE | 3021936 | 4/1981 |
| DE | 3024587 A1 | 1/1982 |
| DE | 8219616.8 | 9/1982 |
| DE | 3113295 | 10/1982 |
| DE | 3245182 | 5/1983 |
| DE | 3317462 | 10/1983 |
| DE | 8431831.7 | 12/1984 |
| DE | 3347343 | 7/1985 |
| DE | 8530136.1 | 2/1988 |
| DE | 3629245 | 3/1988 |
| EP | 0048965 | 4/1982 |
| EP | 0083449 A1 | 12/1982 |
| EP | 0130816 | 1/1985 |
| EP | 0185781 | 7/1986 |
| EP | 0207063 | 10/1986 |
| EP | 0206511 | 12/1986 |
| EP | 0213257 | 3/1987 |
| EP | 0215974 | 4/1987 |
| EP | 0238995 | 9/1987 |
| EP | 0260777 | 3/1988 |
| EP | 0301331 | 2/1989 |
| EP | 0329391 | 8/1989 |
| EP | 0410087 | 1/1991 |
| EP | 0697825 | 2/1996 |
| EP | 0910964 | 4/1999 |
| EP | 1068460 | 1/2001 |
| EP | 1374808 | 1/2004 |
| EP | 1414322 | 5/2004 |
| EP | 1480534 | 12/2004 |
| EP | 1529457 | 5/2005 |
| FR | 602501 | 3/1926 |
| FR | 925961 | 9/1947 |
| FR | 1004472 | 3/1952 |
| FR | 1245672 | 10/1960 |
| FR | 1323455 | 2/1963 |
| FR | 2006270 | 11/1972 |
| FR | 2261721 | 9/1975 |
| FR | 2511850 | 3/1983 |
| FR | 2622411 | 5/1989 |
| GB | 9591 | 0/1913 |
| GB | 16143 | 0/1892 |
| GB | 764956 | 1/1957 |
| GB | 792034 | 3/1958 |
| GB | 807305 | 1/1959 |
| GB | 1504615 | 3/1978 |
| GB | 2 023 405 | 1/1980 |
| GB | 2 039 717 | 8/1980 |
| GB | 2076633 | 12/1981 |
| GB | 2133668 | 8/1984 |
| GB | 2 136 670 | 9/1984 |
| JP | 39-15597 | 8/1964 |
| JP | 45-5154 | 3/1970 |
| JP | 50-71132 | 11/1975 |
| JP | 57-139333 | 8/1982 |
| JP | 59-23525 | 7/1984 |
| JP | 61-55810 | 4/1986 |
| JP | 1129505 | 6/1986 |
| JP | 61-167810 | 10/1986 |
| JP | 1-195803 | 8/1989 |
| JP | 2136505 | 5/1990 |
| JP | 2279103 | 11/1990 |
| JP | 3-85102 | 4/1991 |
| JP | 3086101 | 4/1991 |
| JP | 4-279102 | 10/1992 |
| JP | 5-123204 | 5/1993 |
| NZ | 189890 | 9/1981 |
| WO | WO 87/07480 | 12/1987 |
| WO | WO 87/07481 | 12/1987 |
| WO | WO 88/08263 | 11/1988 |
| WO | WO 89/06500 | 7/1989 |
| WO | WO 90/00358 | 1/1990 |
| WO | WO 91/00698 | 1/1991 |
| WO | WO 91/03180 | 3/1991 |
| WO | WO 91/04683 | 4/1991 |
| WO | WO 91/05491 | 5/1991 |
| WO | WO 91/10377 | 7/1991 |
| WO | WO 91/11124 | 8/1991 |
| WO | WO 91/11924 | 8/1991 |
| WO | WO 91/19429 | 12/1991 |
| WO | WO 92/07483 | 5/1992 |
| WO | WO 92/18024 | 10/1992 |

(56) References Cited

FOREIGN PATENT DOCUMENTS

| | | |
|---|---|---|
| WO | WO 93/13928 | 7/1993 |
| WO | WO 94/03080 | 2/1994 |
| WO | WO9614768 | 5/1996 |
| WO | WO 97/00029 | 1/1997 |
| WO | WO 00/54616 | 9/2000 |
| WO | WO 00/64293 | 11/2000 |
| WO | WO 00/70981 | 11/2000 |
| WO | WO 01/80678 | 11/2001 |
| WO | WO 02/09547 | 2/2002 |
| WO | WO 2005/115190 | 12/2005 |
| WO | WO 2005/117628 | 12/2005 |
| WO | WO 2005/117629 | 12/2005 |
| WO | WO2006058013 A2 | 6/2006 |
| WO | WO 2006/113212 | 10/2006 |
| WO | WO 2006/124116 | 11/2006 |
| WO | WO 2007/024523 | 3/2007 |
| WO | WO2008013594 A2 | 1/2008 |

OTHER PUBLICATIONS

Examiner's Comments, European Search Report EP-05825112.5-2318 (Jul. 14, 2010).
Adidas Catalog 1986.
Adidas Catalog 1988.
Adidas Catalog 1989.
Adidas Catalog 1990.
Adidas Catalog 1991.
Adidas Catalog, Spring 1987.
Adidas' Second Supplemental Responses to Interrogatory No. 1.
Adidas shoe, Model "Buffalo" 1985.
Adidas shoe, Model "London", 1986.
Adidas shoe, Model "Marathon 86" 1985.
Adidas shoe, Model "Skin Racer", 1988.
Adidas shoe, Model "Tokio H" 1985.
Adidas shoe, Model "Torsion Grand Slam Indoor," 1989.
Adidas shoe, Model <<Boston Super>> 1985.
Adidas shoe, Model <<Fire>> 1985.
Adidas shoe, Model <<Indoor Pro>> 1987.
Adidas shoe, Model <<Kingscup Indoor>>, 1986.
Adidas shoe, Model <<Marathon>> 1986.
Adidas shoe, Model <<Questar>>, 1986.
Adidas shoe, Model <<Tauern>> 1986.
Adidas shoe, Model <<Tennis Comfort>>, 1988.
Adidas shoe, Model <<Torsion Special HI>> 1989.
Adidas shoe, Model <<Torsion ZX9020S>> 1989.
Adidas shoe, Model <<Water Competition>> 1980.
Adidas shoe, Model, <<Indoor Pro>> 1987.
Adidas Spring Catalog 1989.
Areblad et al. <<Three-Dimensional Measurement of Rearfoot Motion During Running>> *Journal of Biomechanics*, vol. 23, vol. 9, pp. 933-940 (1990).
Avia Catalog 1986.
Avia Fall Catalog, 1988.
Brooks Catalog 1986.
Cavanagh et al., "Biomechanics of Distance Running," Human Kinetics Books, pp. 155-164, 1990.
Clark Shoe Designed by Sven Coomer 1991.
Fineagan, "Comparison of the Effects of a Running Shoe and A Racing Flat on the Lower Extremity Biochemical Alignment of Runners," *Journal of the American Physical Therapy Association*, vol. 68, No. 5, p. 806 (1988).
Fixx, *The Complete Book of Running*, pp. 134-137, 1977.
Footwear Journal, Nike Advertisement, Aug. 1987.
Footwear News, vol. 44, No. 37, Nike Advertisement (1988).
Footwear News, Special Supplement, Feb. 8, 1988.
Footwear News, Vol, 45, No. 5, Nike Advertisement 1989.
Frederick, *Sports Shoes and Playing Surfaces, Biomechanical Properties*, Entire Book, 1984.
Johnson et al., <<A Biomechanical Approach to the Design of Football Boots>>, *Journal of Biomechanics*, vol. 9, pp. 581-585 (1976).

Komi et al., "Interaction Between Man and Shoe in Running: Considerations for More Comprehensive Measurement Approach," *International Journal of Sports Medicine*, vol. 8, pp. 196-202 1987.
Kronos Catalog, 1988.
K-Swiss Catalog, Fall 1991.
Leuthi et al., <<Influence of Shoe Construction on Lower Extremity Kinematics and Load During Lateral Movements in Tennis>>, *International Journal of Sport Biomechanics*, vol. 2, pp. 166-174, 1986.
Nawoczenski et al., <<Effect of Rocker Sole Design on Plantar Forefoot Pressures>> *Journal of the American Podiatric Medical Association*, vol. 79, No. 9, pp. 455-460, 1988.
Nigg et al., "Biomechanical Aspects of Sport Shoes and Playing Surfaces," Proceedings of the International Symposium on Biomechanical Aspects of Sport Shoes and Playing Surfaces, 1983.
Nigg et al., "Influence of Heel Flare and Midsole Constructions on Pronation" *International Journal of Sport Biomechanics*, vol. 4, No. 3, pp. 205-219 (1987).
Nigg et al., <<The Influence of Lateral Heel Flare of Running Shoes on Pronation and Impact Forces>>, *Medicine and Science in Sports and Exercise*, vol. 19, No. 3, pp. 294-302, 1987.
Nigg et al., *Biomechanics of Running Shoes*, entire book, 1986.
Nigg, <<Biomechanical Analysis of Ankle and foot Movement>> *Medicine and Sport Science*, vol. 23, pp. 22-29 1987.
Nike Catalog, Footwear Fall, 1988.
Nike Fall Catalog 1987, pp. 50-51.
Nike Shoe, men's cross-training Model "Air Trainer SC" 1989.
Nike shoe, men's cross-training Model <<Air Trainer TW>> 1989.
Nike shoe, Model "Air Force" #1978, 1988.
Nike shoe, Model "Air" #1553, 1988.
Nike shoe, Model <<Air Flow>> #718, 1988.
Nike shoe, Model <<Air Revolution>> #15075, 1988.
Nike shoe, Model <<Air>>, #13213, 1988.
Nike shoe, Model <<Air>>, #4183, 1988.
Nike shoe, Model <<High Jump 88>>, 1988.
Nike shoe, Model <<Leather Cortex®>>, 1988.
Nike shoe, Model <<Zoom Street Leather>> 1988.
Nike Spring Catalog 1989 pp. 62-63.
Palamarchuk et al., "In shoe Casting Technique for Specialized Sport Shoes," *Journal of the American Podiatric Medical Association*, vol. 79, No. 9, pp. 462-465, 1989.
Prince Cross-Sport 1989.
Puma basketball shoe, *The Complete Handbook of Athletic Footwear*, pp. 315, 1987.
Romika Catalog, Summer 1978.
Runner's World, "Shoe Review" Nov. 1988 pp. 46-74.
Runner's World, "Spring Shoe Survey," pp. 45-74, 1989.
Runner's World, Apr. 1988.
Runner's World, Oct. 1986.
Saucony Spot-bilt Catalog 1988.
Saucony Spot-bilt Catalog Supplement, Spring 1985.
Saucony Spot-bilt shoe, *The Complete Handbook of Athletic Footwear*, pp. 332,1987.
Segesser et al., "Surfing Shoe," *The Shoe in Sport*, 1989, (Translation of a book published in Germany in 1987), pp. 106-110.
Sporting Goods Business, Aug. 1987.
Sports Illustrated, Nike Advertisement, Aug. 8, 1988.
Sports Illustrated, Special Preview Issue, The Summer Olympics <<Seoul '88>> Reebok Advertisement.
*The Complete Handbook of Athletic Footwear*, Entire Boook, 1987.
Vagenas et al., "Evaluation of Rearfoot Asymmetries in Running with Worn and New Running Shoes," *International Journal of Sport Biomechanics*, vol. 4, No. 3, pp. 220-230 (1988).
Valiant et al., <<A Study of Landing from a Jump:Implications for the Design of a Basketball Shoe>>, *Scientific Program of IX International Congress of Biomechanics*, 1983.
Williams et al., <<The Mechanics of Foot Action During the Golf Swing and Implications for Shoe Design>>, *Medicine and Science in Sports and Exercise*, vol. 15, No. 3, pp. 247-255, 1983.
World Professional Squash Association Pro Tour Program, 1982-1983.
Williams, Walking on Air, *Case Alumnus*, vol. LXVII, No. 6, Fall 1989, pp. 4-8.
Brooks advertisement in *Runner's World* etc., Jun. 1989, pp. 56+.

(56) References Cited

OTHER PUBLICATIONS

Cavanaugh et al., Biological Aspects of Modeling Shoe/Foot Interaction During Running, *Sports Shoes and Playing Surfaces*, 1984, pp. 24-25, 32-35, 46.
Blechschmidt, "The Structure of the Calcaneal Padding", *Foot & Ankle* vol. 2, No. 5, Mar. 1982, pp. 260-283.
Cavanaugh "The Running Shoe Book," © 1980, pp. 176-180, Anderson World, Inc., Mountain View, CA.
Executive Summary with Seven Figures, 1993.
German Description of adidas badminton shoe, pre-1989(?), 1 page.
The Reebok Lineup, Fall 1987, 2 pages.
Related US specification available upon request: U.S. Appl. No. 09/908,688, filed Jul. 20, 2001.
Related US specification available upon request: U.S. Appl. No. 08/477,640, filed Jun. 7, 1995.
Related US specification available upon request: U.S. Appl. No. 09/648,792, filed Aug. 28, 2000.
Related US specification available upon request: U.S. Appl. No. 08/376,661, filed Jan. 23, 1995.
Related US specification available upon request: U.S. Appl. No. 09/710,952, filed Nov. 14, 2000.
Related US specification available upon request: U.S. Appl. No. 09/780,450, filed Feb. 12, 2001.
Related US specification available upon request: U.S. Appl. No. 09/790,626, filed Feb. 23, 2001.
Related US specification available upon request: U.S. Appl. No. 09/734,905, filed Dec. 13, 2000.
Related US specification available upon request: U.S. Appl. No. 09/785,200, filed Feb. 20, 2001.
Related US specification available upon request: U.S. Appl. No. 09/907,598, filed Jul. 19, 2001.
Related US specification available upon request: U.S. Appl. No. 09/794,943, filed Oct. 12, 2001.
Related US specification available upon request: U.S. Appl. No. 09/974,786, filed Oct. 12, 2001.
Related US specification avaiable upon request: U.S. Appl. No. 08/452,490, filed May 30, 1995.
Related US specification available upon request: U.S. Appl. No. 08/473,974, filed Jun. 7, 1995.
Related US specification available upon request: U.S. Appl. No. 08/482,838, filed Jun. 7, 1995.
Related US specification available upon request: U.S. Appl. No. 08/033,468, filed Mar. 18, 1993.
Related US specification available upon request: U.S. Appl. No. 08/462,531, filed Jun. 5, 1995.
Related US specification available upon request: U.S. Appl. No. 08/473,212, filed Jun. 7, 1995.
Related US application available upon request: U.S. Appl. No. 11/831,645, filed Jul. 31, 2007.
Related available upon request: U.S. Appl. No. 11/738,947, filed Apr. 23, 2007.
Related available upon request: U.S. Appl. No. 11/179,887, filed Jul. 12, 2005.
Related available upon request: U.S. Appl. No. 11/282,665, filed Nov. 21, 2005.
Related available upon request: U.S. Appl. No. 11/190,087, filed Jul. 26, 2005.
Related available upon request: U.S. Appl. No. 11/831,597, filed Jul. 31, 2007.
Complete file history of U.S. Appl. No. 13/357,332.
Complete file history of U.S. Appl. No. 13/457,990.
Complete file history of U.S. Appl. No. 11/802,930.
Complete file history of U.S. Appl. No. 14/244,868.
Partial file history of U.S. Appl. No. 14/244,868 from dates between Aug. 26, 2014 to present.
Partial file history of U.S. Appl. No. 14/244,863 from dates between Jul. 3, 2014 to present.
Complete file history of U.S. Appl. No. 13/472,645, Apr. 16, 2013.
Partial file history of U.S. Appl. No. 14/244,868 from dates between Nov. 13, 2014 to present.
Partial file history of U.S. Appl. No. 14/244,863 from dates between Oct. 27, 2014 to present.

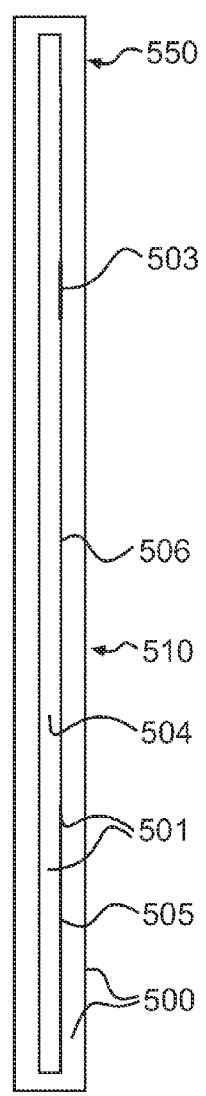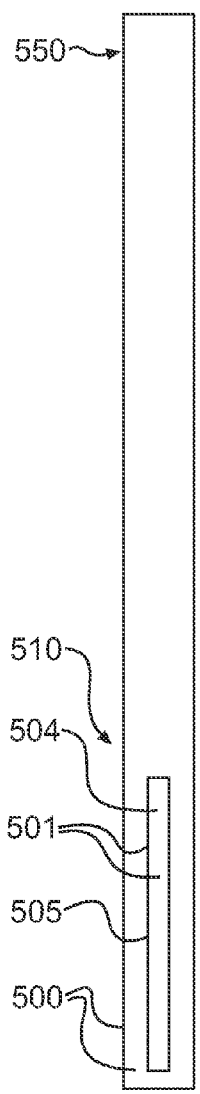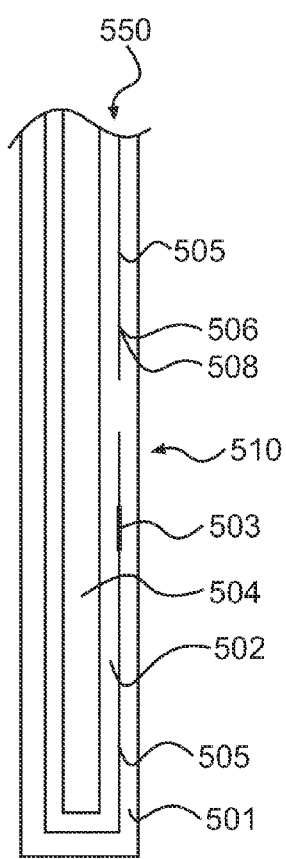

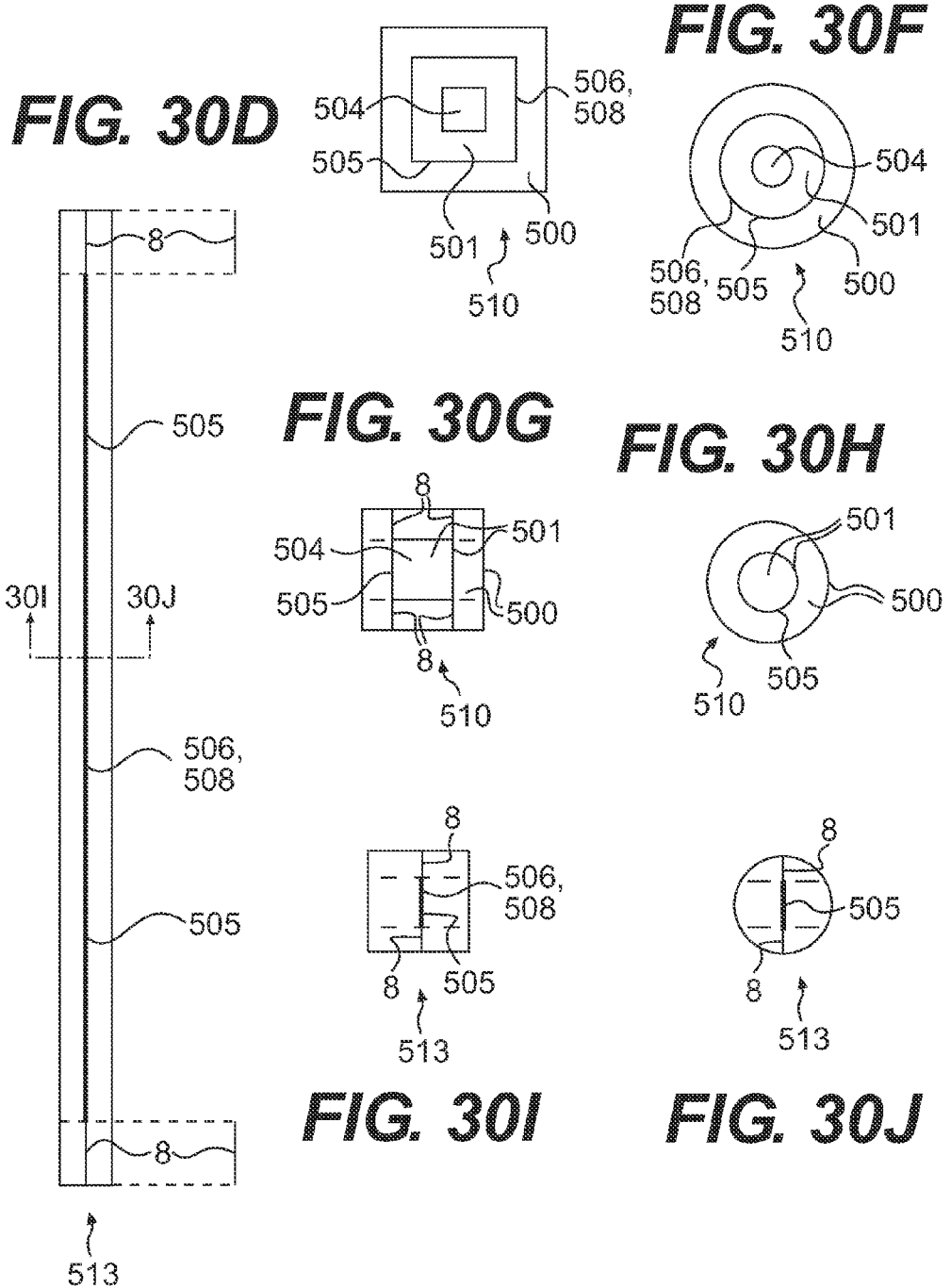

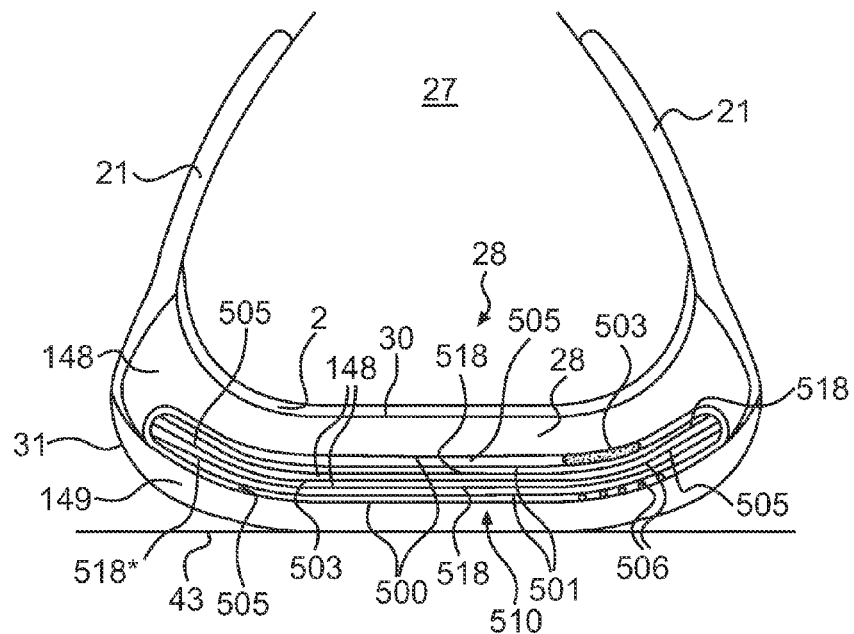
FIG. 48B
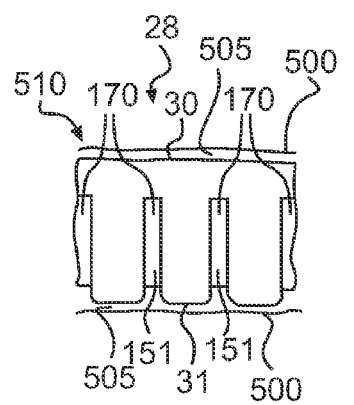 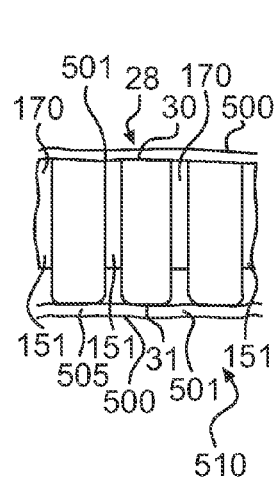 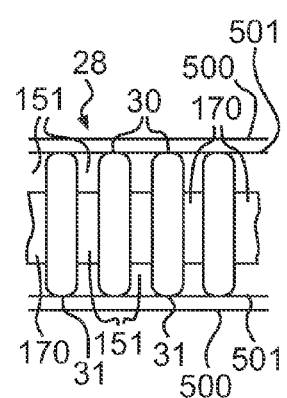
FIG. 48C  FIG. 48D  FIG. 48E

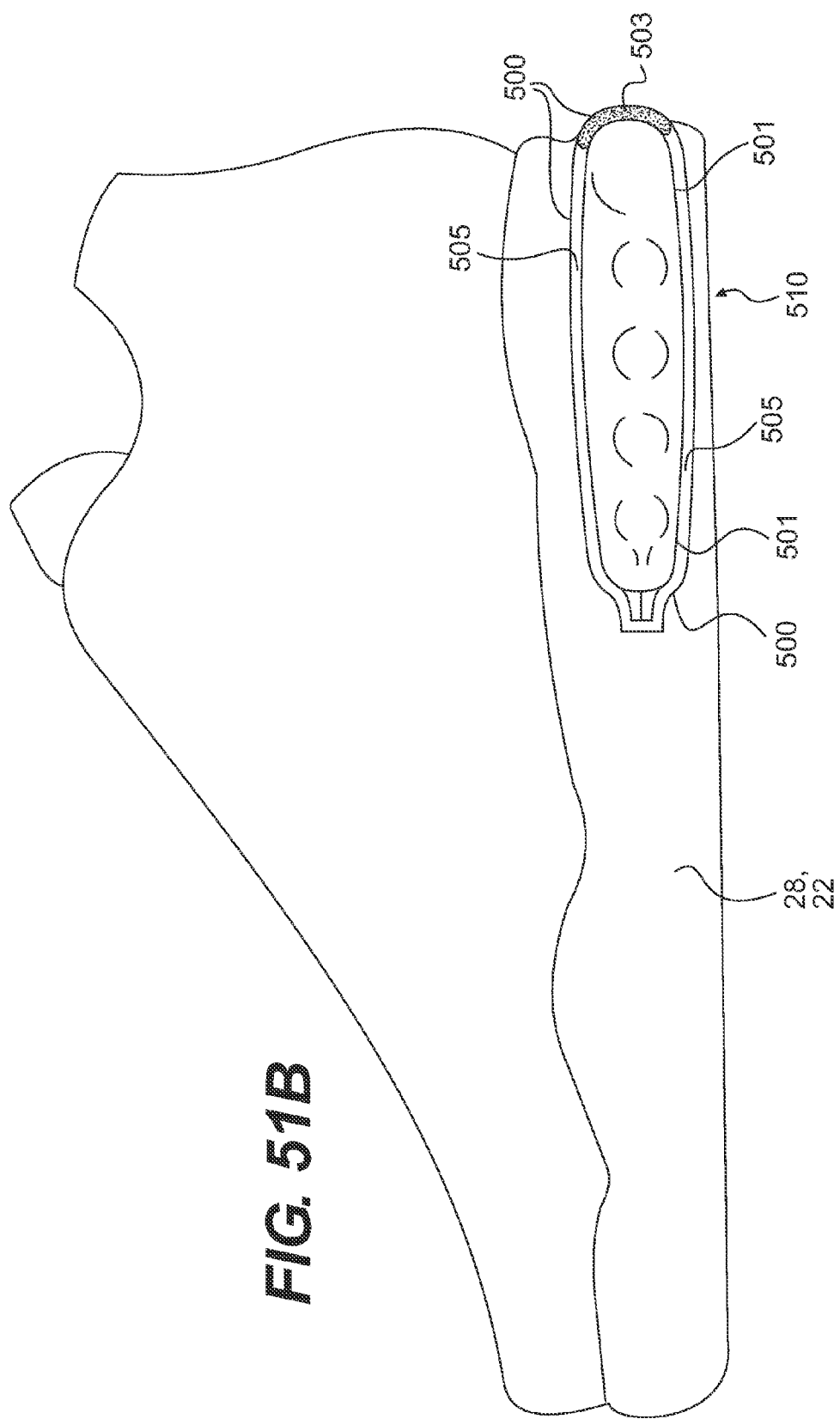

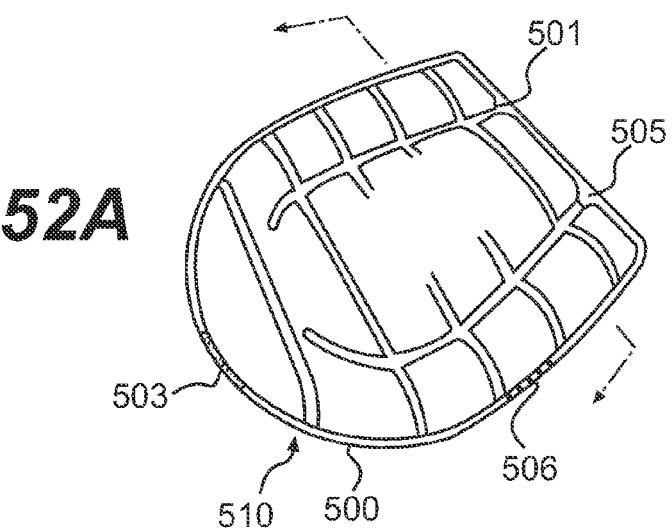
FIG. 52A
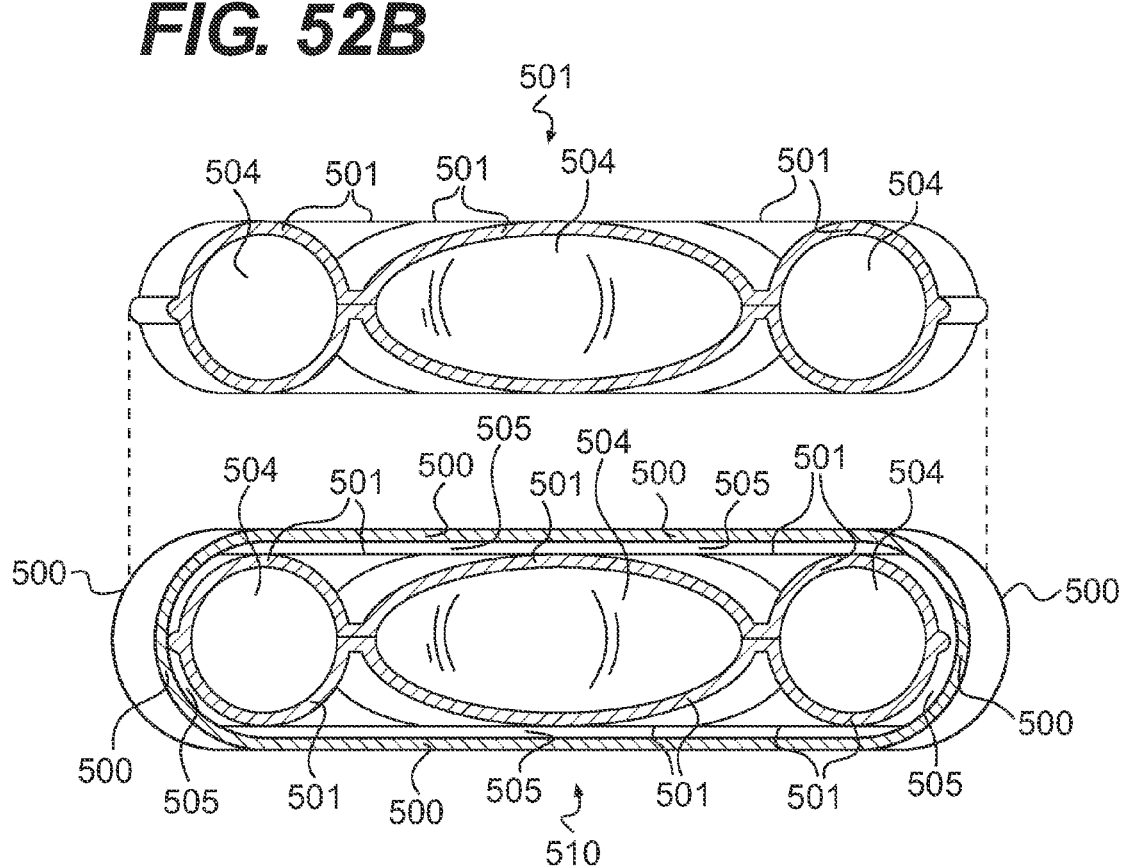
FIG. 52B
FIG. 52C

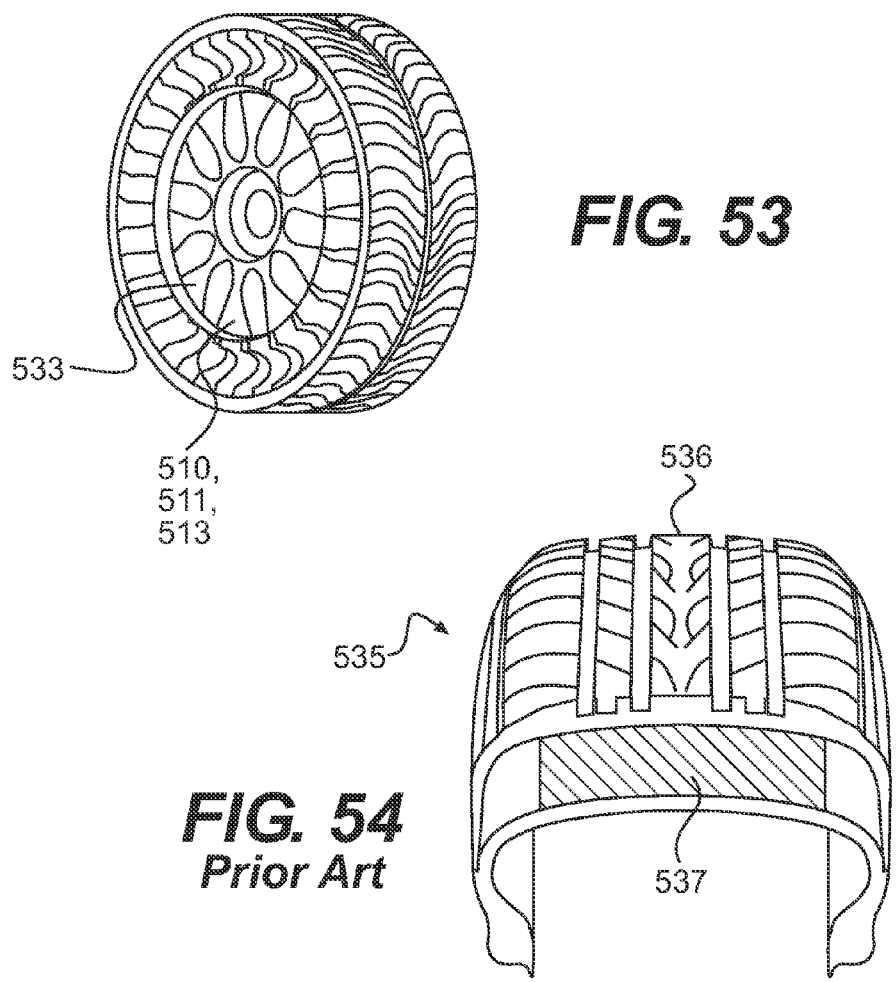

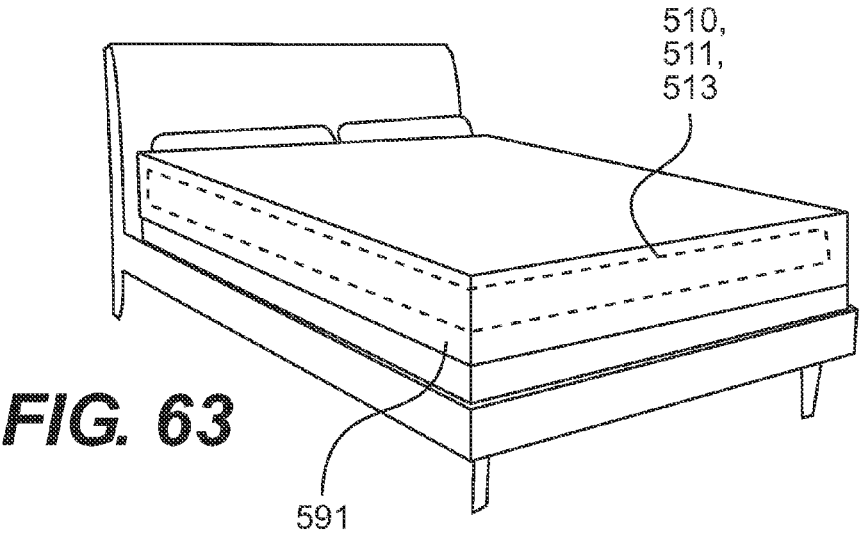
FIG. 63
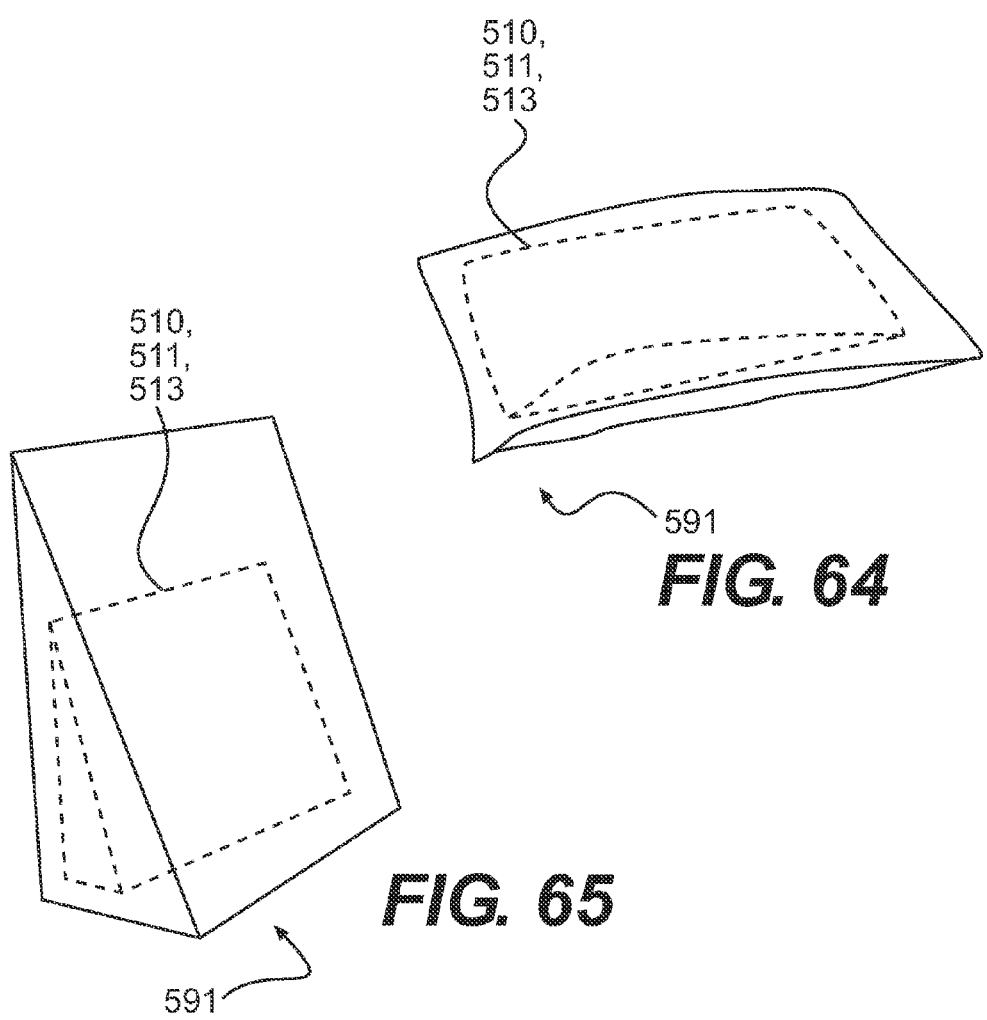
FIG. 64
FIG. 65

MICROPROCESSOR CONTROL OF BLADDERS IN FOOTWEAR SOLES WITH INTERNAL FLEXIBILITY SIPES

This application is a continuation of U.S. patent application Ser. No. 13/472,645, filed on May 16, 2012, now U.S. Pat. No. 8,562,678; which is a continuation of U.S. patent application Ser. No. 13/457,990, filed Apr. 27, 2012, now U.S. Pat. No. 8,567,095; which is a continuation of U.S. patent application Ser. No. 13/357,332, filed on Jan. 24, 2012, now U.S. Pat. No. 8,561,323; which is a continuation of U.S. patent application Ser. No. 11/802,930, filed May 25, 2007, now U.S. Pat. No. 8,256,147, which is a continuation-in-part of prior U.S. patent application Ser. No. 11/802,033, filed May 18, 2007, now U.S. Pat. No. 8,291,618, which is a continuation-in-part of U.S. patent application Ser. No. 11/282,665, filed Nov. 21, 2005, now U.S. Pat. No. 8,141,276, which claims the benefit of U.S. Provisional Application No. 60/629,384, filed Nov. 22, 2004, U.S. Provisional Application No. 60/629,385, filed Nov. 22, 2004, U.S. Provisional Application No. 60/629,523, filed Nov. 22, 2004, U.S. Provisional Application No. 60/633,664, filed Dec. 6, 2004, U.S. Provisional Application No. 60/634,781, filed Dec. 9, 2004, U.S. Provisional Application No. 60/634,782, filed Dec. 9, 2004, U.S. Provisional Application No. 60/672,407 filed Apr. 18, 2005, U.S. Provisional Application No. 60/677,538, filed May 4, 2005, U.S. Provisional Application No. 60/679,182, filed May 9, 2005, and U.S. Provisional Application No. 60/700,179, filed Jul. 18, 2005. U.S. patent application Ser. No. 11/802,033, filed May 18, 2007 claims the benefit of U.S. Provisional Application No. 60/801,381, filed May 19, 2006, U.S. Provisional Application No. 60/802,103, filed May 22, 2006, U.S. Provisional Application No. 60/802,779, filed May 24, 2006, and U.S. Provisional Application No. 60/808,819, filed May 26, 2006, all of which applications listed above are hereby incorporated herein by reference in their entirety.

BACKGROUND OF THE INVENTION

1. Field of the Invention

The invention relates to all forms of footwear, including street and athletic, as well as any other products benefiting from increased flexibility, better resistance to shock and shear forces, and more stable support. More particularly, the invention incorporates devices as a unitary integral insert or component with at least one internal (or mostly internal) sipe, including slits or channels or grooves and any other shape, including geometrically regular or non-regular, such as anthropomorphic (or animal) shapes, into a large variety of products including footwear using materials known in the art or their current or future equivalent, as well as materials that are very firm compared to those taught in the art.

Still more particularly, the unitary internal sipe insert or component provides improved flexibility to products utilizing them, as well as improved cushioning to absorb shock and/or shear forces, including through the use of firm materials, while also improving stability of support, and therefore the siped devices can be used in any existing product that provides or utilizes cushioning and stability. These products include human and other footwear, both soles and uppers, and orthotics; athletic, occupational and medical equipment and apparel; padding or cushioning, such as for equipment or tool handles and furniture; balls; tires; and any other structural or support elements in a mechanical, architectural or any other device. Still more particularly, the integral insert or component with at least one sipe, including in the form of a slit, can include a media such as a lubricant or glue of any useful characteristic such as viscosity or any material, including a magnetorheological fluid.

The invention further relates to at least one chamber or compartment or bladder surrounded, partially or completely, by at least one internal (or mostly internal) sipe, including at least partially in the form of a slit, for use in any footwear soles or uppers, or orthotic soles or uppers, including the use of firm materials, and for other flexibility, cushioning, and support uses in athletic equipment like helmets and apparel including protective padding and guards, as well as medical protective equipment and apparel, and other uses, such as protective flooring, improved furniture cushioning, balls and tires for wheels, and many other uses.

The internal sipe integral insert or component invention further can be usefully combined with the applicant's prior footwear inventions described in this application and expressly incorporated by reference herein below, including removable midsole structures and orthotics and chambers with controlled variable pressure, including control by computer, for example.

2. Brief Description of the Prior Art

Existing devices are generally much less flexible than would be optimal, especially products for human (or animal or other biological-based) users, whose non-skeletal anatomical structures like bare foot soles generally remain flexible even when made hard by significant pressure caused by body weight, whereas the products interfacing directly with them are often much more rigid.

Taking footwear soles as one example, cushioning elements like gas bladders or chambers or compartments are typically fixed directly in other midsole foam plastic material to form a structure that is much more rigid than the sole of the human wearer's bare foot, which is relatively soft when unloaded and hard but still flexible when loaded under body weight. As a result, the support and cushioning of the bare foot are seriously degraded when shod in existing footwear, since the relatively rigid shoe sole drastically alters by obstructing the way in which the bare foot would otherwise interact with the ground underneath a wearer. The effective natural interface is replaced by an inferior artificial one.

The use of open or external traction sipes—that is, sipes in the form of slits or channels that typically are substantially vertical and open to an outside surface, particularly a ground-contracting surface—to provide also flexibility in footwear soles has been fully described by the applicant in prior applications, including the examples shown in FIGS. 55A-55C, 56, 57, and 73A-73D of both the applicant's prior footwear U.S. patent application Ser. No. 11/190,087, published as Pub. No. 2005/0268487 A1 on Dec. 8, 2005, and the applicant's prior orthotic U.S. Pat. No. 7,010,869, issued Mar. 14, 2006, (as well as continuation U.S. application Ser. No. 11/108,034, published as Pub. No. 2005/0217142 A1 on Oct. 6, 2005), and in FIGS. 35-40 of U.S. patent application Ser. No. 11/179,887, published as Pub. No. US2005/0241183 on Nov. 3, 2005, all of which foregoing U.S. patents and published applications are herein incorporated by reference for completeness of disclosure.

The applicant first described such non-traction oriented open external sipes in footwear in PCT Application PCT/US90/06028 titled "Shoe Sole Structures Which Are Siped to Provide Natural Deformation Paralleling the Foot" filed 19 Oct. 1990 and published by WIPO as Int. Pub. No. WO 91/05491 on 2 May 1991. Such open external sipes principally provide flexibility to the footwear sole by providing the capability of the opposing surfaces of the sipe to separate easily from each other. However, external sipes are structurally unlike natural anatomical structures (since to be effective, they must be much deeper than surface skin texture like finger prints, the closest anatomical analogy).

Also, external sipes tend to introduce significant instability by creating excessive edge weakness in the shoe sole adjacent the sipes, just like a paperback book being unable to support weight when standing on end with the pages vertical, but stable when the book and pages are lying flat. External sipes by being open also collect debris in the sipes, seriously reducing sipe performance. In addition, the most optimal pattern and depth of such sipes is unknown and therefore difficult to ascertain directly, except as an error-prone trial and error process guided by second-guessing nature, since deep, open sipes are obviously not used in the design of the human foot. Moreover, the only way to get relatively seamless, continuous natural flexibility like the human foot sole using external sipes is to introduce a very large number of deep sipes on as many different axis as possible in the shoe sole, which produces an impractically soft and unstable shoe sole, the use of which would be roughly like trying to stand on the edge of a large urban area telephone book.

Instead, a much more reasonable and fool-proof procedure is to follow as closely as practical the natural design of the human anatomical foot sole structure with which it is intended to interface to create the closest-to-natural flexibility.

The use of a integral component with internal sipes in footwear soles like those described in this application overcome the problems of external sipes noted above and are naturally more optimal as well, since they more closely parallel structurally the natural anatomical structures of the wearer's bare foot sole. As one example, simply enveloping the outer surface of existing cushioning devices like gas bladders or foamed plastic Ethyl Vinyl Acetate (EVA) or Polyurethane (PU) with a new outer layer of material that is unattached (or at least partially unattached) thereby can creates if unglued an internal sipe between the inner surface of the new compartment and the outer surface of the existing bladder/midsole component, allowing the two surfaces to move relative to each other rather than being fixed to each other.

Especially in the common form of a slit structure seen in many example embodiments, the flexibility of the internal sipe is provided by this relative motion between opposing surfaces that in many the example embodiments are fully in contact with each other, again in contrast to the separating surfaces of external sipes; such surface contact is, of course, exclusive of any internal sipe media, which can be used as an additional enhancement, in contrast to the flexibility-obstructing debris unavoidably picked up by, and often clogging, open external sipes. As a result, the footwear sole in which at least one integral internal sipe insert or component is incorporated becomes much more flexible, much more like the wearer's bare foot sole itself, so that foot sole can interact with the ground naturally. The resulting footwear sole with internal sipes has improved, natural flexibility, improved cushioning from shock and shear forces, and better, more naturally stable support.

A limited use of internal sipes has also been described by the applicant in prior applications, including the examples shown in FIGS. 12A-12D, 60A-60E, and 70-71 of both the applicant's '087 and '034 published applications and '869 patent herein incorporated by reference above, which are generally unglued portions coinciding with lamination layer boundaries, such as between bottomsole and midsole layers. This older approach requires completely new and somewhat difficult approaches in the assembly of the footwear sole during manufacture, as well as significantly greater potential for problems of layer separation (especially bottom sole) since the inherent reduction in gluing surfaces makes the remaining gluing surfaces critical and under increased load; significantly increased positional accuracy in the application of glue is required. Also, the use of lubricating media (and the potential control thereof, including by microprocessor) is also more difficult, since the sipe is formed by existing parts and is not discretely enclosed with the new outer layer to contain the media, as it is in a new invention described in this application.

In contrast, a new invention of this application is a discrete device in the form of an integral component that can easily be inserted as a single simple step into the footwear sole during the manufacturing process or, alternatively, inserted in one single simple step by a wearer (into the upper portion of a midsole insert, for example, much like inserting an insole into an shoe), for whom the new extra layer provides buffering protection for the wearer from direct, potentially abrasive contact with a cushioning component (forming a portion of the inner, foot sole-contacting surface of the shoe sole, for example).

In addition, such a new invention allows easier and more effective containment of a lubricating media (including media with special capabilities, like magnetorheological fluid) within the integral internal sipe, so that the relative motion between inner surfaces of the sipe can be controlled by that media (and, alternatively, by direct computer control); it avoids the need for the use of closed-cell midsole materials or a special impermeable layer applied to the footwear sole material to prevent the sipe media from leaking away.

The new invention also makes manufacturing easier and inherently more accurate, since the introduction of the fluid media can be better control during a separate process when the separate unitary insert or component 510/511/513 is manufactured by itself, rather than attempting to integrate that process into the already complex sole or orthotic molding and assembly process.

Accordingly, it is a general object of one or more embodiments of the invention to elaborate upon the application of the use of a device in the form of an insertable integral component with one or more internal sipes to improve the flexibility, cushioning, and stability of footwear and other products.

It is still another object of one or more embodiments of the invention to provide footwear having an integral insert or component with at least one internal (or mostly internal) sipes, including slits or channels or grooves and any other shape, including geometrically regular or non-regular, such as anthropomorphic or animal shapes, to improve flexibility, cushioning and stability.

It is still another object of one or more embodiments of the invention to include an insertable integral device with one or more internal sipes that include a media such as a lubricant or glue of any useful characteristic such as viscosity or any material, including a magnetorheological fluid.

It is another object of one or more embodiments of the invention to create a shoe sole with flexibility, support and cushioning that is provided by siped chambers or compartments or bladders in the footwear sole or upper or orthotics. The compartments or chambers or bladders are surrounded, partially or completely, by at least one internal (or mostly internal) sipe, including in the form of a slit, for use in any footwear soles or uppers, or orthotic soles or uppers, and for other flexibility, cushioning, and stability uses in athletic equipment like helmets and apparel including protective padding and guards, as well as medical protective equipment and apparel, and other uses, such as protective flooring, improved furniture cushioning, balls and tires for wheels, and many other uses.

It is another object of one or more embodiments of the invention to create footwear, orthotic or other products with at least one outer chamber; at least one inner chamber inside the outer chamber; the outer chamber and the inner chamber being separated at least in part by an internal sipe, including in the form of a slit; at least a portion of an inner surface of the outer chamber forming at least a portion of an inner surface of the internal sipe; and the internal sipe providing increased flexibility, cushioning, and stability for the footwear, orthotic or other product.

A further object of one or more embodiments of the invention is to combine the integral insert or component with at least one internal sipe with the applicant's prior footwear inventions described and herein incorporated by reference in this application, including removable midsole structures and orthotics and chambers with controlled variable pressure, including control by computer.

These and other objects of the invention will become apparent from the summary and detailed description of the invention, which follow, taken with the accompanying drawings.

SUMMARY OF THE INVENTION

In one aspect the present invention attempts, as closely as possible, to replicate and interface with the naturally effective structures of the bare foot that provide flexibility, cushioning, and stable support. More specifically, the invention relates to a device for a footwear sole or upper or both, or an orthotic or orthotic upper or both, or other, non-footwear devices, including a unitary internal sipe insert or component, said internal sipe providing increased flexibility for said device. More specifically, the invention relates to an integral insert or component with at least one slit with a media such as a lubricant or glue of any useful characteristic such as viscosity or any material, including a magnetorheological fluid.

Even more specifically, the invention relates to footwear or orthotics or other products with at least one compartment or chamber or bladder surrounded, partially or completely, by at least one internal (or mostly internal) sipe, including in the form of a slit, for use in any footwear soles or uppers, or orthotic soles or uppers, and for other flexibility, cushioning, and stability uses. Even more specifically, the invention relates to footwear, orthotic or other products with at least one outer chamber; at least one inner chamber inside the outer chamber; the outer chamber and the inner chamber being separated at least in part by an internal sipe, including in the form of a slit; at least a portion of an inner surface of the outer chamber forming at least a portion of a surface of the internal sipe; and the internal sipe providing increased flexibility, cushioning, and stability for the footwear, orthotic or other product.

These and other features of the invention will become apparent from the detailed description of the invention that follows.

BRIEF DESCRIPTION OF THE DRAWINGS

FIGS. 1-44 of this application are FIGS. 83-127 of both the applicant's U.S. application Ser. No. 11/282,665 filed Nov. 21, 2005 and published on Nov. 9, 2006 as Pub. No. US 2006/0248749 A1 and PCT Application PCT/US2005/ 042341 filed 21 Nov. 2005 and published on 1 Jun. 2006 as Int. Pub. No. WO 2006/058013 A2, both of which are incorporated herein by reference.

FIGS. 1A-4A show a frontal or sagittal plane cross section view of an example of a device 510 such as a flexible insert with a siped compartment or chamber or bladder.

FIGS. 1B-6B show a top view in a horizontal plane of a device 510 example of FIGS. 1A, 2A, 3A, 4A, 5A and 6A.

FIGS. 5A-6A show a frontal or sagittal plane cross section view of an example of a device 510 such as a flexible insert with two siped compartments or chambers or bladders or combination.

FIG. 7 shows, in a frontal plane cross section in the heel area, a shoe and shoe sole including a single siped compartment 510.

FIG. 8 shows a similar embodiment and view to that shown in FIG. 7, including also an attachment 503 between 500 and 501.

FIG. 9 shows a similar embodiment and view to that shown in FIG. 7, including also an inner compartment/chamber 501 with a number of inner compartment structural elements 502.

FIG. 10 shows a similar embodiment and view to that shown in FIG. 7, including also more than one siped compartment 510.

FIGS. 11 and 12 show a similar embodiment and view to that shown in FIG. 7, including also more than one inner compartments 501 in an outer compartment 500.

FIGS. 13 and 14 show similar embodiments and views to that shown in FIG. 7, but wherein the outer compartment/chamber/bladder 500 forms substantially all of the midsole portion of the footwear sole (exclusive of the outer sole).

FIG. 15 shows a similar embodiment and view to that shown in FIG. 7, but also including the features of prior FIG. 11N of the '087 and '034 published applications (as well as the Ser. No. 11/282,665 application published Nov. 9, 2006 as Pub. No. 2006/0248749 A1 incorporated by reference) and '869 patent incorporated by reference herein, with the siped compartment/chamber/bladder 510 applied to it.

FIG. 16 shows a somewhat similar embodiment and view to that shown in FIG. 10, but including an electromagnetic shock absorption system in each chamber, which are without sipes.

FIG. 22 shows, in frontal plane cross section in the heel area, a flexible insert or component 510 used in the footwear upper 21.

FIG. 23 shows, in frontal plane cross section in the heel area, a flexible insert or component 510 used both in the footwear upper 21 and in the sole 22 or 28.

FIGS. 30A-30J show cross sectional examples of any structural or support element 550 in any device, including mechanical or architectural, including a beam or strut, or a tool or racquet handle or grip, shaft or body, or head, that incorporates a siped chamber 510.

FIGS. 33A-33E and 35 show frontal plane cross section examples of shoe soles 22 or 28 or midsole insert or orthotics 145 with several planar sides to approximate curvature from the applicant's published '034 application and WIPO publication No. WO 02,09547, which can be combined with the flexible insert or components 510, 511, or 513;

FIG. 34 shows a similar top view example.

FIG. 36 shows prior art from the automotive industry relating to magnetoelectric cushioning systems shown in FIGS. 16 and 17.

FIGS. 37-42 show perspective views of prior art examples gas bladders of Nike Air™ (119-123), which are FIGS. 12-16 of U.S. Pat. No. 6,846,534 and Zoom Air™ (124-126), which are FIGS. 1-2 of published U.S. Patent Application 2005/0039346 A1.

FIG. 43 is a cross-sectional view along line 43-43 of FIG. 42 and is a prior art example of a gas bladder as shown in FIG. 3 of published U.S. Patent Application 2005/0039346A1.

FIG. 44 shows perspective views of prior art Adidas 1™ shoe sole electronic/electromechanical cushioning system.

FIG. 48B shows a similar embodiment example frontal plane cross-section with fiber embedded in midsole layers. FIGS. 48C-48E show material using vertical sipe embodiment examples from FIGS. 73A-73C of the '665 application like FIGS. 25 and 26 of this application.

FIGS. 49-50, 51A-51B, and 52A-52C show examples of the 510 invention using typical commercial air bladder embodiments as compartments 501 modified with outer compartments 500.

FIG. 53 shows an example wheel for an automobile with the 510/511/513 inventions.

FIG. 54 show prior art tire example.

FIGS. 63-65 shows a mattress, pillow, and wedge cushion with the 510/511/513 inventions.

FIGS. 82A-82C, 83A-83C, 84A-84D, 85A-85C, 86A-86C are frontal plane cross sections with the locations of the cross-sections of FIGS. 84A-84D shown in FIGS. 84E-84F, the location of the cross-sections of FIGS. 85A-85C shown in FIG. 85D and the location of the cross-sections of FIGS. 86A-86C shown in FIGS. 86D-86E. FIG. 84E is a sagittal plane cross-section along line 84E-84E of FIG. 84F. FIGS. 84F, 85D and 86D are a horizontal plane cross-sections. FIG. 86E is a sagittal plane cross-section along line 86E-86E of FIG. 86D.

FIG. 88 is an exploded view of an embodiment of a removable midsole insert or insertable midsole orthotic with pressure controlled encapsulated midsole sections and a control system such as a microprocessor.

FIGS. 89A-89B are frontal plane cross-sectional views showing two variations of inner shoes in accordance with the present invention.

FIG. 89C is a cross-sectional view of an embodiment of an interface for increasing the stability of the insertable midsole of the present invention.

It is understood that the reference numbers identified in this application and in U.S. patent application Ser. No. 11/282,665, incorporated by reference herein, are used consistently throughout the application such that like reference numbers are used to describe the same or like elements.

DETAILED DESCRIPTION OF THE PREFERRED EMBODIMENTS

Figure 1A:
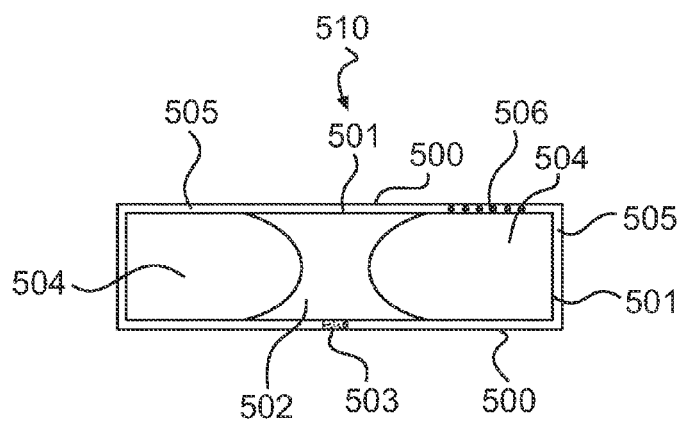
Figure 1B:
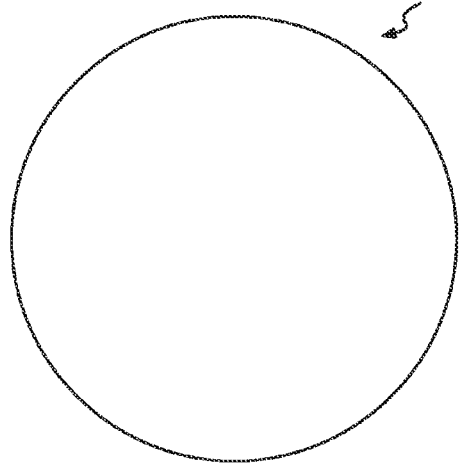
Figure 2B:
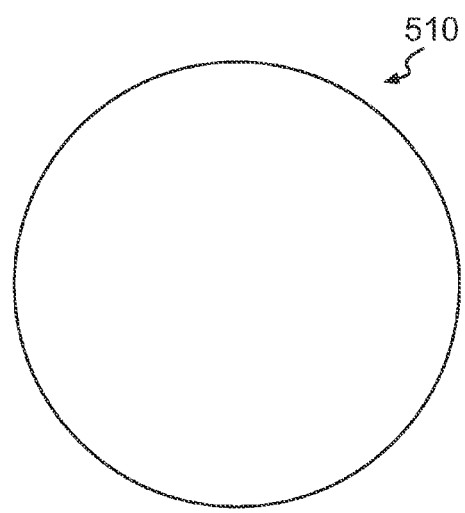
Figure 79:
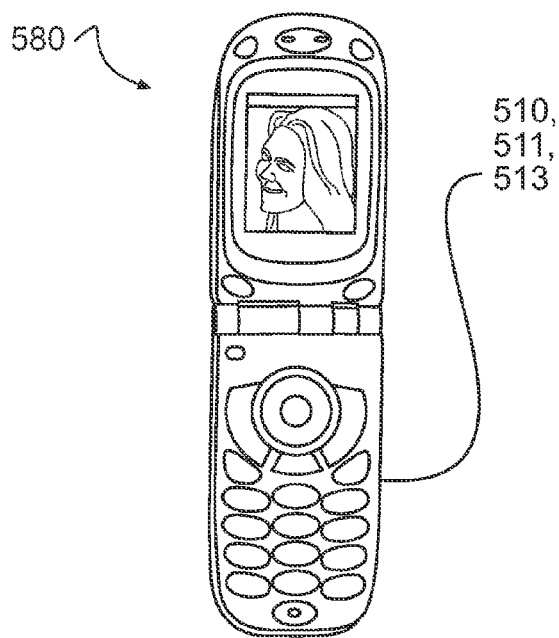

FIGS. 1-79 show the applicant's inventions incorporating forms of insertable devices with one or more internal (or mostly internal) sipes, including slits (or channels or grooves and other shape, including geometrically regular or non-regular shapes, such as anthropomorphic shapes), into a large variety of products, including footwear and orthotics, athletic, occupational and medical equipment and apparel, padding for equipment and furniture, balls, tires and any other structural or support elements in a mechanical, architectural or any other device.

REFERENCE NUMBER ELEMENT DESCRIPTION 2 insole
3 attachment point of upper midsole and shoe upper
4 attachment point of bottom sole and shoe upper
5 attachment point of bottom sole and upper midsole
6 attachment point of bottom sole and lower midsole
8 lower surface interface with the upper surface of the bottom sole
9 interface line between encapsulated section and midsole sections
11 lateral stability sipe
12 medial stability sipe
13 interface between insole and shoe upper
14 medial origin of the lateral stability sipe
16 hatched area of decreased area of footprint due to pronation
17 footprint outline when tilted
18 inner footprint outline of low arched foot
19 hatched area of increased area of footprint due to pronation
20 athletic shoe
21 shoe upper
21a inner secondary shoe upper
22 conventional shoe sole
23 bottom outside edge of the shoe sole
23a lever arm
26 stabilizing quadrants
27 human foot
28 rounded shoe sole
28a rounded stability sides
28b load bearing shoe sole
29 outer surface of the foot
30 upper surface of the shoe sole
30a side or inner edge of the shoe sole stability side
30b upper shoe sole surface which contacts the wearer's foot
31 lower surface of the shoe sole
31a outer edge of rounded stability sides
31b lower surface of shoe sole parallel to 30b
32 outside and top edge of the stability side
33 inner edge of the naturally rounded stability side
34 perpendicular sides of the load-bearing shoe sole
35 peripheral extent of the upper surface of sole
36 shoe sole outline
37 foot outline
37a maximum supination position
37b maximum pronation position
3.8 heel lift
39 combined midsole and bottom sole
40 forefoot lift
43 ground
51 Theoretically Ideal Stability Plane
51' half of the Theoretically Ideal Stability Plane
53a top of rounded stability side
60 tread portion
61 cleated portion
62 alternative tread construction
63 surface which the cleat bases are affixed
70 curve of range of side to side motion
72 center of gravity
80 conventional wide heel flare curve
82 narrow rectangle the width of heel curve
85 rounded line of areas of shoe sole that are in contact with the ground
86 rounded line
87 rounded line
88 rounded line
89 rounded line
92 head of first metatarsal
93 head of fifth distal phalange 94 head of fifth metatarsal
95 base and lateral tuberosity of the calcaneus
96 heads of the metatarsals
96a stability correction supporting fifth metatarsal and distal phalange heads
96b stability correction supporting first metatarsal and distal phalange heads
97 base of the fifth metatarsal
98 head of the first distal phalange
98a stability correction supporting first distal phalange
98a' stability correction supporting fifth distal phalange
100 straight line replacing indentation at the base of the fifth metatarsal
104 pressure sensing device
108 lateral calcaneal tuberosity
109 main base of the calcaneus
111 flexibility axis
112 flexibility axis
113 flexibility axis
115 center of rotation of radius r+r'
119 center of shoe sole support section
120 pressure sensing circuitry
121 main longitudinal arch (long arch)
122 flexibility axis
123 flexible connecting top layer of sipes
124 flexibility axis
125 base of the calcaneus (heel)
126 metatarsal heads (forefoot)
129 honeycombed portion
145 removable midsole insert/insertable midsole, orthotic
147 upper midsole (upper areas of shoe midsole)
148 midsole
149 bottom or outer sole
149a secondary bottom sole
150 compression force
151 channels with parallel side walls
155a tension force along the top surface of the shoe sole
155b mirror image of tension force 155a
158 subcalcaneal fat pad
159 calcaneus
160 bottom sole of the foot
161 cushioning compartment
162 natural crease or upward taper
163 crease or taper in the human foot
164 chambers of matrix of elastic fibrous connective tissue
165 lower surface of the upper midsole
166 upper surface of the bottom sole
167 outer surface of the support structures of the foot
168 upper surface of the foot's bottom sole
169 shank
170 flexible material filling channels (sipes)
176 protrusions
177 recesses
180 mini-chambers
181 internal deformation slits (sipes) in the sagittal plane
187 internal deformation slits (sipes) in the horizontal plane
184 encapsulating outer midsole section
185 midsole sides
187 upper midsole section
188 bladder or encapsulated midsole section
189 central wall
191 fibrous capsule shell
197 subdivided cushioning compartments
201 horizontal line through lower most point of upper surface of the shoe sole
206 fluid duct
210 fluid valve
300 encapsulated midsole section control system
301 mechanical fasteners
307 adhesive
303 snap fit New reference numerals used in the FIGS. 1-79 are further defined as follows:

Ref. No 500:
An outer compartment, such as an outer compartment 161 or chamber 188 or bladder, at least partially or mostly or entirely enclosing a space within the outer compartment/chamber/bladder 500, which can be located anywhere in a footwear sole or upper or both or other article described in this application. Construction and materials can be, as one embodiment example, simpler in shape but otherwise similar to those used in any commercial samples of Nike Air™.

Ref. No 501:
An inner compartment, such as an inner compartment 161 or chamber 188 or bladder, is located inside the enclosed space of the outer compartment/chamber/bladder 500. Construction and materials of the inner compartment/chamber/bladder 501 can be, as one embodiment example, like those used in any commercial samples of gas bladders in Nike Air™.

Ref. No. 502:
Structural element that is optional anywhere within either outer compartment/chamber/bladder 500 or inner compartment/chamber/bladder 501, of which a 501 embodiment is shown; any flexible, resilient material can be used, including structures molded into the shape of (and using the material of) the compartment/chamber/bladder 500 or 501, as is very common in the art, such as many commercial samples of gas bladders used in Nike Air™, as well as foamed plastic or plastic composite or other materials, like Nike Shox™ or Impax™ or Reebok DMX™ or New Balance N-ergy™. In addition, other materials can be used directly within a 501/500 compartment or can connected to or through a 501/500 compartment, as in the cushioning components of the shoe sole heel of commercial samples of Adidas 1™, including electromechanical, electronic, and other components. Some devices may benefit from the use of rigid or semi-rigid materials for part or all of a media within a compartment.

Ref. No. 503:
Attachment of two compartment/chambers/bladders 500/501, including particularly attachment of outer 500 to inner 501; any practical number of attachments of any form using any materials can be used, including glue.

Figure 87:
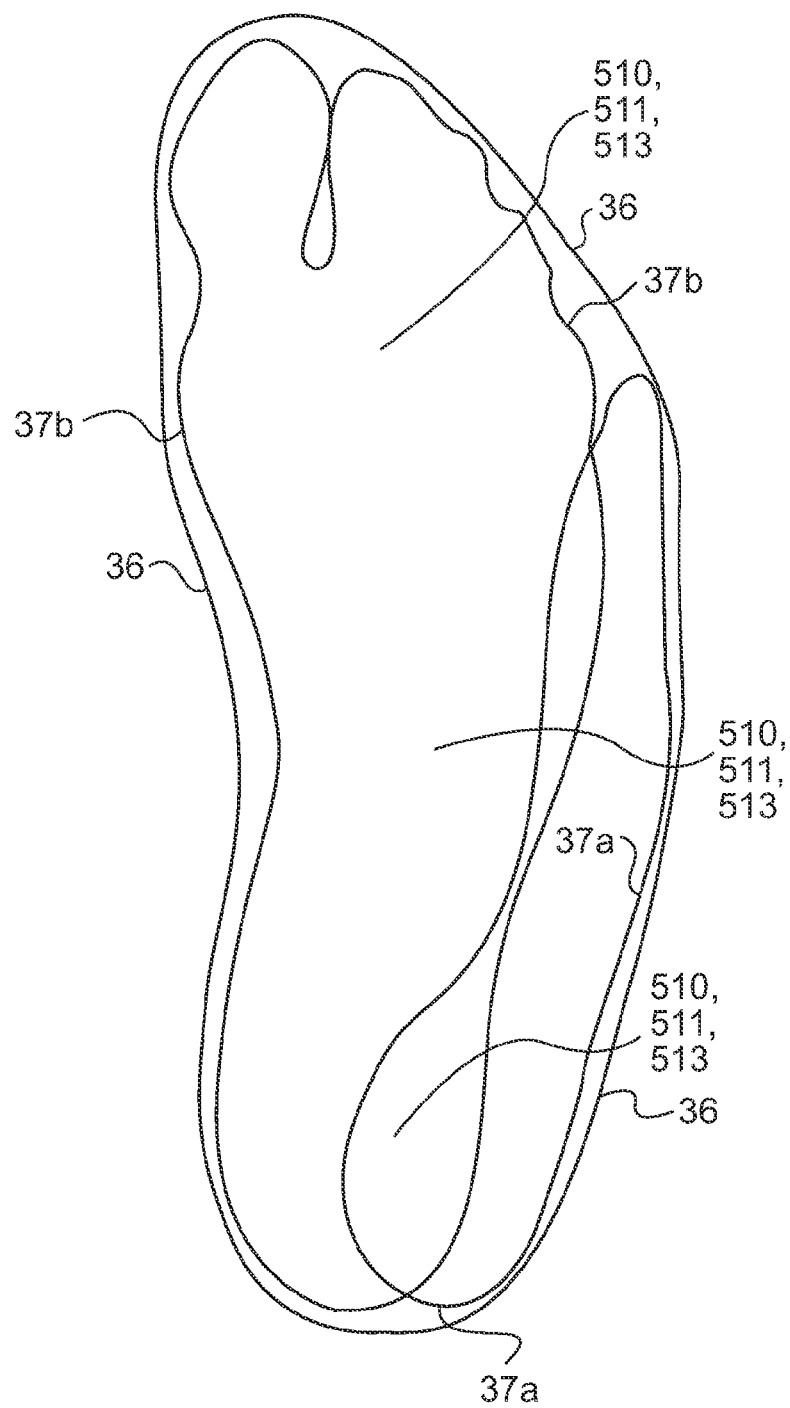

Ref. No. 504:
Media contained within all or part of compartment/chamber/bladder 500 or 501, particularly 501, can be any useful material, such as gas (including, as an example, gas used in Nike Air™ or ambient air, liquid or fluid, gel, or foam (such as a plastic like PU or EVA or equivalent or rubber (natural or synthetic) or combination of two or more; encapsulation of foam is optional); material particles or coatings, such as dry coatings like polytetrafluoroethylene can also be used. An optional element in an outer compartment/chamber 500 (or an inner compartment/chamber 501 that itself contains an inner compartment/chamber, as in FIG. 87).

Ref. No. 505:
Internal sipe or slit or channel or groove for flexibility, such as between inner and outer compartment/chamber 500/501 (or bladder) surfaces, as one embodiment example; such surfaces can be substantially parallel and directly contact in one useful embodiment example, but are not attached so that at least parts of the two surfaces can move relative to each other, such as to facilitate a sliding motion between surfaces; the surfaces can be in other useful forms that allow portions of the surfaces to be proximate to each other but not contacting in an unloaded condition or in a partially loaded condition or in a maximally loaded condition.

Ref. No. 506:

Media of internal sipe 505; media 506 can be any useful material like those used in media 504; media 506 can be located in part or all of 505 to decrease (or increase) sliding resistance between 500/501 or 505 surfaces, for example, to lubricate the surfaces with any suitable material; silicone or polytetrafluoroethylene can be used, for example; an optional element.

Ref. No. 507:

Metal particles.

Ref. No. 508:

Shock absorbing fluid containing 507; a magnetorheological fluid.

Ref. No. 509:

Electromagnetic field-creating circuit.

Ref. No. 510:

A flexible insert or component including siped compartments 161 or chambers 188 or bladders used for example as outer and inner compartments/chambers/bladders 500/501 for footwear soles or orthotics or uppers or other uses; a useful embodiment being two or more compartment or chambers (or bladders) 161/188 (or mix) that are separated at least in part by an internal sipe 505, including the example of at least one 501 (either 161/188 or bladder) inside at least one 500 (either 161/188 or bladder) and being separated by an internal sipe 505.

Ref. No. 511:

A flexible insert or component including a single compartment 161 or chamber 188 or bladder with an associated internal sipe 505 component.

Ref. No. 512:

A wall of flexible insert or component 511 or 513 that is not formed by a compartment 161 or chamber 188 or bladder and that is separated from another wall by an internal sipe 505.

Ref. No. 513:

Any flexible insert or component including an internal sipe 505.

Ref. No. 514:

A flexible shank located generally in an instep area of a shoe sole and incorporated in a 510/511/513 device described herein previously.

Ref. No. 516:

Ball bearings

Ref. No. 517:

Liquid or gel cells

Ref. No. 518:

Fibers

Ref. No. 519:

Piezoelectric components

Ref. No. 521:

Plastic or plastic-based compound

Ref. No. 522:

Rubber or rubber-based compound

Ref. No. 530:

Any ball with a device 510/511/513 described herein previously.

Ref. No. 535:

A tire (for a wheel) or a wheel 533 with a device 510/511/513 described herein previously and treads 536, as well as steel belts 537.

Ref. No. 540:

A human breast implant with a device 510/511/513 described herein previously.

Ref. No. 545:

Transportation vehicle including its interior 546 with a device 510/511/513.

Ref. No. 550:

Any structural or support element with a device 510/511/513 described herein previously, including a helmet or other apparel or equipment for humans or animals or other biologically based product; or a tool (power or manual), club, or racquet handle, grip, shaft, body, or head; a beam or strut or any other element in any device, including mechanical or architectural.

Ref. No. 560:

An artificial spinal or intervertebral disk with a device 510/511/513 described herein previously.

Ref. No. 570:

Apparel or clothing, including gloves 571, with a device 510/511/513.

Ref. No. 580:

Computer

Ref. No. 590:

Furniture

Ref. No. 610:

Cable of wire or glass fiber.

Ref. No. 620:

Building, including house.

Ref. No. 630:

Human body braces.

FIGS. 1-15, 17, and 22-79 show, as numeral 510, examples of a device or flexible insert including siped compartments 161 or chambers 188 or bladders (another term used in the art) for use in any footwear soles, including conventional soles 22 or the applicant's prior inventions, including footwear/shoe soles 28 and midsole inserts 145 as described in applicant's published '087 application and Ser. No. 11/282,665 U.S. application published Nov. 9, 2006, as Pub. No. US 2006/0248749 A1 incorporated by reference, or for orthotics 145 as described in the applicant's published '034 U.S. application, '869 patent, and WO 02/09547 WIPO publication, as well as to be published by WIPO PCT Application Number PCT/US2005/042341, all incorporated by reference herein, including for uppers for footwear or orthotics (or including uppers), or for other flexibility uses in athletic equipment like helmets and apparel including protective padding and guards, as well as medical protective equipment and apparel, and other uses, such as protective flooring, improved furniture cushioning, balls and tires for wheels, and other uses.

The device or flexible insert with siped compartments or chambers 510 include embodiments like two or more of either compartments 161 or chambers 188 or bladders (or a any mix including two or more of a compartment, a chamber, and a bladder) that are separated at least in part or in several parts or mostly or fully by an internal sipe 505. The flexible insert 510 can be inserted during assembly of an article by a maker or manufacturer or is insertable by a user or wearer (into an article like a shoe, for example, as part of a removable midsole insert 145 described above), or integrated into the construction of a device as one or more components.

Siped compartments or chambers 510 include example embodiments such as FIGS. 1-15, 17, and 22-79 which generally show at least one inner compartment 161 or chamber 188 inside at least one other outer compartment 161 or chamber 161; and the two compartments/chambers 161/188 being separated by an internal sipe 505.

One practical example embodiment of the invention is any prior commercial embodiment of Nike Air™ gas bladder or compartment (like typical examples in FIGS. 12-16 of U.S. Pat. No. 6,846,534, which is hereby incorporated by reference) that is installed unattached, as is, located within the space enclosed partially or fully by a new, slightly larger outer compartment of one additional layer of the same or similar material, with the same or a simpler or the simplest geometric shape; that is, not necessarily following indentations or reverse curves, but rather incorporating straighter or the straightest lines, as seen in cross-section: for example, following the outermost side curvature seen in FIGS. 12-16, but with upper and lower surfaces that are substantially flat and parallel (or curved and parallel), to facilitate ease of movement between the two surfaces of the sipe 505 formed, increasing the resulting flexibility.

The new additional, outer compartment thus thereby has created by its presence an internal sipe 505 between the two unconnected compartments. The new internal sipe 505 provides much greater flexibility to any footwear sole 22 or 28, since it allows an inner, otherwise relatively rigid Nike Air™ compartment structure to become an inner compartment 501 (instead of typically being fixed into the other materials such as EVA of the footwear sole) to move freely inside the new outer compartment 500, which becomes a new compartment that is fixed to the footwear sole, rather that the conventional Nike Air™ bladder. The flexibility improvement allows the shoe sole to deform under a body weight load like a wearer's bare foot sole, so that stability is improved also, especially lateral stability.

The result is that the conventional, inner Nike Air™ compartment—now contained by a new outer compartment—can move easily within the overall footwear sole, allowing the sole to bend or flex more easily in parallel with the wearer's bare foot sole to deform to flatten under a body weight load, including during locomotion or standing, so that footwear sole stability is improved also, especially lateral stability. The extent to which the inner Nike Air™ compartment is "free-floating" within the new outer compartment can be controlled or tuned, for example, by one or more attachments (permanent or adjustable) to the outer compartment or by the media in the internal sipe.

The internal sipe 505 includes at least two surfaces that can move relative to each other to provide a flexibility increase for a footwear sole so that the shape of the footwear sole can deform under a body weight load to better parallel to the shape of the barefoot sole of a wearer under a same body weight load. The relative motion between the two internal sipe 505 surfaces increases the capability of the footwear sole to bend during locomotion under a wearer's body weight load to better parallel the shape of said wearer's bare foot sole.

In an analogous way, especially to the thicker heel portion of a typical shoe sole, a thick urban area telephone book has in effect hundreds of mostly "internal sipes", each page being in effect separated by a horizontal internal slit from each adjacent page, each of which thereby is able to move freely relative to each other, resulting in a flexible telephone book that bends quite easily, while at the same time relatively stable when a vertical force like body weight is applied.

In contrast, if the same wood fiber material with the same dimensions as a thick telephone book were formed instead into a single piece with no pages, like a solid particle board, it would be quite rigid.

If, instead, the sipes were rotated 90 degrees into vertical slits and open to the bottom, so that the spine of the telephone book is on top, those external sipes would also provide a substantial amount of flexibility, but at the cost of excessive instability when a vertical force like body weight is applied.

Also, the sliding motion between internal support surfaces within the shoe sole 28 allowed by internal sipe 505 in response to torsional or shear forces between a wearer's foot and the ground assists in controlling and absorbing the impact of those forces, whether sudden and excessive or chronically repetitive, thereby helping to protect the wearer's joints from acute or chronic injury, especially to the ankles, knees, hips, lower back, and spine.

A benefit of the siped compartments/chambers 510 is that, as a single unitary component, it can be used in any conventional manner in constructing the footwear sole 28, generally like that used with a conventional single layer compartment such as used in Nike Air™; i.e. the outer surface of 510 can, as a useful embodiment, adhere to the adjacent materials like plastic such as PU (polyurethane) or EVA (ethyl vinyl acetate) or other plastic or rubber of the footwear sole that contact the 510 component, just as would be the case with the outer surface of existing single compartment 161 or chamber 188 of commercial examples of Nike Air™. However, the internal sipe 505 formed by the use of an inner compartment/chamber 501 in the siped compartment/chamber 510 provides flexibility in a footwear sole 28 that is absent in the relatively rigid footwear sole 28 formed with a conventional, single layer compartment 161 or chamber 188 of the many Nike Air™ commercial examples.

The sipe surfaces can in one useful example embodiment be formed by the inner surface (or part or parts of it) of the outer compartment 500 and the outer surface (or part or parts of it) of the inner compartment 501. Such sipe surfaces can be substantially parallel and directly contact each other in one useful embodiment example, but the two surfaces are generally not attached to each other, so that the sipe surfaces can move relative to each other to facilitate a sliding motion between the two surfaces.

The sipe surfaces can be in other useful forms that allow portions of the surfaces to be proximate to each other in an unloaded condition, rather than contacting; such surfaces can make partial or full direct contact under a wearer's body weight load (which can vary from a fraction of a "g" to multiple "g" forces during locomotion) or remain somewhat separated; the amount of sipe surface area making direct contact can also vary with a wearer's body weight load. The sipes surfaces also may not be parallel or only partially parallel, such as the areas of direct surface contact or proximal surface contact.

To preclude the surfaces of the internal sipe 505 from directly contacting each other (whether loaded or unloaded), the sipe surfaces can include an internal sipe media 506 located between the surfaces to reduce friction by lubrication and increase relative motion and therefore flexibility. Useful example embodiments of the internal sipe media 506 include any useful material known in the art (or equivalent), such as a liquid like silicone as one example, a dry material like polytetrafluoroethylene as another example, or a gas like that used in Nike Air™ as a further example. The media 506 can be located in all of the sipe 505 or only part or parts, as shown in FIGS. 1-6.

The media 506 can be used to decrease (or increase) sliding resistance between the inner surfaces of the sipe; for example, to lubricate with any suitable material known in the art. The internal sipe media 506 is an optional feature.

The siped compartments/chambers 510 can be located anywhere in the footwear sole or orthotic or upper and can be used in other applications, including non-footwear applications where flexibility increases are useful). The siped compartments/chambers 510 can be made, for example, with any methods and materials common in the footwear arts or similar arts or equivalents, like those in various Nike Air™; see for example U.S. Pat. Nos. 4,183,156 and 4,219,945 to Rudy (which show fluid-filled bladder manufacturing through a flat sheet bonding technique), U.S. Pat. No. 5,353,459 to Potter et al. (which shows fluid-filled bladders manufactured through a blow-molding process), as well as U.S. Pat. No. 6,837,951 and FIGS. 12-16 of U.S. Pat. No. 6,846,534, all of which patents are herein incorporated by reference) or similar commercial examples like Reebok DMX™ compartments in its original form, as seen for example U.S. Pat. No. 6,845,573 (herein incorporated by reference), column 5, line 41 to column 6, line 9), or New Balance N-ergy™ (see for example FIG. 1 of WIPO Pub. No. WO 00/70981 A1, but note that, as a example, at least the initial production versions of the N-erny compartment can have less rigidity to allow better flexibility) or Asics Gel™ (many versions) compartments or future equivalents of any, or with less common materials, such as fibers described above incorporated into or on the surface of the material of the siped compartment/chambers 510, including either elastic fibers or inelastic fibers or a mix. The siped compartment/chambers 510 can be of any practical number in a footwear sole or any shape, of which useful example embodiments include regular geometric shapes or irregular shapes, including anthropomorphic or animal shapes; and the 510 number or shape can be symmetrical or asymmetrical, including between right and left footwear soles.

Figure 25A:
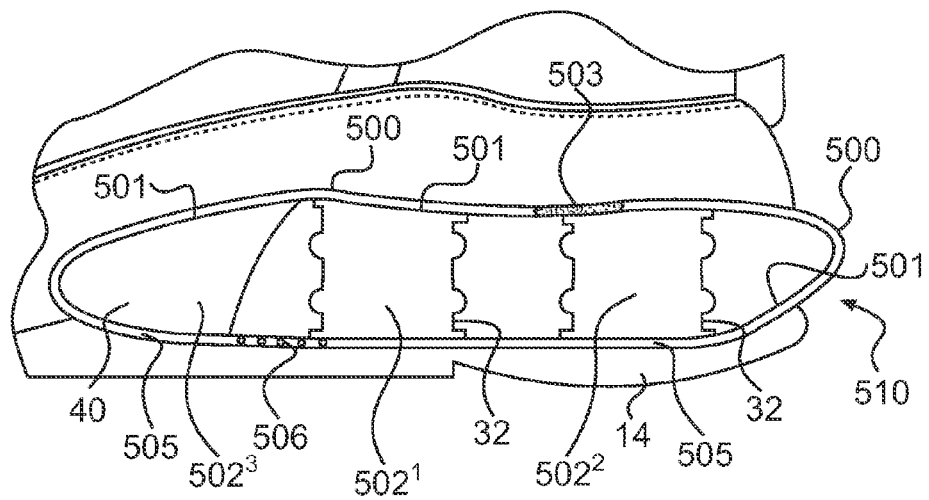
FIGS. 25A and 25B, as well as FIGS. 26A and 26B, show a heel section of a footwear sole or orthotic with an example of a flexible insert or component 510 using specific examples of the structural elements 502.
Figure 26A:
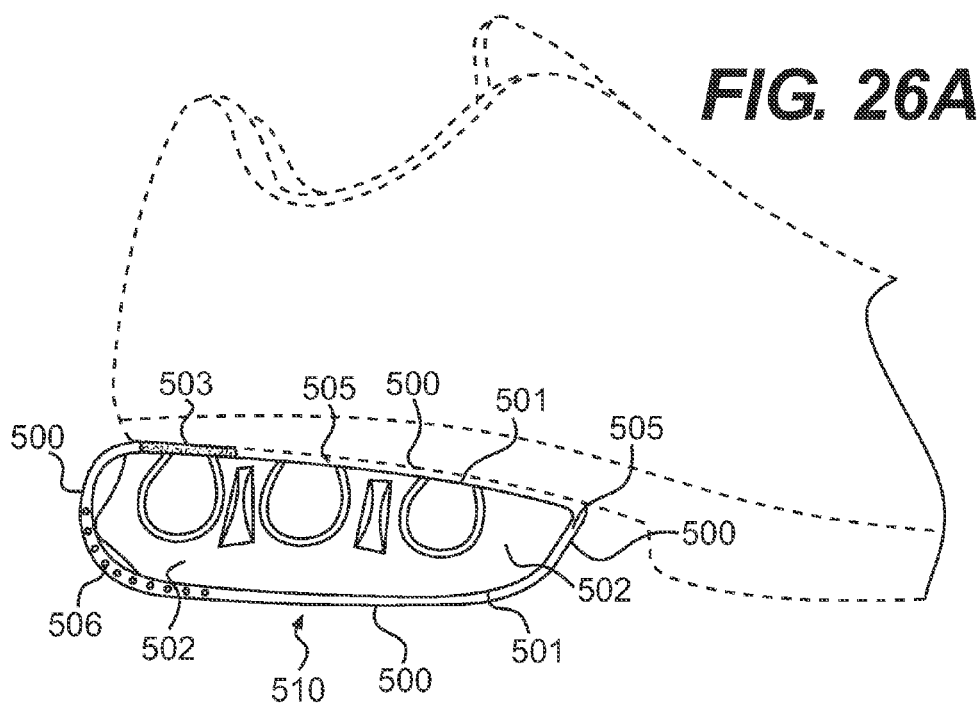

Either of the compartments 161 or chambers 188 of the siped compartment/chambers 510 (or 511 or 513) can include one or more structural elements 502 like those common in the footwear art such as in Nike Air™ as noted in the above cited Rudy and Nike patents, also including Tuned Air™ (See for example U.S. Pat. No. 5,976,451 to Skaja et al, which is herein incorporated by reference and which shows manufacturing of fluid-filled bladders through a vacuum-forming process) or Zoom Air™ (See for example FIGS. 1-3 of U.S. App. No. 2005/0039346 A1, which is herein incorporated by reference); a number of example embodiments of inner compartments 501 with structural elements 502 are shown in the FIGS. 1A, 9, 13, and 14. The structural elements 502 can be made of any useful material known in the art and constructed in any manner known in the art. FIGS. 25A and 26A show similar example embodiments wherein the structural elements 502 of the inner compartment 501 are formed with a specific shape and foamed plastic material such as PU or EVA like that of Nike Shox™ (See U.S. Pat. Nos. 5,353,523, 5,343,639, and 6,851,204, which are herein incorporated by reference) and Nike Impax™ (U.S. Pat. No. D500,585 S, which is herein incorporated by reference), respectively, and can be affixed to the inner compartment 501, which can be reinforced as necessary (instead of to rigid lower and/or upper plates); the lower surface of the outer compartment 500 can be attached to an outer sole, at least in part or an outer sole can be integrated into the outer compartment 500 by thickening, for example, or incorporating rubber or rubber substitute material. Other commercial existing examples that can be similarly modified as a device or flexible insert or component 510 (or 511 or 513) are Adidas a³™ Energy-Management Technology and Adidas Ground Control System (GPS)™, and Reebok DMX™ Shear Heel or other cushioning technologies.

Figure 25B:
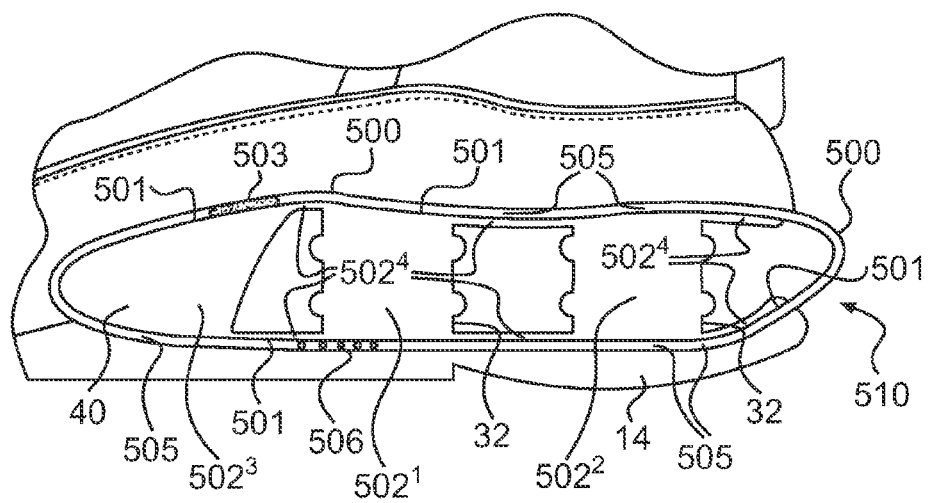
Figure 26B:
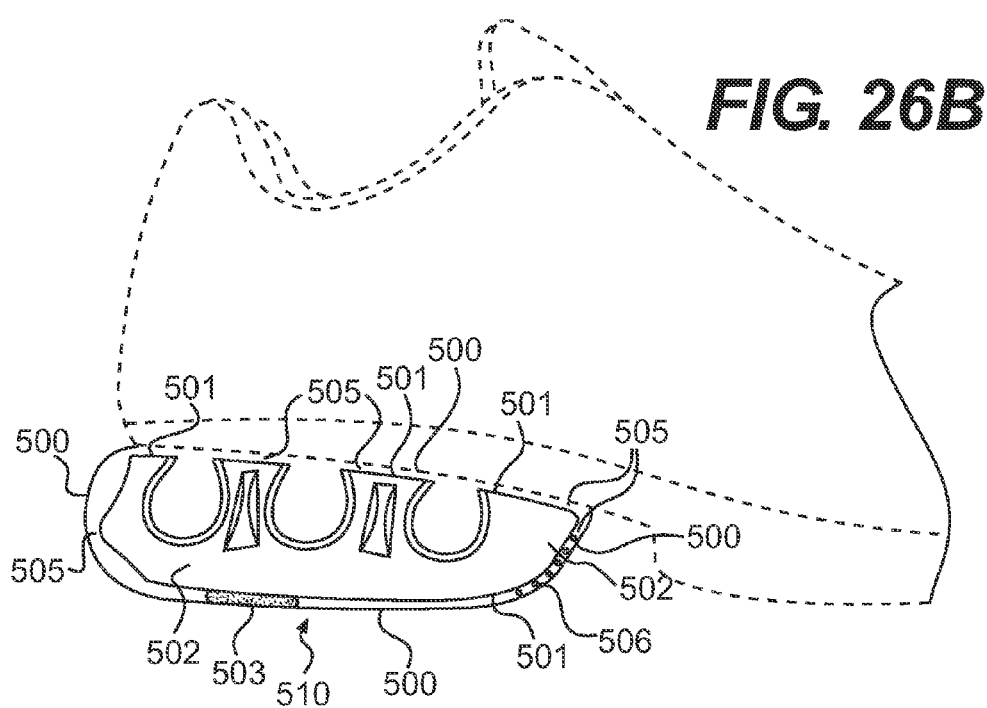

Also, as shown in the example embodiments of FIGS. 26B and 25B, since foamed plastic material does not require containment (unlike a gas, liquid, or most gels), if the structural elements 502 are sufficiently interconnected, like for example Nike Impax™ in FIG. 26B, or if the separate support columns 32 and midsole wedge 40 of Nike Shox™ are modified to interconnect like the example shown in FIG. 25B, then those connected structural elements 502 can form an integral inner compartment 501, the outer surface of which can form an internal sipe 505 with the new outer compartment 500. The interconnection can be complete, with each structural elements 502 connected to at least the closest other elements 502, as shown, or mostly complete, or partial. The Shox™ support columns 32 can be any practical number, such as existing examples of four or five or six (all commercially available) or more in the heel and many more in the forefoot of the shoe sole 22 or 28, for a total of eleven in existing commercial examples.

Any of the compartments or chambers 161/188 of the siped compartment 510 can be permanently or temporarily attached one to another with at least one attachment 503 of any useful shape or size or number or position; embodiment examples are shown in FIGS. 1A, 2A, 3A, 4A, 5A, 6A, and 8. Anthropomorphic designs would suggest including positioning attachments 503 on the internal sipe 505 closest to a wearer's foot sole as a useful embodiment, so that the remaining sipes 505 would have a U shape in cross-section, like the structure of human foot sole fat pads, which are analogous to the cushioning midsole and midsole components of footwear soles.

The attachments 503 can be simply passive (i.e. static) or actively controlled by electronic, mechanical, electromagnetic, or other useful means. The attachments 503 can, for example, be designed to break away as a failsafe feature to compensate for a predetermined extreme torsional load, for example, to reduce extreme stress on critical joints (in lieu of a wearer's cartilage, tendons, muscle, bone, or other body parts being damaged); the attachments 503 can then be reset or replaced (or, alternatively, return automatically upon relief of extreme stress to a normal position).

Example embodiments of the compartments and chambers 500/501 can include a media 504 such as a gas (like that used in Nike Air™ or ambient atmospheric air), a liquid or fluid, a gel, a foam (made of a plastic like PU or EVA, both of which are common in the footwear art, or equivalent, or of a rubber (natural or synthetic) or blown rubber or a rubber compound or equivalent or of another useful material or of a combination of two or more of the preceding foam plastic/rubber/etc.) or a useful combination of one or more gas, liquid, gel, foam, or other useful material.

Figure 75:
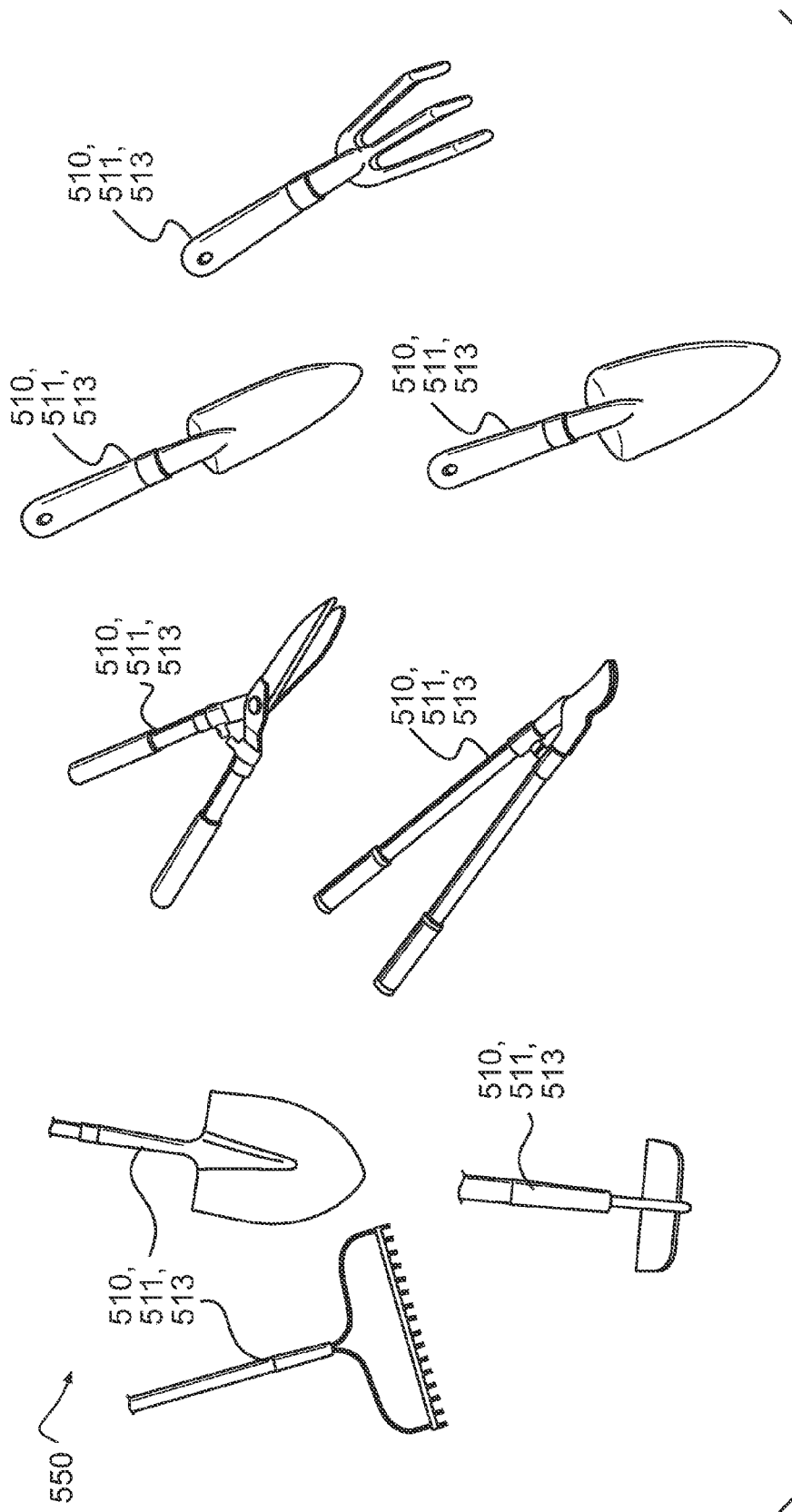
Figure 76:
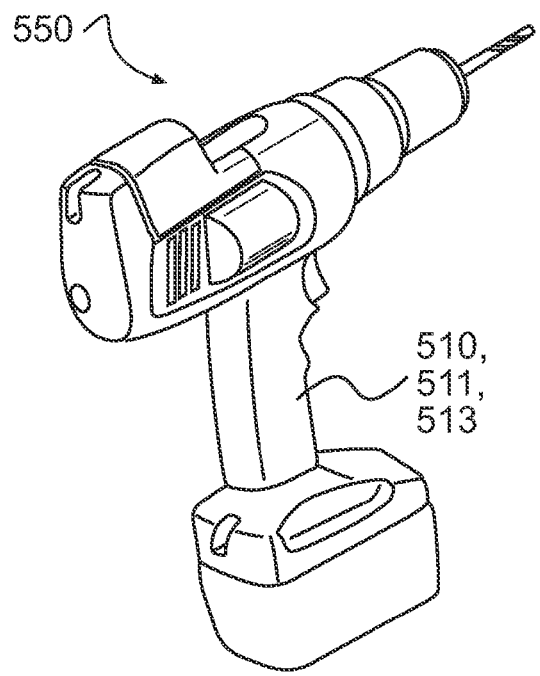
Figure 77:
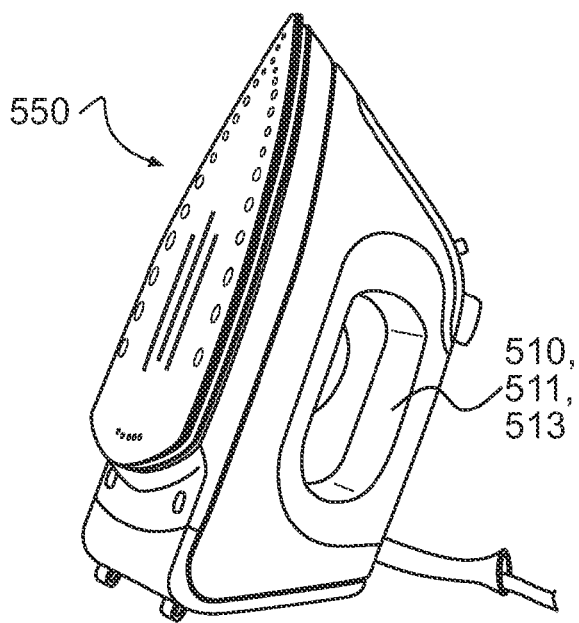
Figure 78:
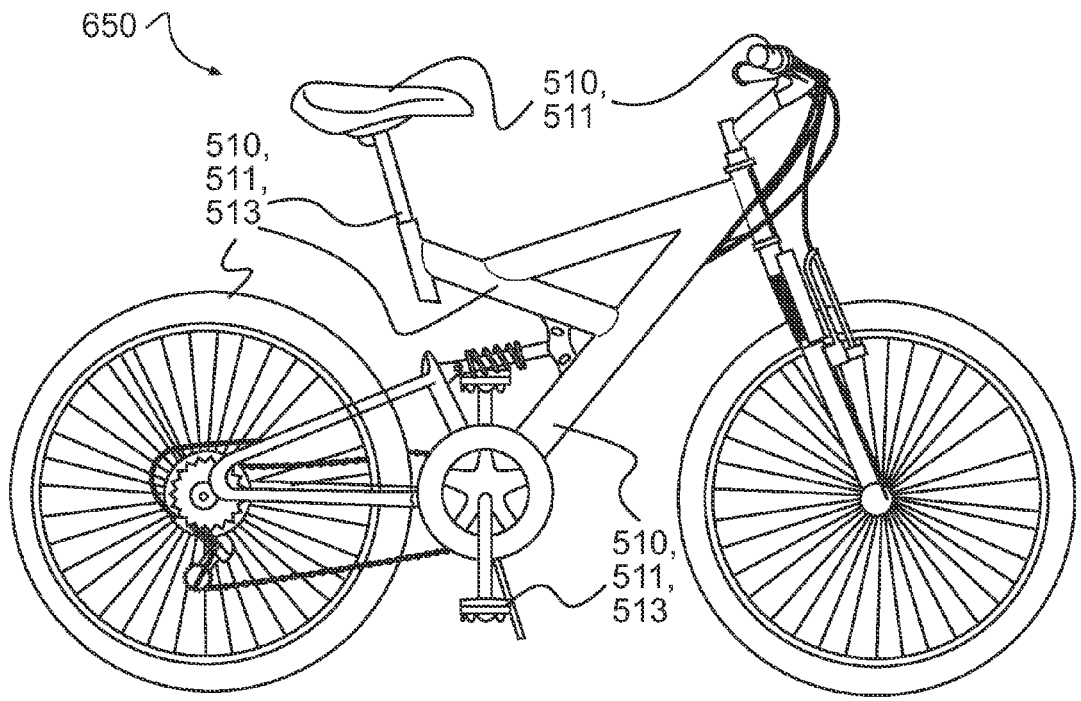

Also, any inventive combination that is not explicitly described above in the example shown in FIG. 1 is implicit in the overall invention of this application and, consequently, any part of the example embodiments shown in preceding FIG. 1 and/or associated textual specification can be combined with any other part of any one or more other elements of the invention or prior art examples described in FIGS. 2-79 and/or associated textual specification and/or, in addition, can be combined to make new and useful improvements over the existing art with any one or more other elements of the inventive or prior art examples shown in FIGS. 1-75 of both the applicant's prior footwear U.S. application Ser. No. 11/190, 087, published as Pub. No. 2005/0268487 A1 on Dec. 8, 2005, and the applicant's prior orthotic U.S. Pat. No. 7,010, 869, issued Mar. 14, 2006, as well as continuation U.S. application Ser. No. 11/108,034, published as Pub. No. 2005/0217142 A1 on Oct. 6, 2005, each of which is incorporated by reference herein for completeness of disclosure, as well as U.S. application Ser. No. 11/282,665 published as Publication No. US 2006/0248749 A1, on Nov. 9, 2006, which is also hereby explicitly incorporated by reference herein in its entirety for completeness of disclosure, as including additional FIGS. 76-80, 81A-81D and 82A-82C, any part or parts of which figure or figures can be combined with any part or parts of any figure or figures of this application. In addition, any one or more features or components of FIG. 1 and FIGS.

2-79 can be usefully combined with one or more features or components of FIGS. 1-43 of the applicant's earlier application Ser. No. 11/179,887 published as Publication No. US 2005/0241183 A1 on Nov. 3, 2005 describing footwear, which application is hereby incorporated by reference herein.

Figure 2A:
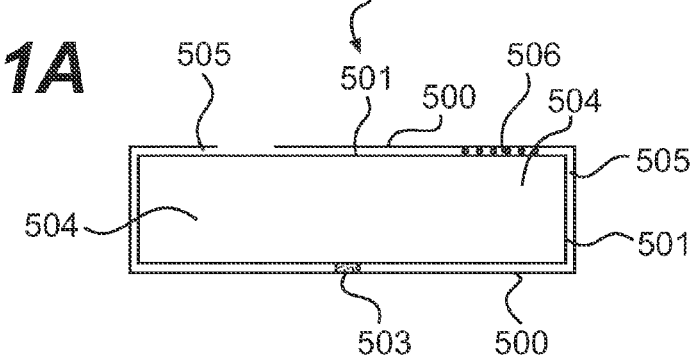
Figure 3A:
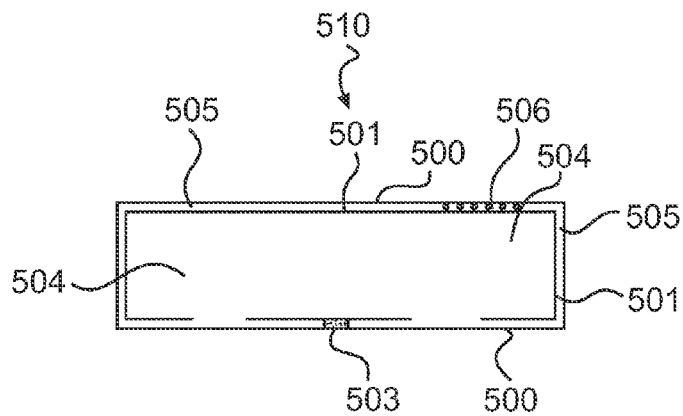
Figure 4A:
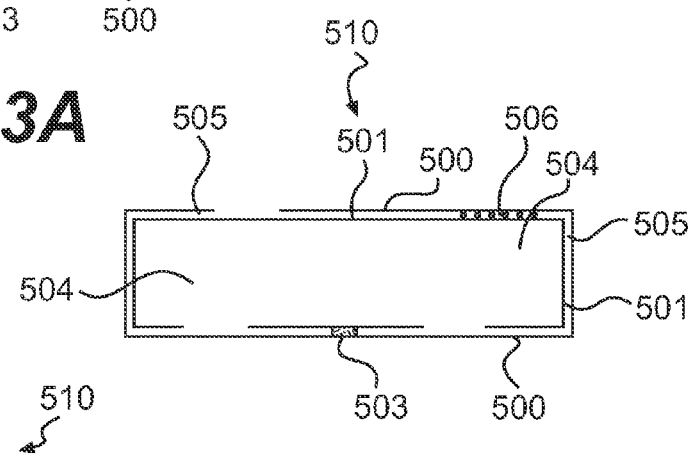
Figure 3B:
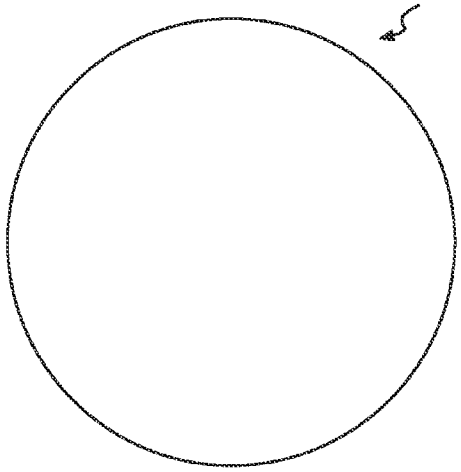
Figure 4B:
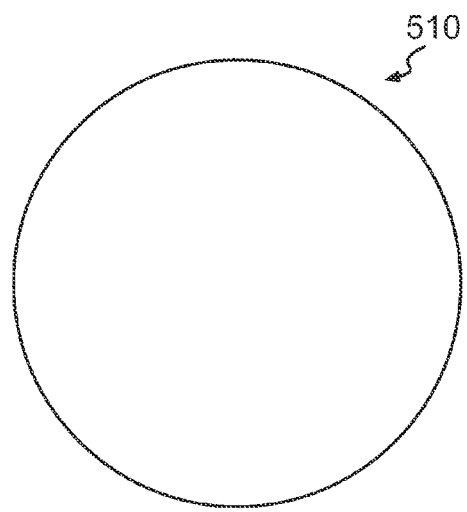

FIGS. 2A, 3A, and 4A show examples of embodiments of siped compartment/chamber/bladders 510 wherein either the inner compartment/chamber/bladder 501 or the outer compartment 500 can have one or more openings, for pressure equalization, assembly facilitation, or other purposes.

Also, any inventive combination that is not explicitly described above in the example shown in FIG. 2-4 is implicit in the overall invention of this application and, consequently, any part of the example embodiments shown in preceding FIG. 2-4 and/or associated textual specification can be combined with any other part of any one or more other elements of each other or the invention examples described in FIGS. 1 and 5-79 and/or associated textual specification, in addition, can be combined to make new and useful improvements over the existing art with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 5A:
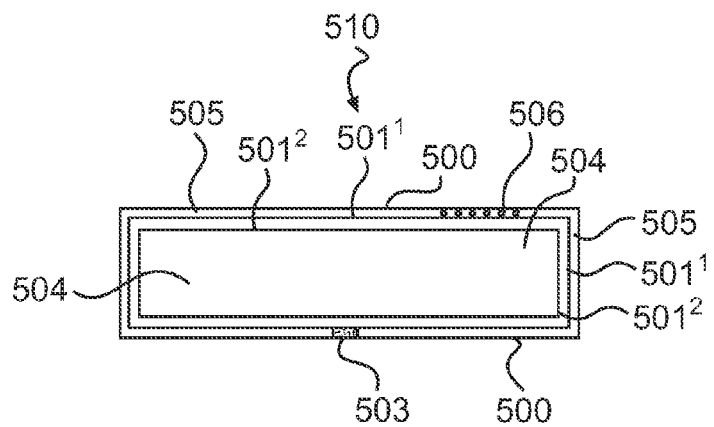

FIG. 5A shows an example embodiment with an inner compartment/chamber/bladder $501^1$ having a smaller inner compartment/chamber/bladder $501^2$; additional smaller inner compartments 501 are possible in a similar progression, either enclosed within the previous larger inner compartment 501 or within the same 501 or 500.

Figure 6A:
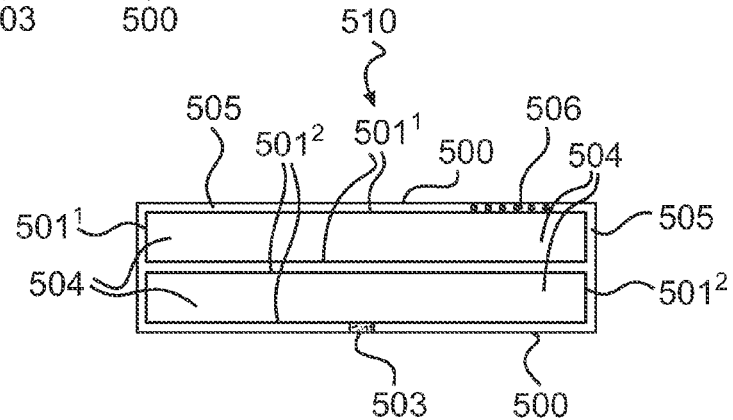
Figure 5B:
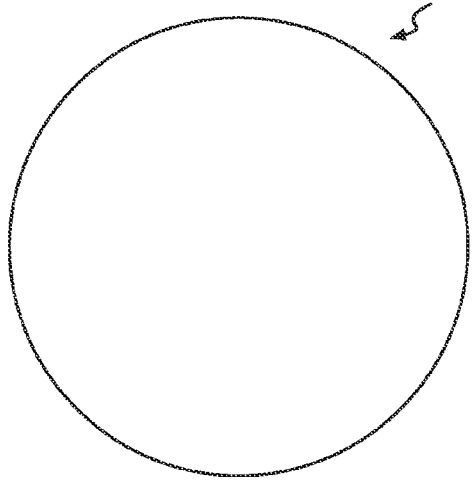
Figure 6B:
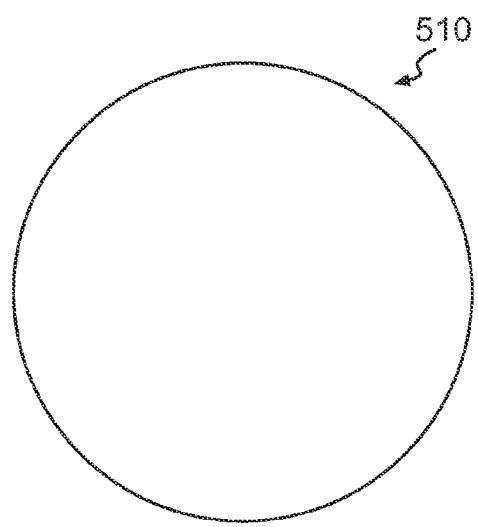

FIG. 6A shows an example embodiment with two inner compartment/chamber/bladders $501^1$ and $501^2$ which are layered within outer compartment/chamber/bladder 500; additional compartment/chamber 501 layers can be useful also.

FIGS. 1B, 2B, 3B, 4B, 5B and 6B show a top view of an example embodiment of the device 510 in a horizontal plane of FIGS. 1A, 2A, 3A, 4A, 5A, and 6A.

Figure 1C:
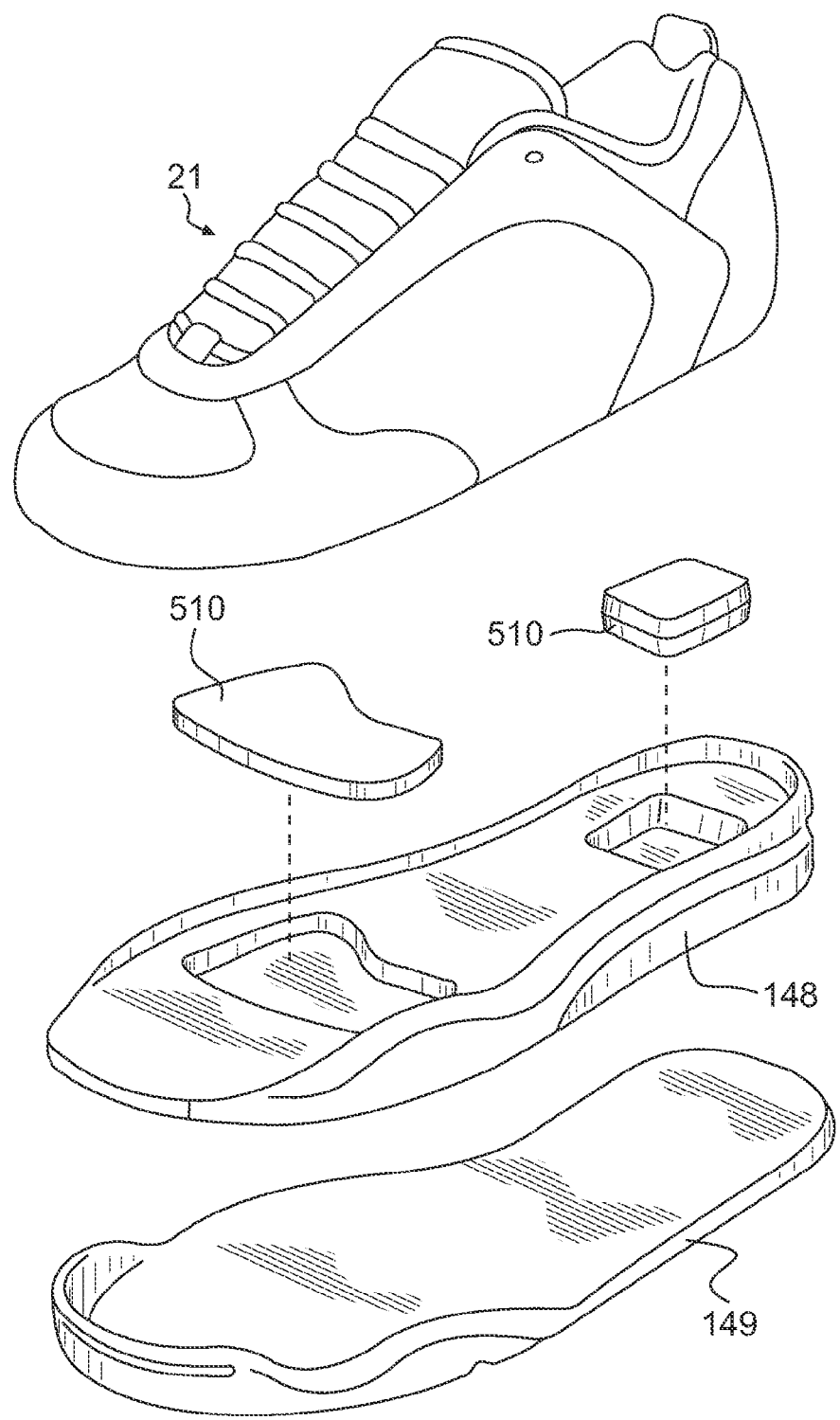
FIG. 1C is an exploded perspective view showing the relationship of an insert device 510, which has a siped compartment or chamber or bladder, with a midsole, bottom sole, and upper of a shoe or other footwear.

FIG. 1C is an exploded perspective view showing the relationship of an insert device 510, which has a siped compartment or chamber or bladder, with a midsole 148, bottom sole 149, and upper 21 of a shoe or any other footwear. The midsole 148 and bottom sole 149 (and any additional layers not shown) together form a shoe sole which can be any footwear sole, including any conventional sole 22 or any sole 28 according to one of the applicant's patents or applications. In the simple example shown, the device 510 can be inserted during a conventional manufacturing or assembly process or by a footwear wearer and can be located anywhere in the footwear sole and/or upper.

Figure 7:
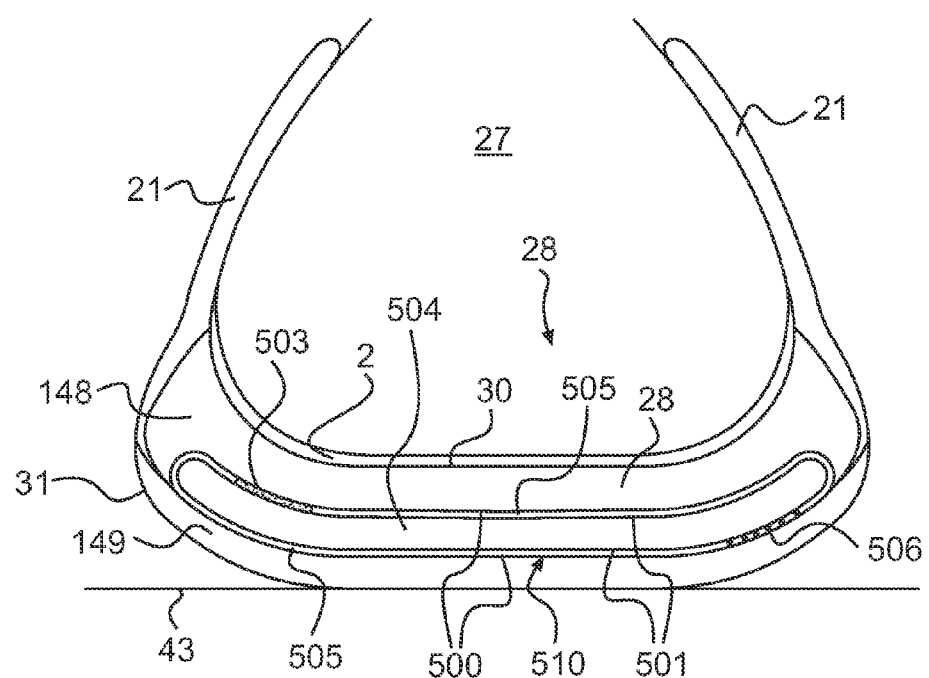

Also, any inventive combination that is not explicitly described above in the example shown in FIGS. 5-6 is implicit in the overall invention of this application and, consequently, any part of the example embodiments shown in preceding FIG. 5-6 and/or associated textual specification can be combined with any other part of any one or more other elements of the invention examples described in FIGS. 7-79 and/or associated textual specification and/or, in addition, can be combined to make new and useful improvements over the existing art with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

FIGS. 7-15 and 17 show, in frontal plane cross sections in the heel area, example footwear embodiments with siped compartment/chambers 510 located in footwear soles 28, which are shown with curved sides but which sides can also be planar in another embodiment; or which is shown with flattened inner and outer surfaces underneath the wearer's foot sole but which can be curved in a different embodiment.

FIG. 7 shows an example embodiment with single outer compartment 500 and a single inner compartment/chamber/bladder 501.

Figure 8:
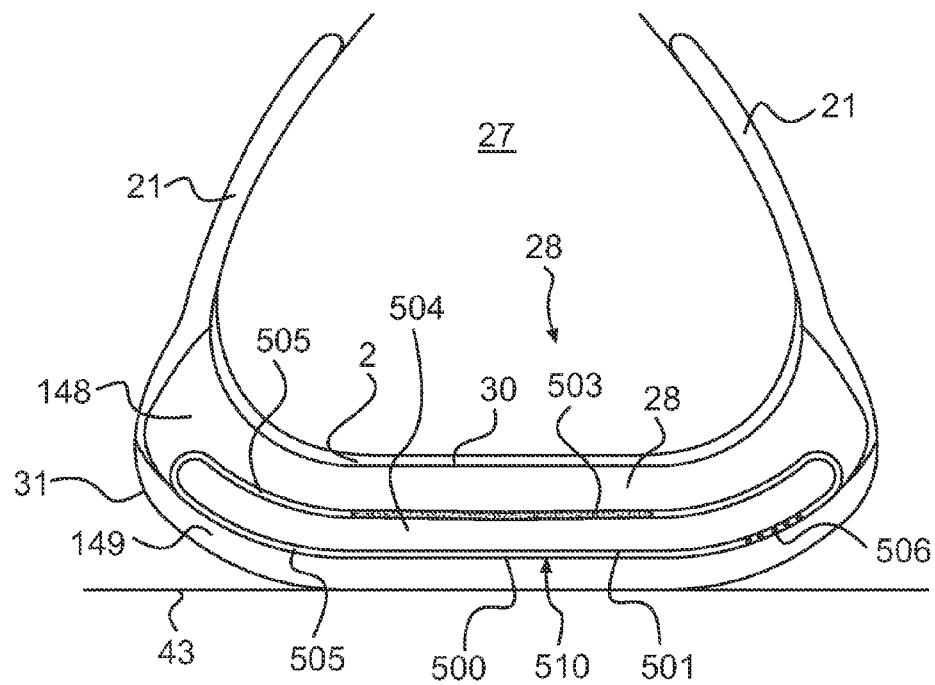

FIG. 8 shows a similar example embodiment with an attachment 503 between 500 and 501.

Figure 9:
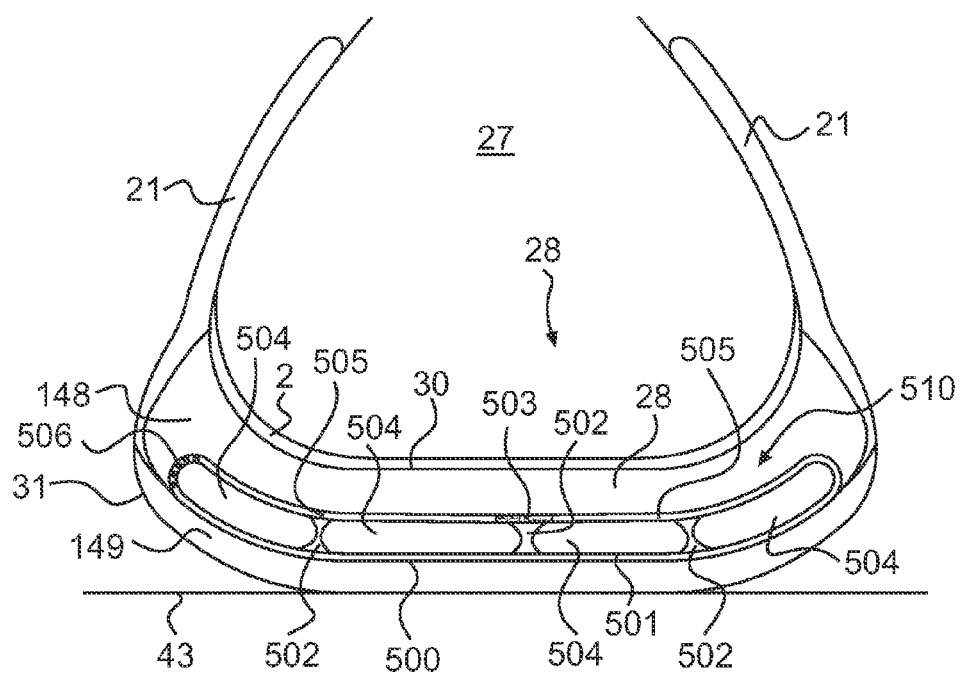

FIG. 9 is a similar example embodiment to that shown in FIG. 7 and includes also an inner compartment/chamber/bladder 501 with a number of structural elements 502.

Figure 10:
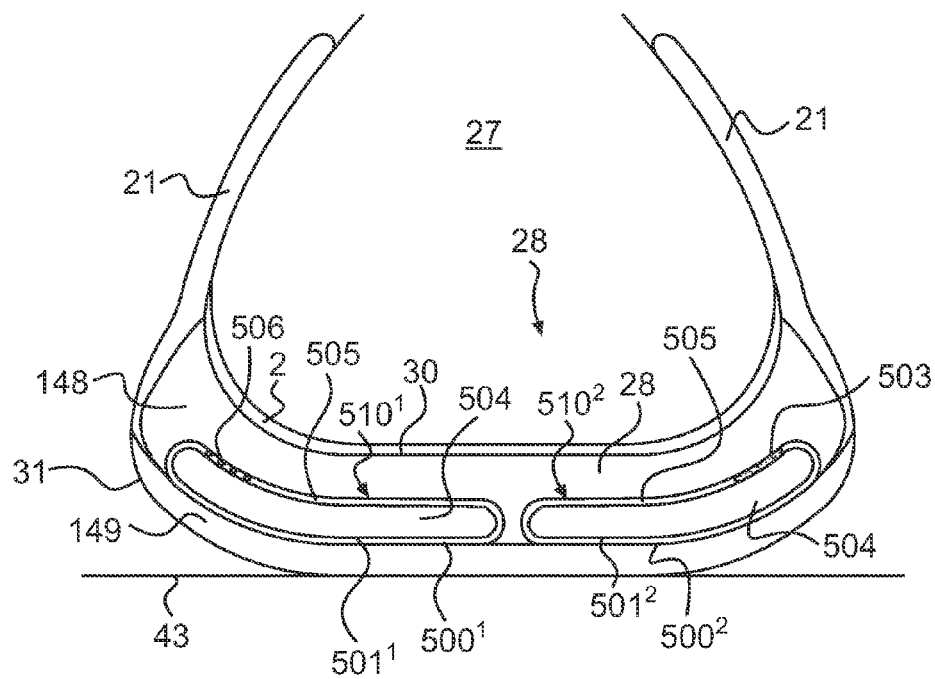

FIG. 10 shows an example embodiment with more than one siped compartment/chambers 510, including outer compartment/chamber/bladders 500, each with an inner compartment/chamber/bladder 501; not shown is another example embodiment with more than one inner compartments/chamber/bladders 501 in each of more than one outer compartment/chamber/bladder 500, another among many useful variations.

Also, any inventive combination that is not explicitly described above in the examples shown in FIGS. 8-10 is implicit in the overall invention of this application and, consequently, any part of the example embodiments shown in preceding FIGS. 8-10 and/or associated textual specification can be combined with any other part of any one or more other elements of each other or the invention or prior art examples described in FIGS. 1-7 and 11-79 and/or associated textual specification and/or, in addition, can be combined to make new and useful improvements over the existing art with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 11:
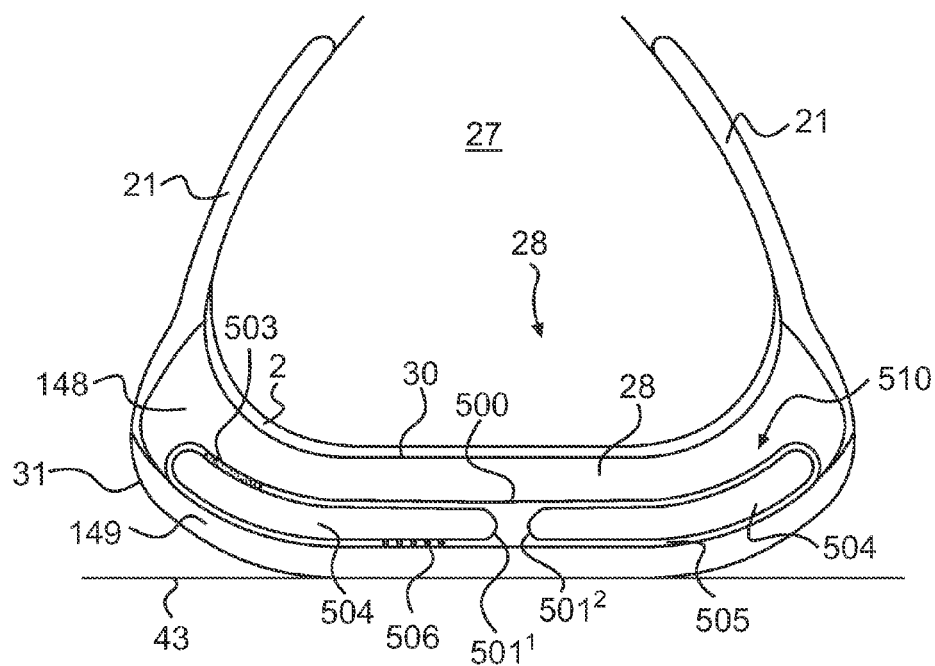
Figure 12:
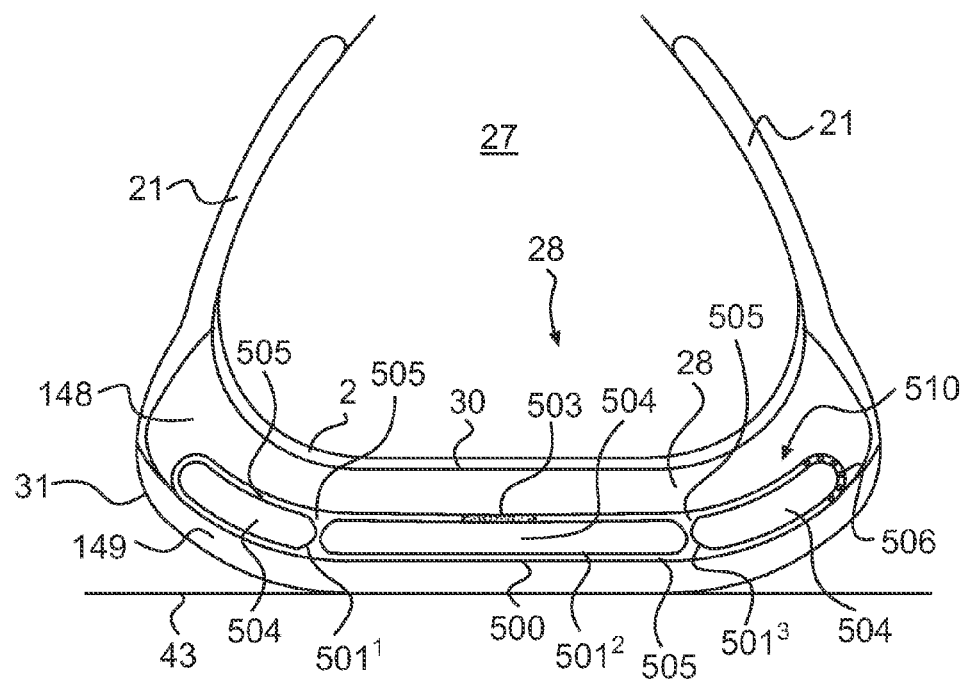

FIG. 11 shows a similar example embodiment to FIG. 7 and including a number of inner compartment/chamber/bladders 501 within a single outer compartment/chamber/bladder 500, as does FIG. 12. Any practical number of inner compartment/chamber/bladders 501 can be a useful embodiment of the general invention.

Also, any inventive combination that is not explicitly described above in the examples shown in FIGS. 7 and 11-12 is implicit in the overall invention of this application and, consequently, any part of the example embodiments shown in preceding FIGS. 7 and 11-12 and/or associated textual specification can be combined with any other part of any one or more other elements of each other or the invention or prior art examples described in FIGS. 1-6, 8-10, and 13-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 13:
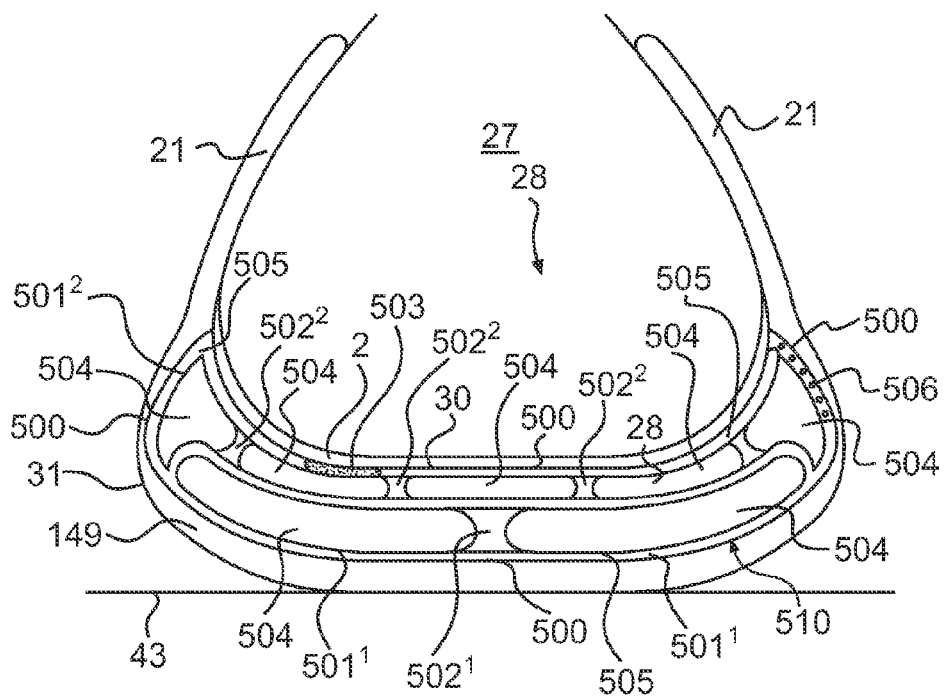
Figure 14:
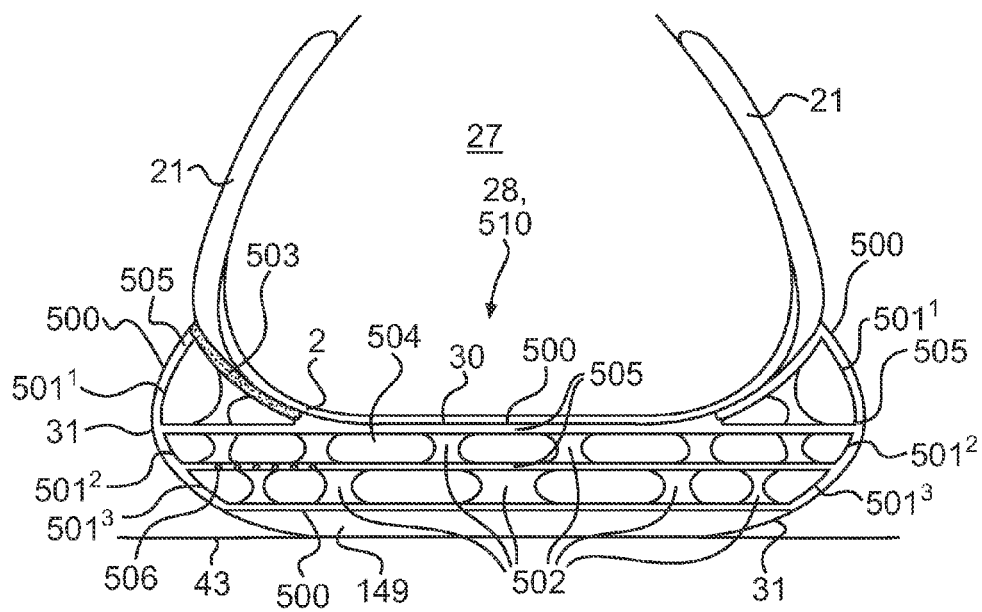

FIGS. 13 and 14 show example embodiments wherein the outer compartment/chamber/bladder 500 forms substantially all of the footwear sole, exclusive of the outer sole 149 in the example shown (but the insert 510 can form the outer surface of the footwear sole also). A heel cross-section is shown, but other sections of the sole, such as the forefoot or midfoot can employ this approach, either as separate components or each can be used alone or in combination with others or as substantially all of the sole 28. As shown, both FIGS. 13 and 14 example embodiments include multiple inner compartment/chamber/bladders 501 in layers.

Also, any inventive combination that is not explicitly described above in the examples shown in FIGS. 13-14 is implicit in the overall invention of this application and, consequently, any part of the example embodiments shown in preceding FIG. 13-14 and/or associated textual specification can be combined with any other part of any one or more other elements of each other or the invention or prior art examples described in FIGS. 1-12 and 15-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 15:
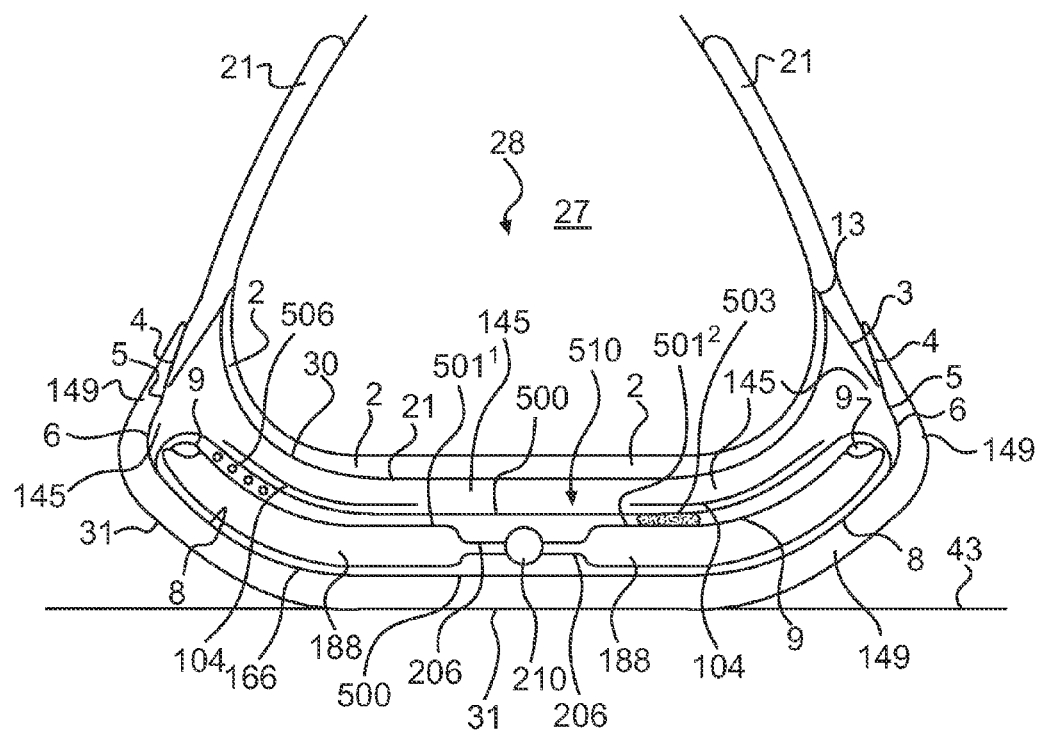

FIG. 15 shows a similar embodiment and view to that shown in FIG. 7, but also including the features of prior FIG. 11N of the '087 published application (now issued as U.S. Pat. No. 7,334,350 (hereinafter "the '350 patent") and '034 published application (as well as the Ser. No. 11/282,665 application published Nov. 9, 2006 as Pub. No. 2006/0248749 A1 incorporated by reference) and '869 patent incorporated by reference herein, with the siped compartment/chamber/bladder 510 applied to it.

FIG. 11N of the '350 patent or '869 patent shows shoe soles with one or more encapsulated midsole sections or chambers such as bladders 188 for containing fluid such as a gas, liquid, gel or other suitable materials, and with a duct and a flow regulator such as a fluid valve. FIG. 11N of the '350 patent or '869 patent also includes the inventor's concavely rounded sides as described elsewhere in the '350 patent or '869 patent, as well as a duct that communicates between encapsulated midsole sections or bladders 188 or within portions of the encapsulated midsole section chambers or bladders 188. The bladders 188 can be any size relative to the midsole encapsulating them, including replacing the encapsulating midsole 148 substantially or entirely. Other suitable conventional embodiments can also be used in combination with the applicant's concavely rounded portions.

FIG. 11N of the '350 patent or '869 patent shows an embodiment further comprising a removable midsole insert or insertable midsole orthotic 145. This simplified embodiment employs only two bladders 188, each of which extends from a concavely rounded side to the central portion. One significant advantage of this embodiment, besides improved lateral stability, is that the potentially most expensive component of the shoe sole, the removable midsole insert or insertable midsole orthotic 145, can be moved to other pairs of shoe upper/bottom soles, whether new or having a different style or function. Separate removable insoles can also be useful in this case, especially in changing from athletic shoes to dress shoes, for function and/or style.

Also, any inventive combination that is not explicitly described above in the example shown in FIG. 15 is implicit in the overall invention of this application and, consequently, any part of the example embodiments shown in preceding FIG. 15 and/or associated textual specification can be combined with any other part of any one or more other elements of the invention examples described in FIGS. 1-14 and 16-79 and/or associated textual specification and/or, in addition, can be combined with any one or more other elements of the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

FIG. 88 is a perspective view of the applicant's invention, including the control system 300, such as a microprocessor, and pressure-sensing circuitry 120, which can be located anywhere in the removable midsole insert or insertable midsole orthotic 145 shown, in order for the entire unit to be removable as a single piece, with placement in the shank shown proximate the main longitudinal arch of the wearer's foot shown in this figure, or alternatively, located elsewhere in the shoe, potentially with a wired or wireless connection and potentially separate means of attachment. The heel bladder 188 shown in FIG. 88 is similar to that shown in FIG. 11O of the '350 patent or '869 patent with both lateral and medial chambers. The embodiments shown in FIGS. 15 and 88 can also include the capability to function sufficiently rapidly to sense an unstable shoe sole condition such as, for example, that initiating a slip, trip, or fall, and to react to the unstable shoe condition in order to promote a stable or more stable shoe sole condition. In this manner, the system can attempt to prevent a fall or at least attempt to reduce associated injuries, for example, by rapidly reducing high point pressure in one zone of the shoe sole so that pressures in all zones are quickly equalized to restore the stability of the shoe sole.

The removable midsole insert or insertable midsole orthotic 145 of the present invention, for example as shown in FIGS. 15 and 88, can also be used in combination with, or to implement, one or more features shown in any other figures of U.S. Pat. No. 7,010,869. For example, the removable midsole insert or insertable midsole orthotic 145 of the present invention may replace all or any portion or portions of the various midsoles, insoles and bottom soles which are shown in the figures of the present application, and may be combined with the various other features described in reference to any of these figures in any of these forms.

The removable midsole insert or insertable midsole orthotic 145 shown in FIGS. 15 and 88 can be integrated into, or may replace an orthotic or other podiatric, orthopedic, corrective, therapeutic, prosthetic, prescriptive, or similar device for use inside the wearer's shoe. Such devices can be rigid, but flexible devices are preferred. A more conventional device such as an orthotic without concavely rounded sides or lower surface can be placed on top of the midsole, or between the midsole and an insole, on top of the midsole, or in any other suitable location. Other portions of the shoe sole may include the concavely rounded side or sides or underneath portions.

If the insertable midsole orthotic 145 of the '350 patent or the '869 patent is used to replace an orthotic, for example, then any of the features of an orthotic can be provided by an equivalent feature, structural support, cushioning or otherwise, in the removable midsole insert or insertable midsole orthotic 145. If a midsole is integrated with an insertable midsole orthotic 145, for example, then the midsole might be a mass-produced lower layer providing cushioning and support, as well as heel lift, while the insertable midsole orthotic 145 might be rounded to the exact shape of the individual wearer's foot and could provide other structural or functional corrections specific to the individual wearer. Alternatively, part of the correction might be made in the midsole, such as, for example, the provision of a medial side increase in material firmness to compensate for an individual wearer's excessive pronation.

The removable midsole insert 145 of the embodiment shown in FIG. 11N of the '350 patent can include its own integral upper or bootie, such as of elastic incorporating stretchable fabric, and its own outer sole for protection of the midsole and for traction, so that the removable midsole insert 145 can be worn, preferably indoors, without the shoe upper 21 and outer sole 149. Such a removable midsole insert 145 can still be inserted into the FIG. 11C upper and sole as described above for outdoor or other rigorous use.

Figure 16:
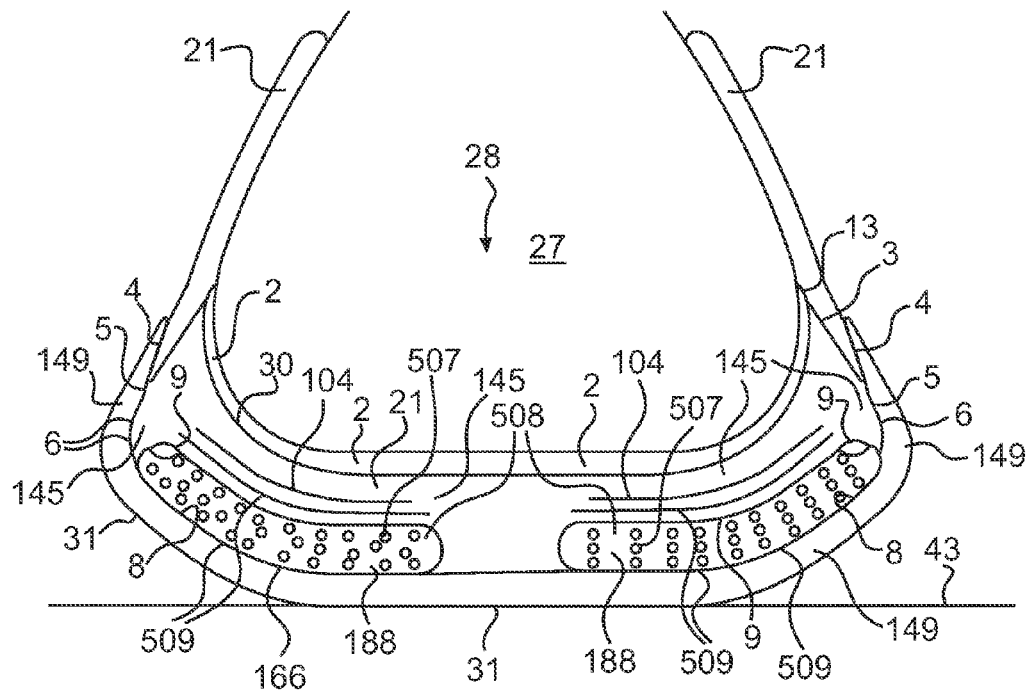

FIG. 16 shows an example embodiment of chambers 188 for any footwear soles, including conventional, or other flexibility uses with an electromagnetic shock absorption system similar to, for example, the Cadillac™ "Magnetic Ride Control" system, wherein magnetically sensitive metal particles 507 suspended in a shock absorbing fluid 508 are made less fluid in effect by controlling, on for example a millisecond basis, an electromagnetic field-creating circuit 509 that aligns the metal particles 507 into a flow resistant structure. The fluid 508 is thus a magnetorheological fluid, that is, a fluid which generally solidifies into a pasty consistency when subject to a magnetic field.

Figure 17A:
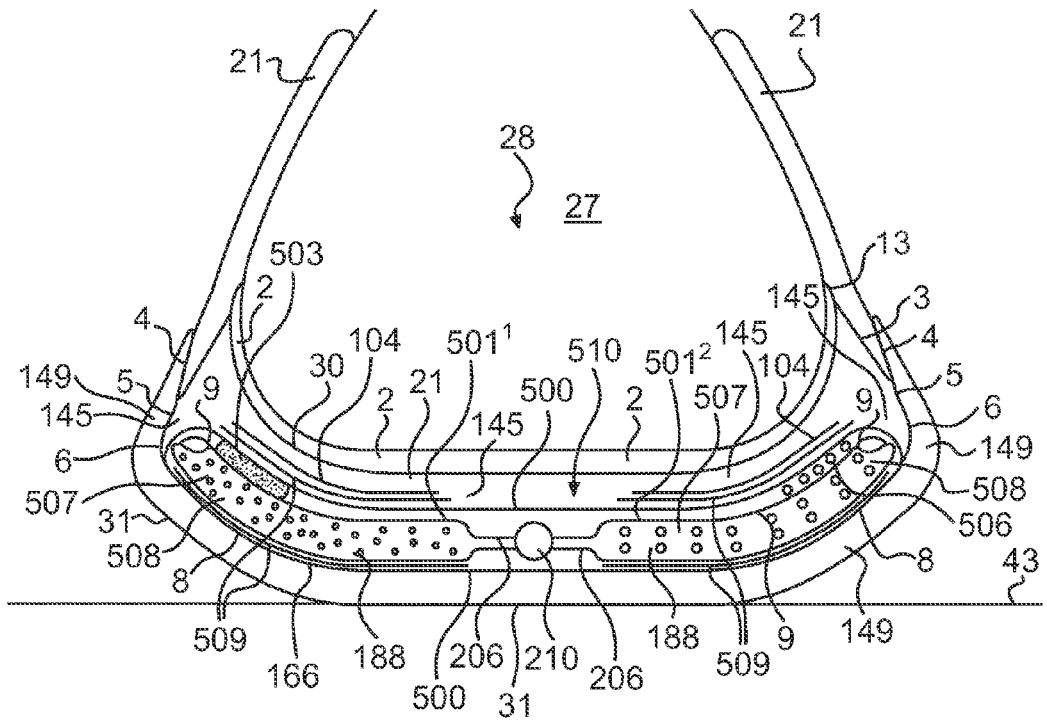
FIG. 17A shows a similar embodiment and view to that shown in FIG. 15, but including an electromagnetic shock absorption system.

FIG. 17A shows an example embodiment like FIG. 11N of applicant's incorporated published '087, '034 and '665 applications and '869 patent wherein the flow between chambers 188 is controlled by controlling the flow resistance of the fluid 508 by the circuit 509 located to affect the fluid 508 in one or more of the chambers 188; alternatively, the flow can be controlled by the circuit 509 being located between the chambers.

Figure 17B:
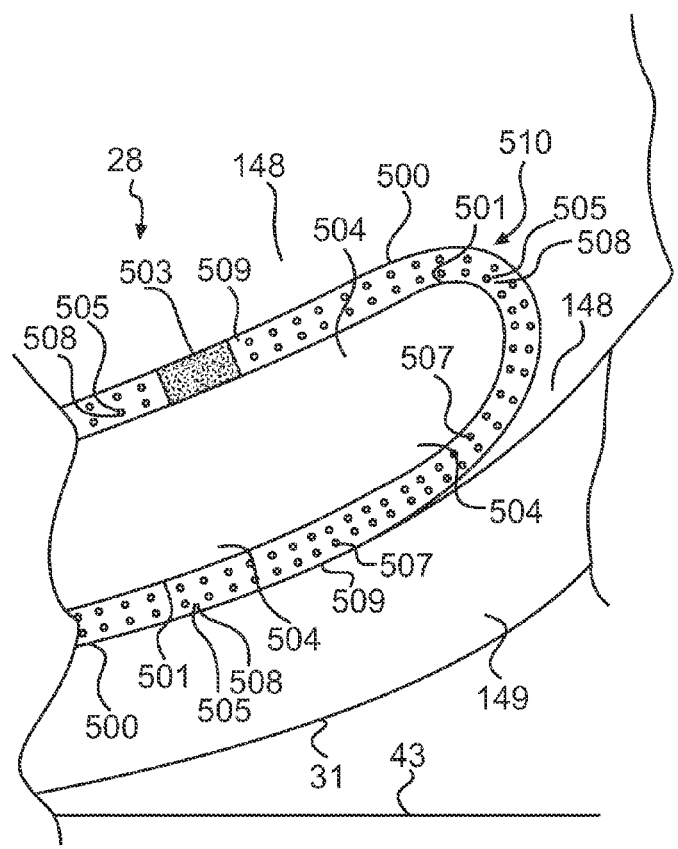
FIG. 17B is a close-up view of an embodiment like FIG. 7, but showing magnetorheological fluid 508 located within an internal sipe 505.

FIG. 17A shows a similar embodiment and view to that shown in FIG. 15, but including an electromagnetic shock absorption system. FIG. 17B is a close-up view of an embodiment like FIG. 7, but showing magnetorheological fluid 508 located within an internal sipe 505.

The FIG. 16-17 example embodiments can be located anywhere in the footwear sole (and can be used in other applications, including non-footwear applications where flexibility increases are useful). The FIG. 16-17 embodiments can be made with any materials common in the footwear art, like those in various Nike Air™ commercial examples, or future equivalents, or with less common materials, such as fibers described earlier, including either elastic fibers or inelastic fibers or a mix. The FIG. 16-17 example embodiments can be of any practical number in a footwear sole, or any shape, of which useful embodiments include regular geometric shapes or irregular shapes, including anthropomorphic shapes; and the number or shape can be symmetrical or asymmetrical, including between right and left footwear soles.

Also, any inventive combination that is not explicitly described above in the examples shown in FIGS. 16-17 is implicit in the overall invention of this application and, consequently, any part of the example embodiments shown in preceding FIG. 16-17 and/or associated textual specification can be combined with any other part of any one or more other elements of each other or the invention or prior art examples described in FIGS. 1-15 and 18-79 and/or associated textual specification and/or, in addition, can be combined with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

As shown in FIGS. 89A and 89B, the midsole insert 145 can include its own integral inner or secondary upper 21a, such as a bootie or slipper incorporating stretchable fabric, i.e. elastic or Spandex®, non-stretchable fabric or both, with typical attachment means such as laces, straps, Velcro® and zippers, or simply be a slip-on structure, like a slipper or loafer or pull-on boot.

FIGS. 89A and 89B also show the midsole insert 145 with its own thin outer sole 149a such as of rubber or other suitable, typical material for wear protection of the midsole and for traction, so that the midsole insert 145 can be worn indoors, for example, without the shoe upper 21 and outer sole 149, but can also be inserted into, for example, the FIG. 11C upper and sole for heavier use, such as walking outdoors or engaging in athletics. Separate components or an entire outer sole 149 can also be affixed directly to the midsole insert 145 with a sufficiently durable secondary upper 21a using conventional means for affixing it, such as the interface surface 8 of the outer soles 149 and 149a interlocking geometrically, as shown in FIGS. 11E and 11F, in conjunction with straps, or with straps alone, roughly in the manner of sandals. Similarly, all or part of the shoe upper 21 can be affixed through conventional means to the secondary shoe upper 21a, independently of the outer sole 149 or in combination with it.

FIGS. 89A-89C show an embodiment of an inner shoe in accordance with the present invention. FIG. 89A shows, in frontal plane cross section, an embodiment with a very thin coat of traction material such as latex rubber forming a secondary outer sole 149a which provides traction to prevent slipping and also protects the midsole insert 145 underneath from wear, and a lowtop slipper inner upper 21a. Such a latex rubber coat can be applied in a continuous manner over part or all of the outer surface of the secondary outer sole 149a or can be applied in a regular pattern, like dots or circles, as is typical to provide better grip for gloves, or can even be applied in a random pattern.

FIG. 89B shows, in frontal plane cross section, another embodiment with a secondary bottom or outer sole 149a of a rubber material that might be as thin as 1 millimeter, for example, to protect just that part of the midsole insert 145 which makes contact with the ground 43 when the intended wearer's foot is upright and therefore that midsole part which would wear most quickly due to a high level of ground contact. Other suitable outsole material can be used. Although not shown, the secondary outer sole 149a can extend part or all the way up either or both of the rounded shoe sole lateral and medial sides.

FIG. 89B also shows a lowtop slipper inner secondary upper 21a which can envelop all or a portion of the midsole sides, including joining with the secondary outer sole 149a, such as overlapping it on the inside between the midsole insert 145 and the outer sole 149a. FIG. 89A shows the secondary upper 21a connecting to the insole 2. The secondary upper 21a can also envelop the insole, although not shown.

FIG. 89C shows in close-up cross section the interface surface 8 between the bottom sole 149 and the secondary bottom sole 149a of the midsole insert 145. Direct contact, as shown of the rubber or rubber-like materials or 149 and 149a, provides an excellent means inside the shoe sole to prevent internal slipping due to shear forces at the interface surface 8, thereby increasing the stability of the shoe sole. Therefore, removal of typical materials other than those of 149 and 149a, such as board last material, increases stability. This can be accomplished by outright removal of a board last after the upper to which it is attached has been assembled on a last or assembling without a lasting board. Alternatively, by using a board last with holes or sections removed so that direct contact can occur at 149 and 149a; such holes or sections can be random or regular, including simply a very loose weave fabric, or can coincide with some or all of the essential support and propulsion elements of the foot.

In an advantageous embodiment, most or all of the corrective portion of the midsole insert 145, such as special shaping or increased density inserts to compensate for an individual wearer's structural defects, is located in the upper portion of the midsole insert 145 where it is accessible through the opening of the secondary upper 21a for alteration so that it can be modified to better compensate for defects based on testing and usage of the intended wearer.

In another advantageous embodiment, only this uppermost corrective portion is the midsole insert 145, while the lower portion of the midsole is fixed in a conventional manner in the shoe sole. Such an embodiment can still be constructed using the embodiments described above, including FIGS. 89A-89B, and the compartments with computer control mechanisms. The uppermost midsole insert 145 might include the relatively expensive computer microprocessor and associated memory, for example, which might communicate with the remaining portions of the compartment pressure controlling system using a wireless communication system.

Figure 18A:
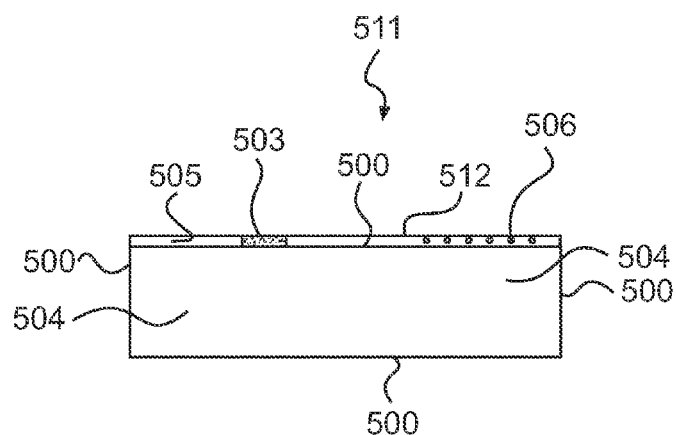
FIG. 18A shows, in a frontal or sagittal plane cross section, a flexible insert or component 511 including a single compartment/chamber 161/188 or bladder with an associated internal sipe 505 component.
Figure 18B:
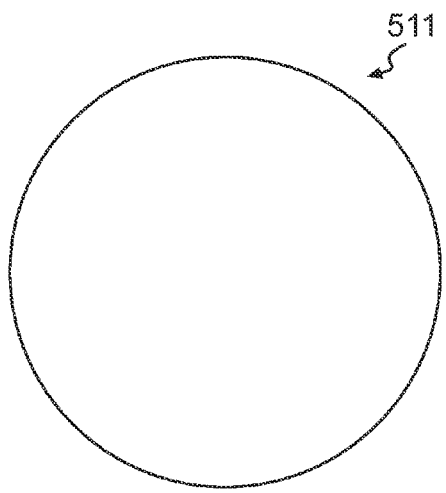
FIG. 18B shows a top horizontal plane view of flexible insert or component 511 of FIG. 18A.

FIG. 18 shows an example embodiment of a flexible insert or component 511 including a single compartment/chamber 161/188 or bladder with an associated internal sipe 505 component, again for any footwear sole, including conventional 22, or other flexibility uses (such as those described above relative to insert 510), to form a single unitary siped compartment or chamber; the sipe 505 can extend to part or all of one side of the single compartment 500, as shown, or the sipe 505 can extend around portions of the other sides of the single compartment/chamber/bladder 500; FIG. 18B shows an example embodiment in a horizontal plane view of 511. The flexible insert 511 can be inserted during assembly of an article by a maker or manufacturer or is insertable by a user or wearer (into an article like a shoe, for example, as part of a removable midsole insert described above), or integrated into the construction of an article as one or more components.

A benefit of the single siped compartment/chamber/bladder 511 is that, as a single unitary component like 510, it can be used in a conventional manner in constructing the footwear sole 28, like that used with a conventional single layer compartment in Nike Air™; i.e. the outer surface of 511 can, as a useful embodiment, adhere to the adjacent material of the footwear sole that contact the 511 component, just as would the outer surface of a single compartment 161 or chamber 188. However, the internal sipe 505 component of the siped compartment/chamber/bladder 511 provides flexibility in a footwear sole 28 that is absent in the relatively rigid footwear sole 28 formed with a conventional, single layer compartment 161 or chamber 188.

The siped compartments/chamber/bladder 511 can be located anywhere in the footwear sole (and can be used in other, non-footwear applications where flexibility increases are useful). The siped compartment/chamber/bladders 511 can be made with any materials common in the footwear art, like those in various Nike Air™ commercial examples, or future equivalents, or with less common materials, such as fibers described earlier, including either elastic fibers or inelastic fibers or a mix. The siped compartment/chamber/ bladders 511 can be of any practical number in a footwear sole, or any shape, of which useful embodiments include regular geometric shapes or irregular shapes, including anthropomorphic shapes; and the number or shape can be symmetrical or asymmetrical, including between right and left footwear soles.

Figure 18C:
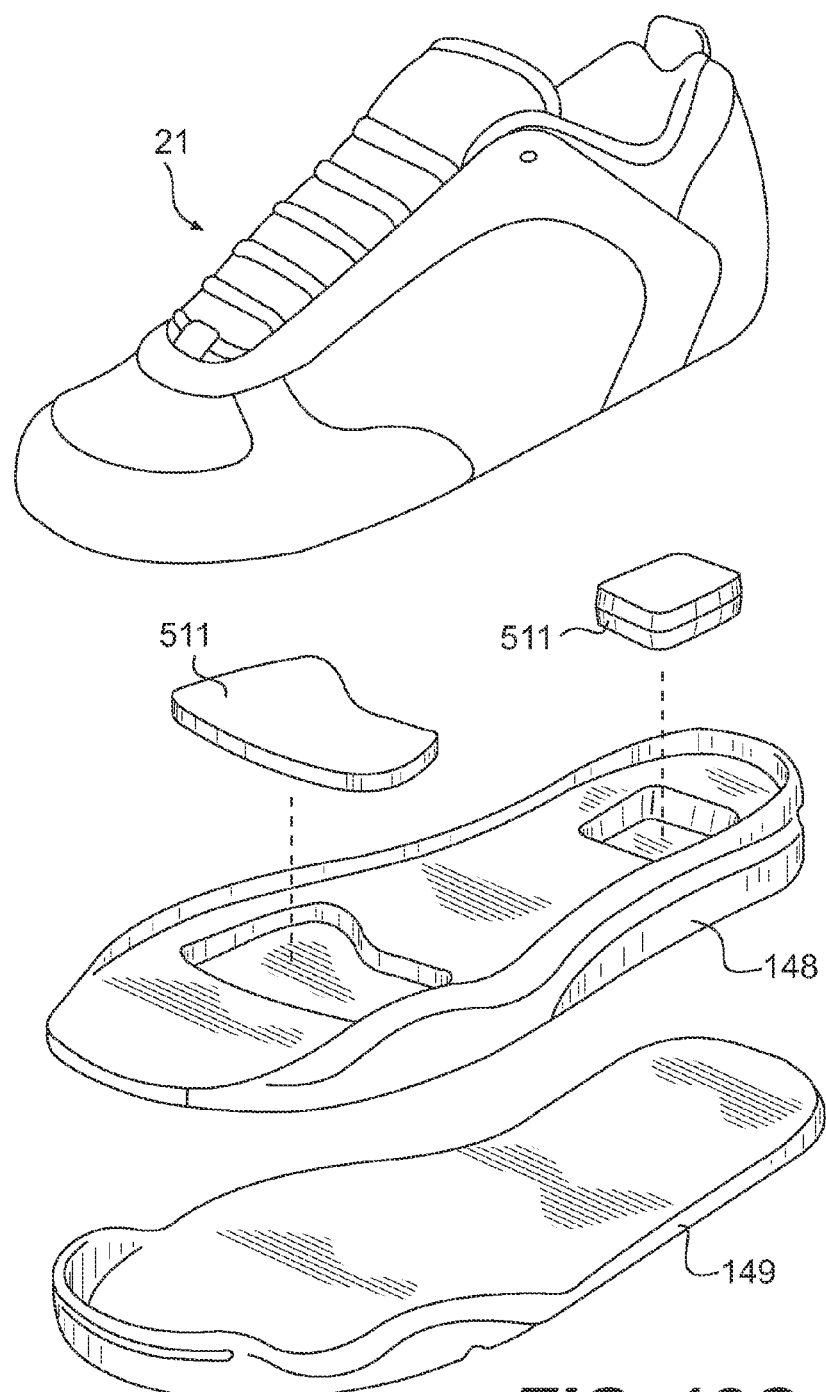
FIG. 18C is an exploded perspective view showing the relationship of an insert device 511, which has a compartment or chamber or bladder and an internal sipe, with a midsole, bottom sole, and upper of a shoe or other footwear.

FIG. 18C is an exploded perspective view showing the relationship of an insert device 511, which has a compartment or chamber or bladder and an internal sipe, with a midsole 148, bottom sole 149, and upper 21 of a shoe or any other footwear. The midsole 148 and bottom sole 149 (and any additional midsole or other layers not shown) together form a shoe sole which can be any footwear sole, including any conventional sole 22 or any sole 28 according to one of the applicant's patents or applications. In the simple example shown, the device 511 can be inserted during a conventional manufacturing or assembly process or by a footwear wearer and can be located anywhere in the footwear sole and/or upper.

Also, any inventive combination that is not explicitly described above in the example shown in FIG. 18 is implicit in the overall invention of this application and, consequently, any part of the example embodiments shown in preceding FIG. 18 and/or associated textual specification can be combined with any other part of any one or more other elements of the invention examples described in FIGS. 1-17 and 19-79 and/or associated textual specification and/or, in addition, can be combined usefully with any one or more other elements of each other or the inventive or prior art examples shown prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 19A:
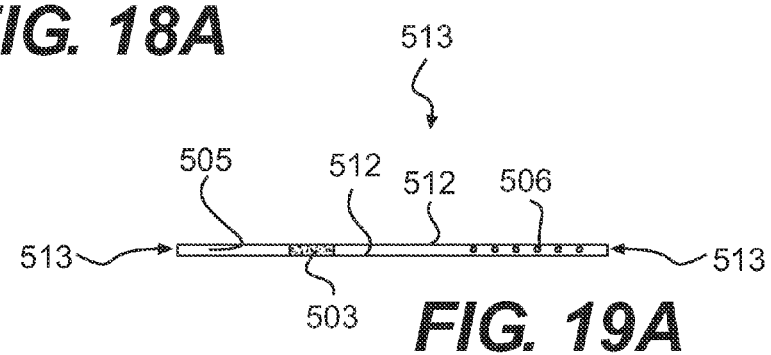
FIG. 19A shows, in frontal or sagittal plane cross section, a flexible insert or component 513 forming a unitary internal sipe.
Figure 19B:
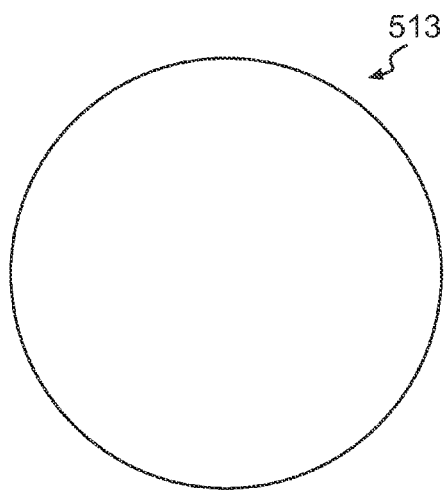
FIG. 19B is a top horizontal plane view of flexible insert or component 513 of FIG. 19A.

FIG. 19A shows an example embodiment of a flexible insert or component 513 forming a unitary internal sipe for any footwear sole or orthotic or upper, including conventional sole 22, or other flexibility uses (such as those described above relative to insert 510), the embodiment shown employing a single internal flexibility sipe 505 in the form of a slit; FIG. 19B shows an example embodiment in a horizontal plane view of FIGS. 19A, 20A, and 21A. Multiple unitary internal sipes 513 can be used independently or synergistically anywhere in a footwear sole in other useful embodiments not shown; the sipes 513 can be stacked proximate to one another or apart, as viewed in a frontal or sagittal plane, for example; or the sipes 513 can overlap, as viewed in a horizontal plane, for example. The flexible insert 513 can be inserted during assembly of an article by a maker or manufacturer or is insertable by a user or wearer (into an article like a shoe, for example, as part of a removable midsole insert described above), or integrated into the construction of an article as one or more components.

In one useful example embodiment, the unitary internal sipe 513 can be made as a separate sole component like an extremely thin conventional gas compartment similar to a Nike Air™ compartment, but without the typical internal compartment structures (which in another useful embodiment can be present in some form if unattached to at least one inner surface so that relative motion between inner surfaces can occur to provide increased flexibility).

A benefit of the unitary internal sipe 513 is that, as a single insertable unitary component like 510 and 511, it can be used in a conventional manner in constructing the footwear sole 28, roughly like that used with a conventional single layer compartment in Nike Air™; i.e. the outer surface of 513 can, as a useful embodiment, adhere to the other portions of the footwear sole that contact the 513 component, just as would the outer surface of a single compartment 161 or chamber 188.

The unitary internal sipe 513 can be located as a separate component anywhere in the footwear sole (and can be used in other applications, including non-footwear applications where flexibility increases are useful). The insertable unitary internal sipe 513 can be made with any materials common in the footwear art, like those in various Nike Air™ commercial examples, or future equivalents, or with less common materials, such as fibers described earlier, including either elastic fibers or inelastic fibers or a mix. The unitary internal sipe 513 can be of any practical number in a footwear sole, or any shape, of which useful example embodiments include regular geometric shapes or irregular shapes, including anthropomorphic shapes; and the number or shape can be symmetrical or asymmetrical, including between right and left footwear soles.

Figure 19C:
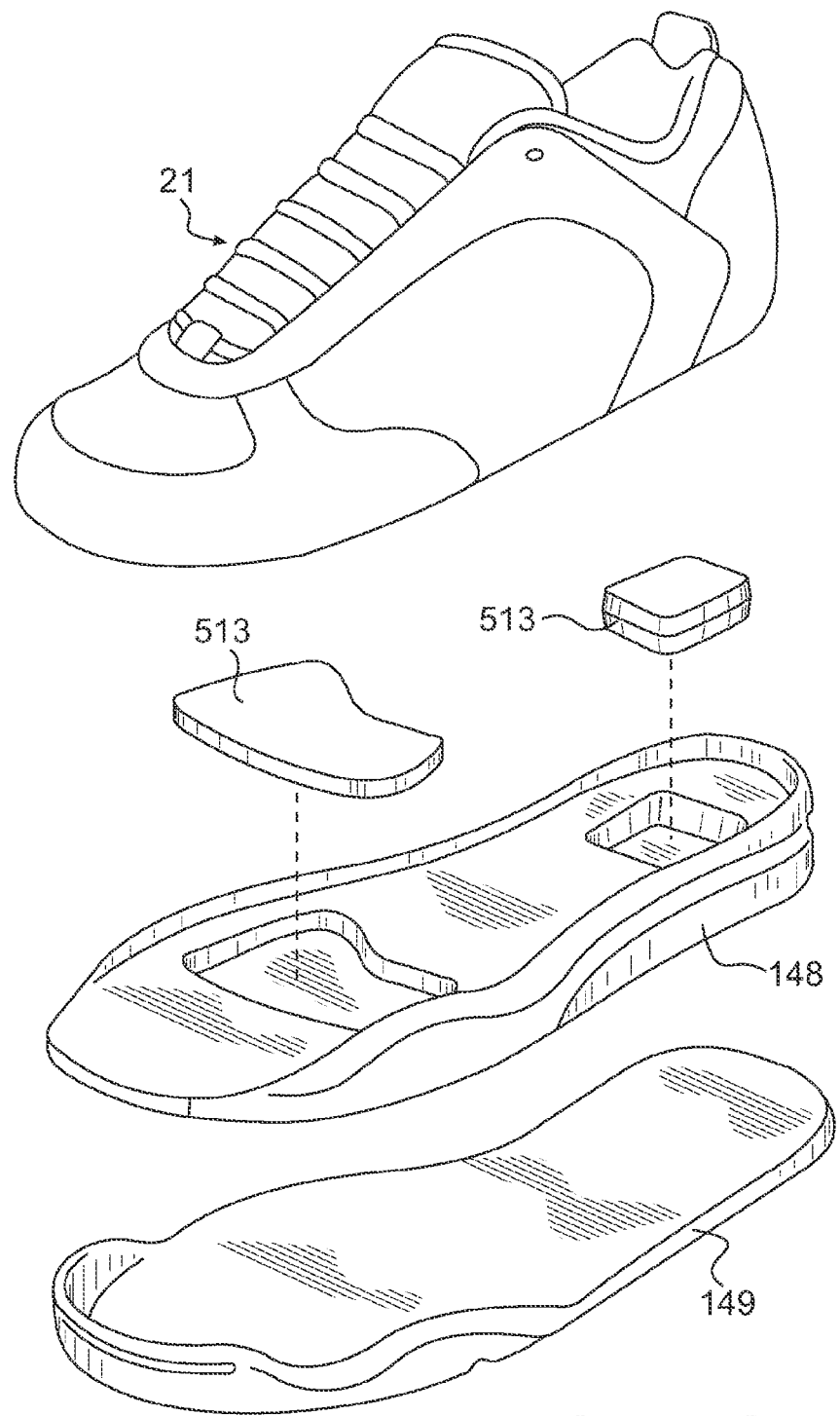
FIG. 19C is an exploded perspective view showing the relationship of an insert device 513, which can be a thin compartment or chamber or bladder forming an internal sipe such as a slit, with a midsole, bottom sole, and upper of a shoe or other footwear.

FIG. 19C is an exploded perspective view showing the relationship of an insert device 513, which can be a thin compartment or chamber or bladder forming an internal sipe such as a slit, with a midsole 148, bottom sole 149, and upper 21 of a shoe or any other footwear. The midsole 148 and bottom sole 149 (and any additional midsole or other layers not shown) together form a shoe sole which can be any footwear sole, including any conventional sole 22 or any sole 28 according to one of the applicant's patents or applications. In the simple example shown, the device 513 can be inserted during a conventional manufacturing or assembly process or by a footwear wearer and can be located anywhere in the footwear sole and/or upper.

Figure 20A:
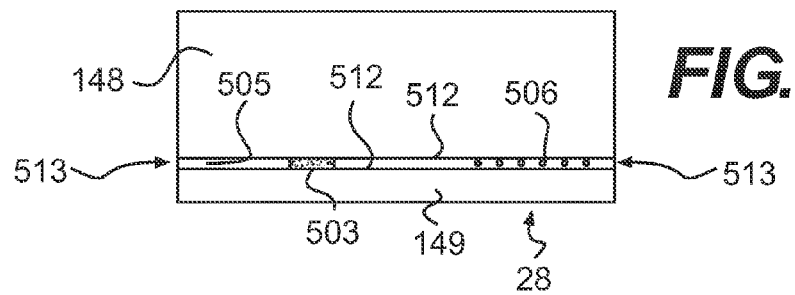
FIG. 20A shows, in frontal or sagittal plane cross section, the FIG. 19A embodiment of a unitary internal sipe 513 position as a separate component in a footwear sole.

FIG. 20A shows the FIG. 19A example embodiment of a unitary internal sipe 513 positioned as a separate component in an embodiment of a footwear sole 28; alternatively, in another example embodiment not shown, the unitary internal sipe 513 can be completely enclosed in conventional midsole material like PU or EVA or similar material.

Figure 20B:
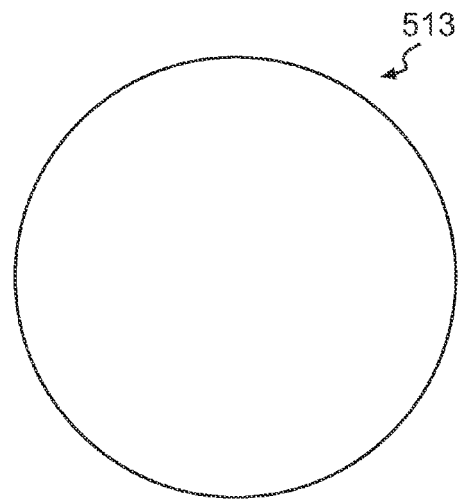
FIG. 20B is like FIG. 19B and thus shows a top horizontal plane view of flexible insert or component 513 of FIG. 20A.
Figure 20C:
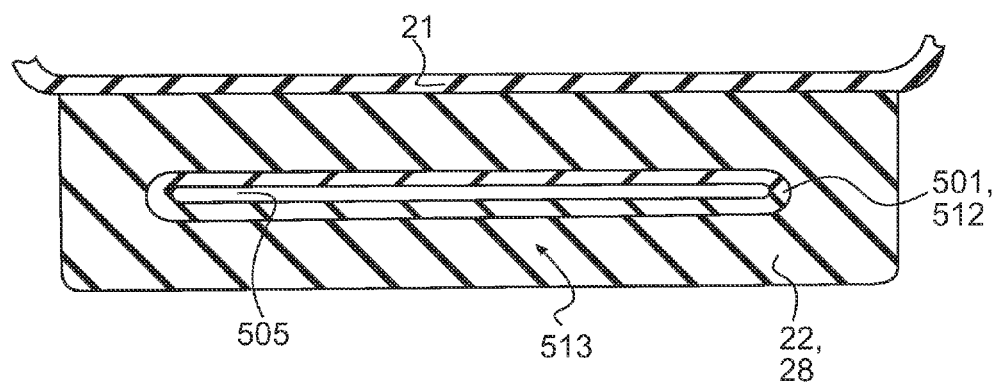
FIG. 20C shows a frontal plane cross section of an insert device 513 as a thin compartment or chamber or bladder forming an internal sipe such as a slit, the device being located in a footwear sole.

FIG. 20C shows a frontal plane cross section of an insert device 513 as a thin compartment or chamber or bladder 501 (or walls 512) forming an internal sipe 505 such as a slit that is located in any footwear sole, including any conventional sole 22 or any sole 28 according to one of the applicant's patents or applications; the sole example shown is a single piece, but can include any number of layers (including for example multiple midsole or other layers), at least including a midsole 148 and outsole 149.

Figure 21A:
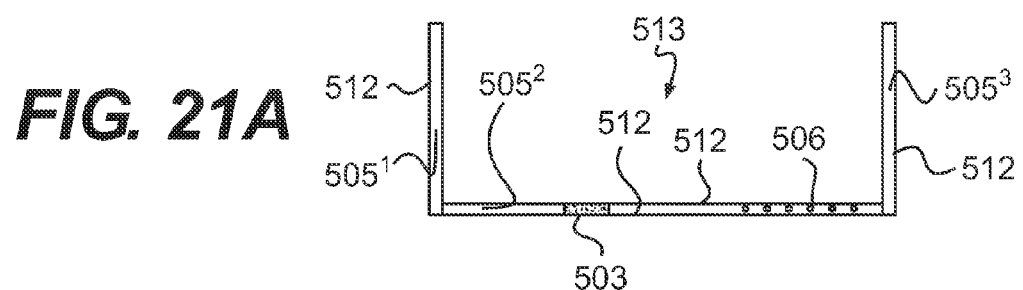
FIG. 21A shows, in frontal or sagittal plane cross section, the unitary internal sipe 513 in an embodiment including three separate internal flexibility sipes 505.
Figure 21B:
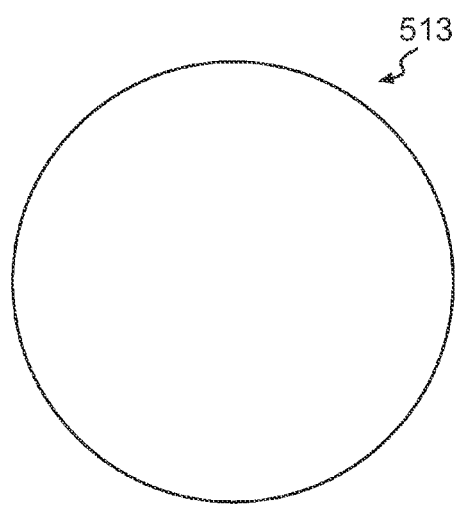
FIG. 21B is like FIG. 19B and thus shows a top horizontal plane view of flexible insert or component 513 of FIG. 21A.

FIG. 21A shows the unitary internal sipe 513 in an example embodiment including three separate internal flexibility sipes 505, which in one embodiment can be completely enclosed in conventional midsole material such as PU or EVA or similar material. Generally, unitary internal sipes 513 can thus be subdivided into any practical number of smaller unitary internal sipes that are aggregated together (or can be positioned alone, as described earlier).

Also, any inventive combination that is not explicitly described above in the examples shown in FIGS. 19-20 is implicit in the overall invention of this application and, consequently, any part of the example embodiments shown in preceding FIGS. 19-20 and/or associated textual specification can be combined with any other part of any one or more other elements of each other or the invention or prior art examples described in FIGS. 1-18 and 21-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 22:
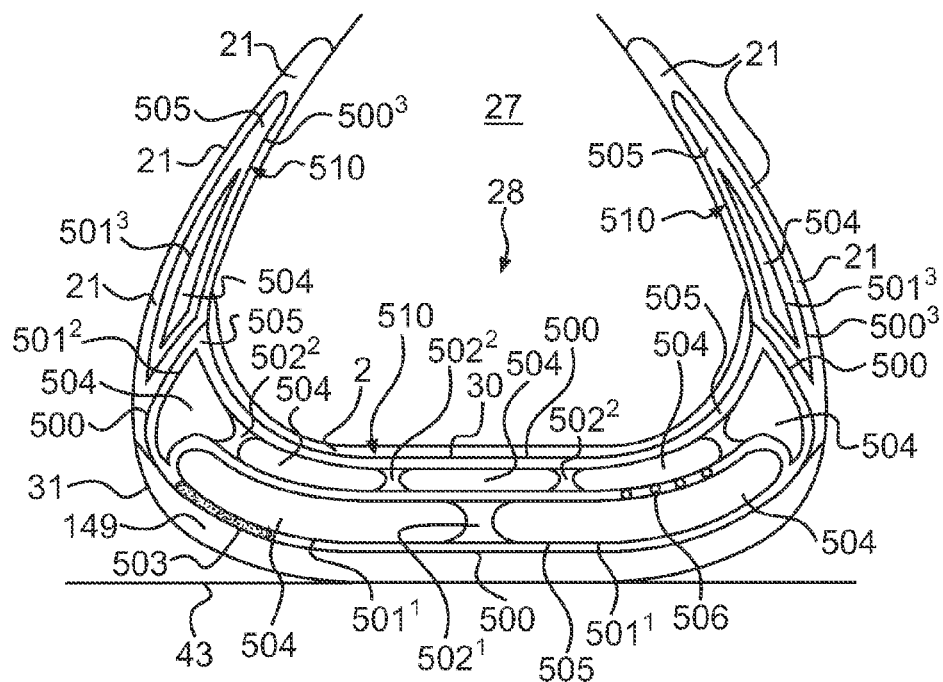

FIG. 22 shows an example embodiment of a flexible insert or component 510 with siped compartment/chamber/bladders used in the footwear upper 21 for use in embodiments like the Reebok Pump™ and Pump 2.0™; the flexible insert or component 510 can be positioned anywhere in upper 21, including an orthotic; 511 and 513 can be used also.

Figure 23:
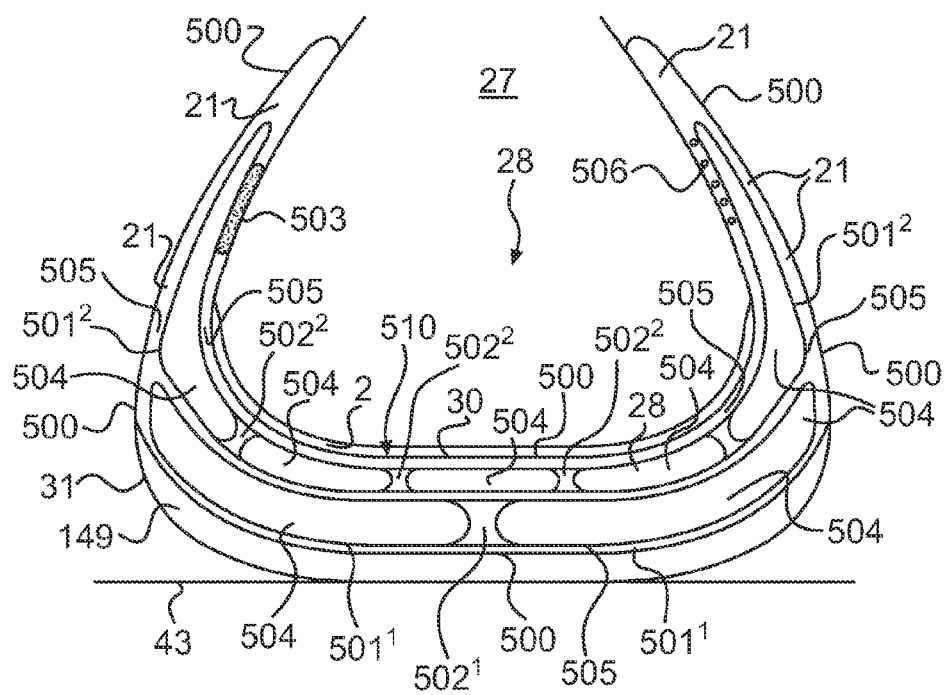

FIG. 23 shows an example embodiment of a flexible insert or component 510 that is substantially forming the footwear upper 21 in part of the heel and which can be used anywhere else are in all of the upper 21. Note also that the flexible insert or component 510 shown as an example in FIG. 23 also shows the flexible insert or component 510 positions so that it is located in both the upper 21 and in the shoe sole or in both an orthotic and orthotic upper; 511 and 513 can be used also.

Also, any inventive combination that is not explicitly described above in the examples shown in FIGS. 22-23 is implicit in the overall invention of this application and, consequently, any part of the example embodiments shown in preceding FIGS. 22-23 and/or associated textual specification can be combined with any other part of any one or more other elements of each other or the invention or prior art examples described in FIGS. 1-21 and 24-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 24A:
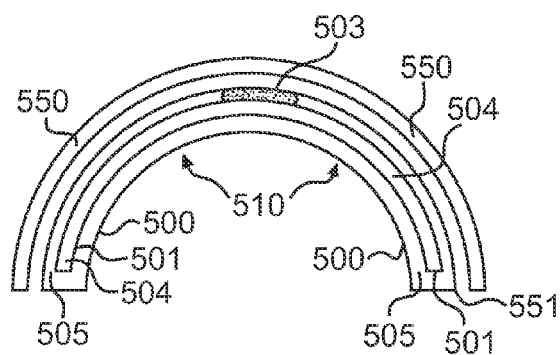
FIGS. 24A and 24B show, in frontal plane cross section, two example embodiments of any helmet 550 for any use with a cushioning helmet liner 551 including an inner flexible insert or component 510.
Figure 24B:
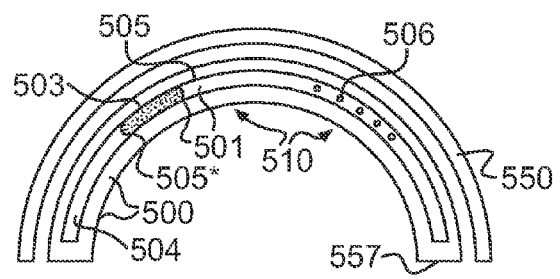

FIGS. 24A and 24B show, in frontal plane cross section, two example embodiments of any helmet 550 for any use with a cushioning helmet liner 551 including an inner flexible insert or component 510; any useful number of flexible inserts or components 510 can be used; flexible insert or components 511 and 513 can be used also. The invention includes any helmet 550 (or part or parts of the helmet) with a liner 551 with one or more internal sipes 505 of any form previously described in this application and any material known in the art located anywhere between the outer surface and inner surface of the helmet liner 551.

Figure 24C:
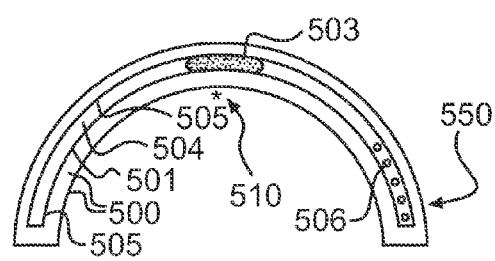
FIGS. 24C and 24D show, in frontal plane cross section, two example embodiments of any helmet 550 for any use including one or more internal sipes 505
Figure 24D:
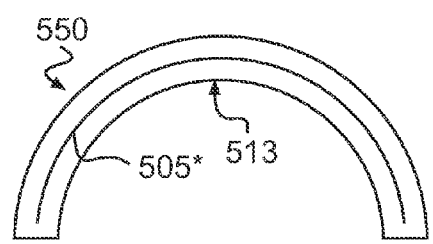

FIGS. 24C and 24D show, in frontal plane cross section, two example embodiments of any helmet 550 for any use including one or more internal sipes 505 of any form previously described in this application and any material known in the art located anywhere between the outer surface and inner surface of the helmet 550, and can include, for example, a shock and shear-absorbing media 504 as previously described in this application.

Also, any inventive combination that is not explicitly described above in the examples shown in FIGS. 24A-24D is implicit in the overall invention of this application and, consequently, any part of the example embodiments shown in preceding FIGS. 24A-24D and/or associated textual specification can be combined with any other part of any one or more other elements of each other or the invention or prior art examples described in FIGS. 1-23 and 25-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Also, any inventive combination that is not explicitly described above in the example shown in FIG. 24 is implicit in the overall invention of this application and, consequently, any part of the example embodiments shown in preceding FIG. 24 and/or associated textual specification can be combined with any other part of any one or more other elements of the invention or prior art examples described in FIGS. 1-23 and 25-79 and/or associated textual specification and/or, in addition, can be combined usefully with any one or more other elements of the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

FIGS. 25A and 25B, as well as FIGS. 26A and 26B, show a heel section of a footwear sole or orthotic with an example of a flexible insert or component 510 using specific examples of the structural elements 502 based on commercial examples of Nike Shox™ and Nike Impax™. FIGS. 25A and 26A show an example of those structural elements of foam material contained and affixed within an inner compartment 501. Since use of a foamed material as a media does not require containment to maintain its structure and function (in contrast to a gas, liquid, or most gels), a foamed material do not require a separate inner compartment 501 in order to form an internal sipe 505 with the new outer compartment 500, as noted under the section on compartment 500/501 media 504 below; thus, as shown in the examples of FIGS. 25B and 26B, suitably configured (in terms of interconnections and shape, for example) structural elements 502 of a foamed material can form an integral inner compartment 501 creating an internal sipe 505 with outer compartment 500.

Figure 26D:
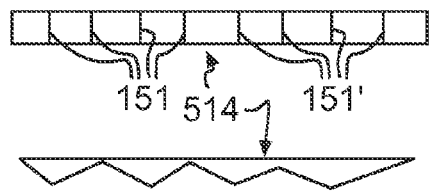
FIG. 26D shows two different examples of versions of the flexible shank 514 in frontal plane cross section.
Figure 26C:
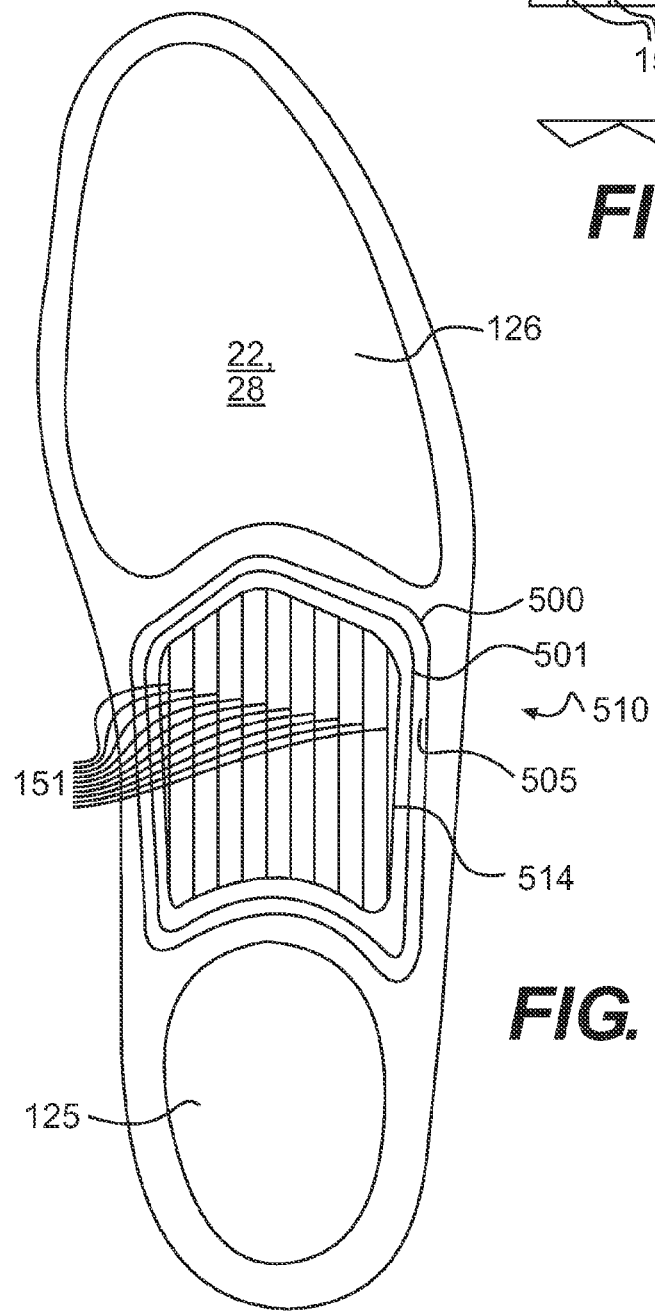
FIG. 26C shows an example in a horizontal plane cross-section of a footwear sole 22 of a device or flexible insert or component 510 in which the inner compartment 501 includes a flexible shank 514 located in the media 504 in the general area of the instep of the shoe sole between the heel area and the forefoot area.

FIG. 26C shows an example in a horizontal plane cross-section of a footwear sole 22 of a device or flexible insert or component 510 in which the inner compartment 501 includes a flexible shank 514 located in the media 504 in the general area of the instep of the shoe sole between the heel area and the forefoot area. The flexible shank 514 can be made of any rigid or semi-rigid material including plastic, metal, and composites including carbon-fiber common in the art and can have sipes 151, of which a vertical slit is one example among a very many well known in the art, that are generally oriented from the area of the heel to the area of the forefoot (including at an angle) so that the shoe sole 22 is flexible enough to flatten in following the deformation motion of a wearer's foot sole in a full range of pronation and supination motion, while remaining sufficiently rigid to support naturally the instep area of the shoe sole 22, a area that is relatively thin (often with tapered thickness) and therefore not ground-contacting in many common footwear soles popular in the art and therefore unstable without shank support, which is well known in the art but which is typically too narrow to support directly the base of a wearer's fifth metatarsal and too rigid in a frontal plane to follow a wearer's lateral pronation/supination motion.

FIG. 26D shows two different examples of versions of the flexible shank 514 in frontal plane cross section. The upper version shows on the left side vertical sipes 151 as slits that penetrate the shank fully and which can be held together, especially during assembly, by an attached fiber (or other material, like foam, for example) layer, while on the right side is another variation of sipes (among the vast number of possibilities discussed in the applicant's prior patents), which are slits 151' that do not fully penetrate the flexible shank 514. The lower version shows an example of inverted V shaped channels as another sipe variation, with the left side showing full or near full penetration (and again, a fiber or other layer can be attached) and the right side showing the channels connected by portions of the flexible shank 514.

Also, any inventive combination that is not explicitly described above in the example shown in FIGS. 25A-25B and 26A-26D is implicit in the overall invention of this application and, consequently, any part of the example embodiments shown in preceding FIGS. 25A-25B and 26A-26D and/or associated textual specification can be combined with any other part of any one or more other elements of each other or the invention or prior art examples described in FIGS. 1-24 and 27-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figures 27A, 27B:
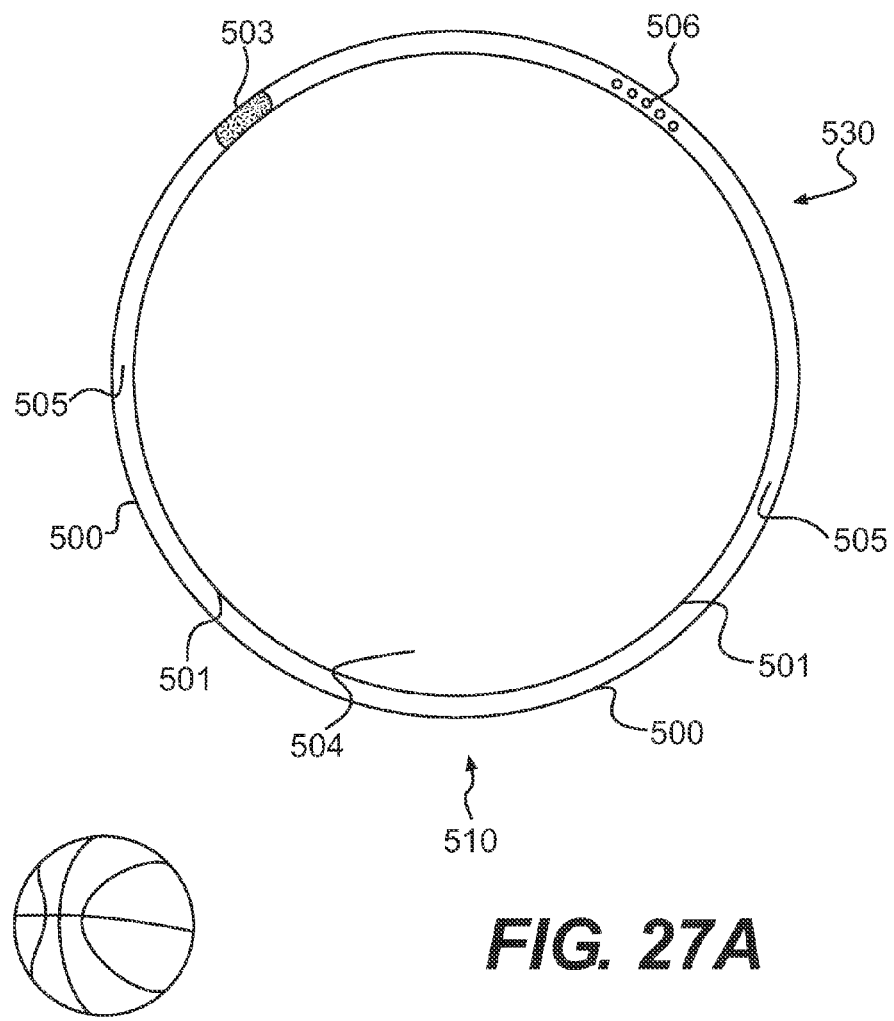
FIGS. 27A-27B show in cross-section an example of any ball 530 with one or more internal sipes 505 of any shape located between the outer surface of the ball and an inner surface.

FIGS. 27A-27B shows in cross-section an example of any ball 530 with one or more internal sipes 505 of any shape located between the outer surface of the ball and an inner surface. The ball includes a structure like the device or flexible insert 510 above, with an inner compartment/chamber/bladder 501 in a typical example having a media 504, which can be pressured gas like air that is sealed (like a tennis ball) or controlled by a valve (not shown) common in the commercial art, like a basketball, and with an outer compartment/chamber/bladder 500. Alternatively, the ball can be structured like a typical golf ball with a solid or relatively solid core (with one or more layers of material) as media 504, which would be separated from the tough outer layer by an internal sipe 505, which can be made to reduce the uncontrolled spin of an offcenter shot like a slice or hook, since any spin imparted to the compartments at the instant of club contact with the ball would become relatively disconnected after contact, with the outer compartment encountering air resistance to its spin, while the core of the inner compartment 501 would encounter friction from the internal sipe 505 surfaces. A similar design and construction approach involving and internal sipe 505 can be used with other devices like skis, bats, tool handles.

Also, any inventive combination that is not explicitly described above in the example shown in FIGS. 27A-27B is implicit in the overall invention of this application and, consequently, any part of the example embodiments shown in preceding FIGS. 27A-27B and/or associated textual specification can be combined with any other part of any one or more other elements of the invention or prior art examples described in FIGS. 1-26 and 28-79 and/or associated textual specification and/or, in addition, can be combined usefully with any one or more other elements of the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 28A:
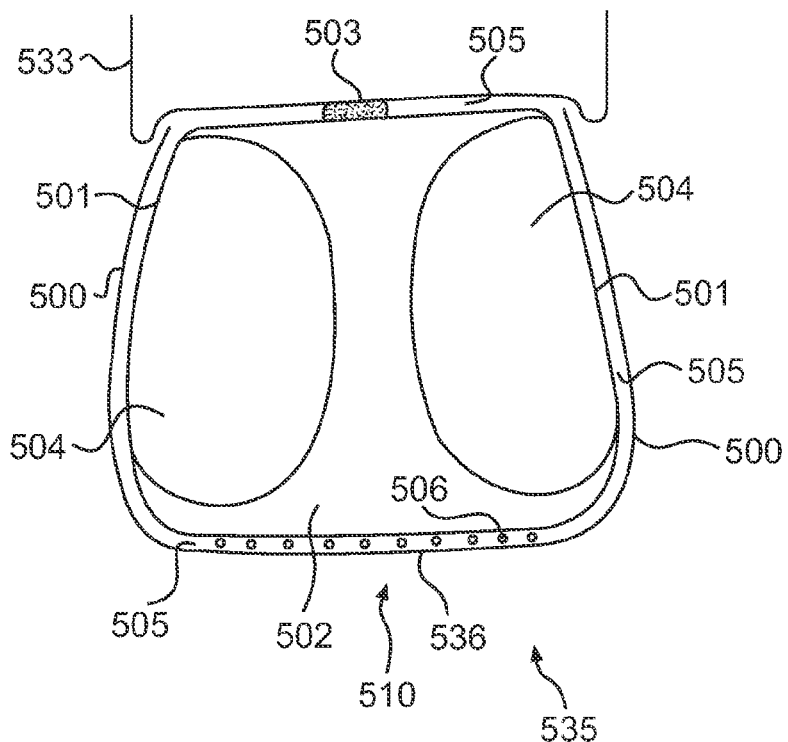
FIG. 28A shows in cross-section an example of a tire 535, such as for a wheel of a transportation vehicle, with a device 510.
Figure 28B:
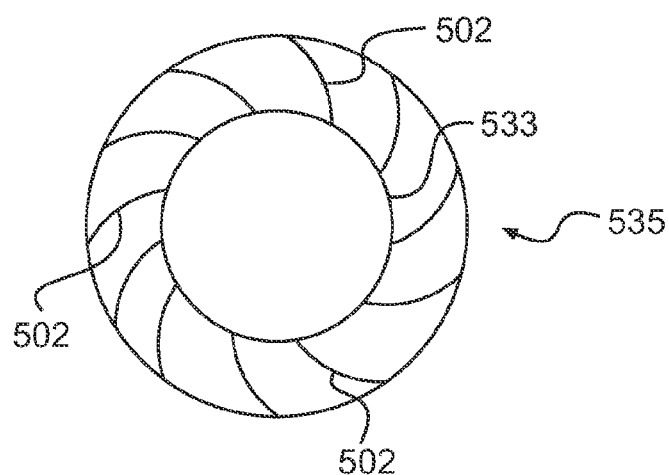
FIG. 28B shows in a side view cross-section an example of shape of structural elements 502 of the inner compartment 501.

FIG. 28A shows in cross-section an example of a tire 535, such as for a wheel of a transportation vehicle, with a device 510; the internal sipe 505 and/or inner compartment/chamber/bladder 501 can be pressured or not (valve not shown). As shown in the example, inner compartment/chamber/bladder 501 can have one or more direct attachments 503 to the wheel and the structural elements shown can be made of any useful material as is conventional in the art, including plastic and/or plastic composite and/or carbon fiber. The outer compartment/chamber/bladder 500 can be abbreviated to cover only part of inner compartment/chamber/bladder 501, as shown in FIG. 28, (possibly pressure-sealed to the wheel like a conventional automobile tire and wheel); the outer compartment/chamber/bladder 500 can also be abbreviated further to cover only a lesser portion, including at least a tread portion, which can include rubber (natural or synthetic, as can other or all parts of the outer compartment 500. FIG. 28B shows in a side view cross-section an example of shape of structural elements 502 of the inner compartment 501 (not shown for simplicity).

Also, any inventive combination that is not explicitly described above in the example shown in FIG. 28 is implicit in the overall invention of this application and, consequently, any part of the example embodiments shown in preceding FIG. 28 and/or associated textual specification can be combined with any other part of any one or more other elements of the invention or prior art examples described in FIGS. 1-27 and 29-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 29A:
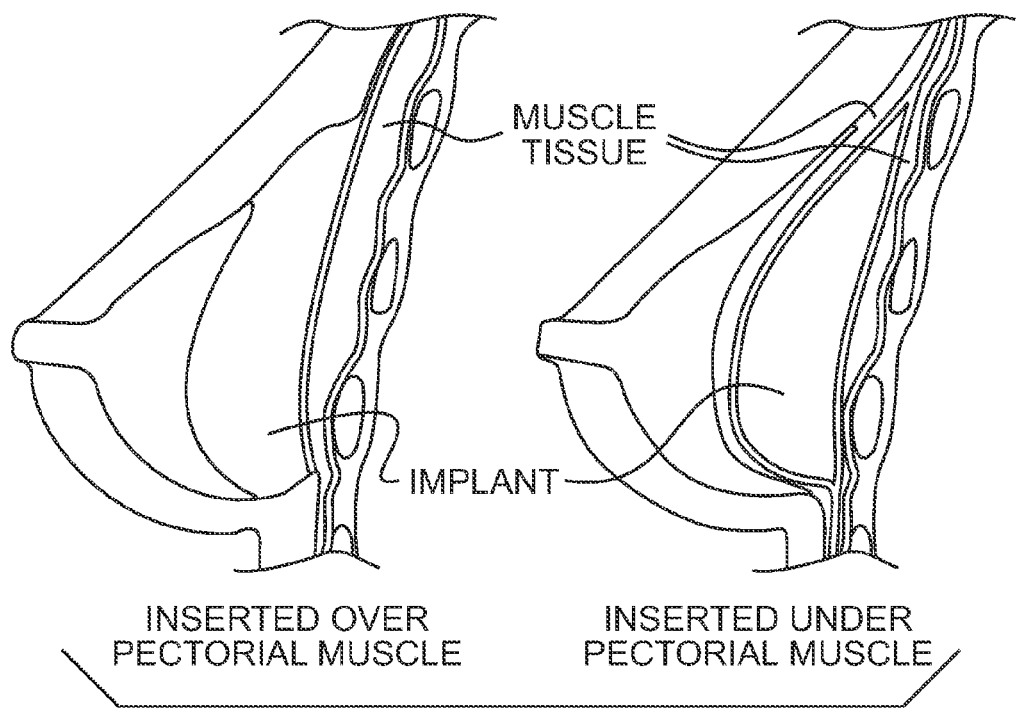
FIG. 29A shows, in sagittal plane cross sections, two examples of prior art human breast implants, the first inserted over pectoral muscle and the second inserted under pectoral muscle.
Figure 29B:
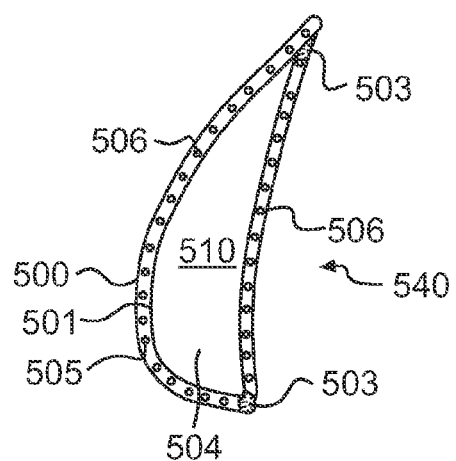
FIG. 29B shows an example of a human breast implant 540 with a siped compartment or chamber 510.

FIG. 29A shows, in sagittal plane cross sections, two examples of prior art human breast implants, the first inserted over pectoral muscle and the second inserted under pectoral muscle. FIG. 29B shows an example of a human breast implant 540 with a siped compartment/chamber/bladder 510 in any of the forms described earlier in this application. The breast implant 540 can be located like either of the prior art examples in FIG. 29A or in another position, or, alternatively, can be incorporated in a pad worn externally to the wearer's body. Similar implants or prosthetic devices 540 incorporating a siped compartment/chamber/bladder 510 including of anatomical or anatomically compatible shape can be used anywhere else in or on the human body, or in or on the body of an animal or other biological entity, utilizing any material in the known implant or other art, including new equivalents, for both functional and/or cosmetic purposes, including external use. More generally, the implant or prosthetic device 540 can be any pad incorporating one or more internal sipes 505 of any 510/511/513 form described earlier in this application located anywhere within the implant 540 (or connecting to the outer surface of 500) In one example embodiment, the media 504 contained by the inner compartment 501 can be a material like silicone, the media 504 contained by the inner compartment 501 can be a material like silicone, while the sipe area 505 can contain a material like water.

FIGS. 30A-30D show cross sectional examples of any structural or support element 550 in any device, including mechanical, electro-mechanical, architectural, electronic, optical, or biological, including a beam or strut, or a tool or racquet handle or grip, shaft or body, or head, that incorporates a siped compartment/chamber/bladder 510 of any form described earlier in this application located anywhere within the structural or support element 550. More generally, the structural or support element 550 can be element incorporating one or more internal sipes 505 of any 510/511/513 form described earlier in this application located anywhere within the structural or support element 550 (or connecting to the outer surface of 500). The sipe or sipes 505 can include one or more sipe media 506 (or 508) the can lubricate the sipe so that 510/511/513 can recoil or rebound after a force impact or load with better flexibility, which can be tuned.

The sipe or sipes 505 can use active configuration or control, as shown in FIG. 17B.

FIGS. 30E-30J show cross sectional views perpendicular to the long axis cross-sections shown in FIGS. 30A-D. FIGS. 30E-30F are example cross sections of the example embodiment shown in FIG. 30C; FIGS. 30G-30H are example cross-sections of the example embodiments shown in FIGS. 30A and 30B; and FIGS. 30I-30J are example cross sections of the example embodiment shown in FIG. 30D. Numeral 8 shows attachment sections that can be glued, for example, to assemble the 510/511513 inventions from component parts.

The examples shown would typically be made from relatively rigid materials for the example embodiments listed above; but, for example, the same structure can be used describe different embodiments, such as FIG. 30F can show a cross section of a relatively rigid tool handle at numeral 504 surrounded by a 510 embodiment with relatively softer materials for the bladder or compartment or chamber 500 and 501.

Figure 31A:
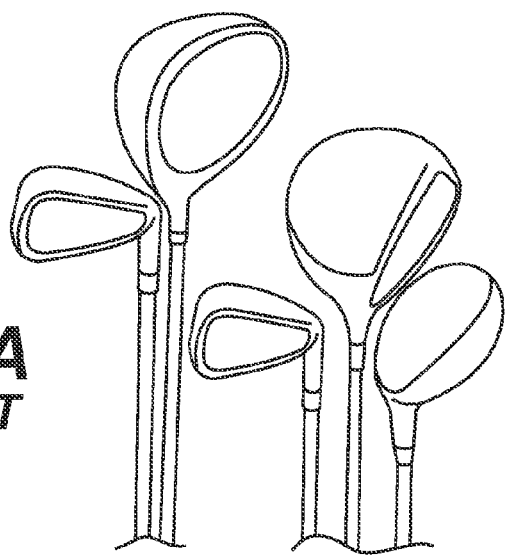
FIG. 31A shows examples of prior art golf clubs.
Figure 31B:
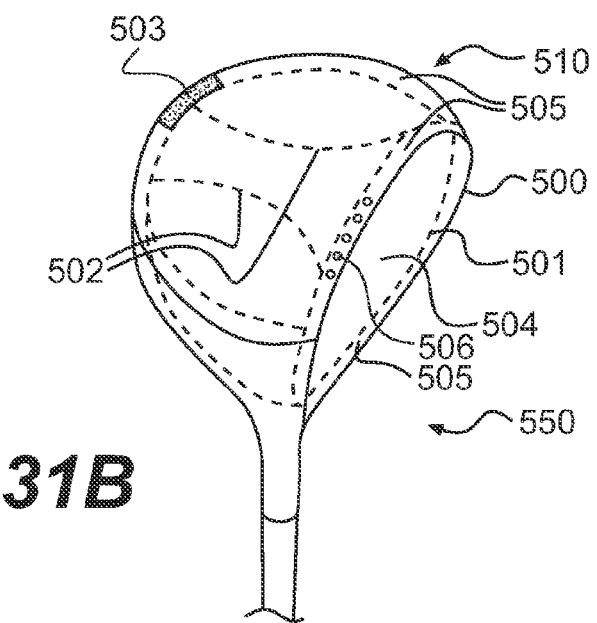
FIG. 31B shows an example of a golf (or other) club head or racket (or tool head or body or handle/grip) 550 with one or more internal sipes 505.

FIG. 31A shows examples of prior art golf clubs. FIG. 31B shows an example of a golf (or other) club head or racket (or tool head or body or handle/grip) 550 with one or more internal sipes 505 of any 510/511/512 form described previously in this application located anywhere within said club 550 (or connecting to the outer surface of 500).

Figure 32A:
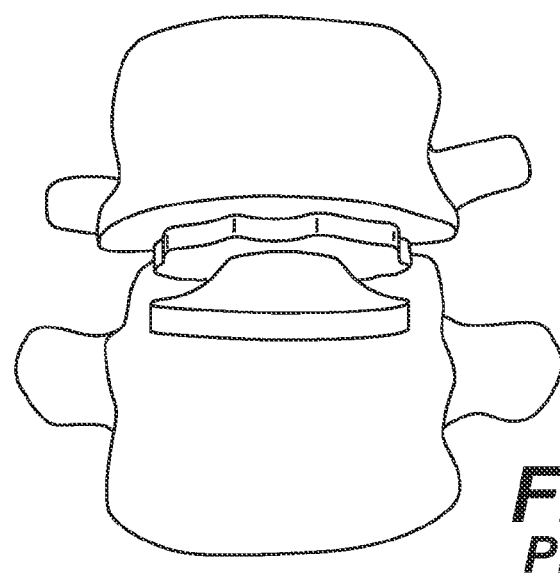
FIG. 32A shows in perspective view an example of a prior art artificial spinal or intervertebral disk.
Figure 32B:
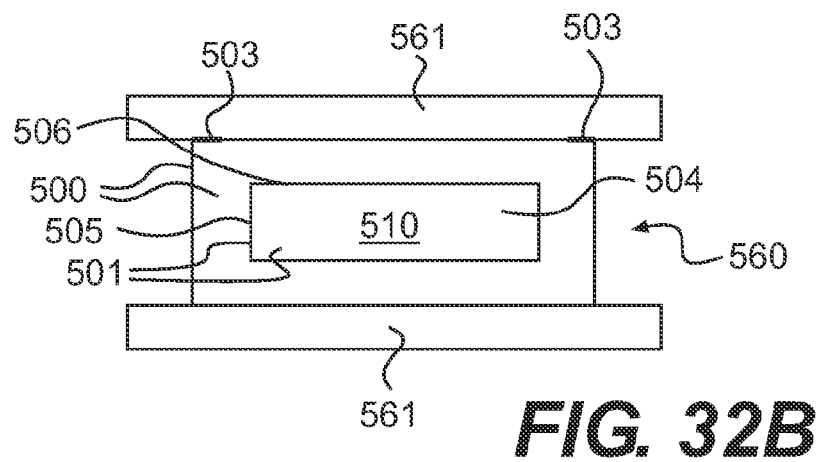
FIG. 32B shows in frontal plane cross section an example of an artificial spinal or intervertebral disk 560, including any artificial joint disk or any other surgical or prosthetic device with one or more internal sipes 505 of any form, including a siped compartment 510.
Figure 33A:
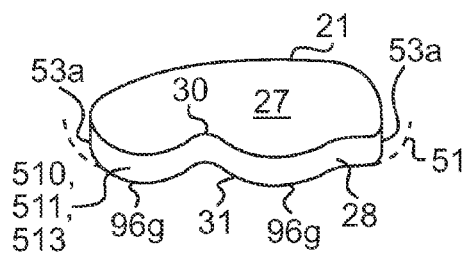
Figure 33B:
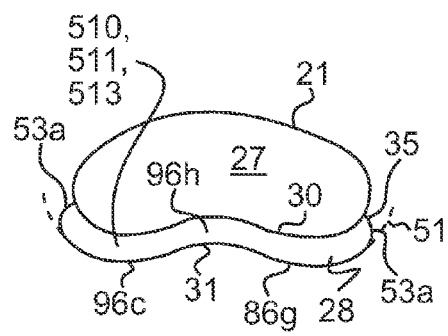
Figure 33C:
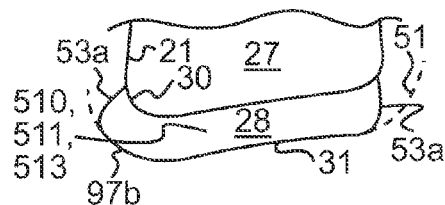
Figure 33D:
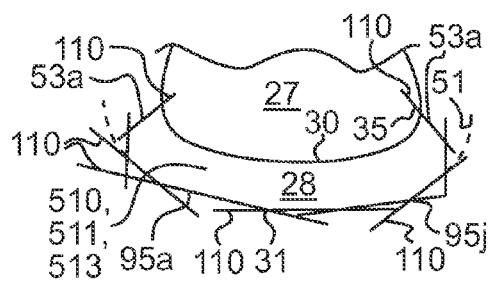
Figure 33E:
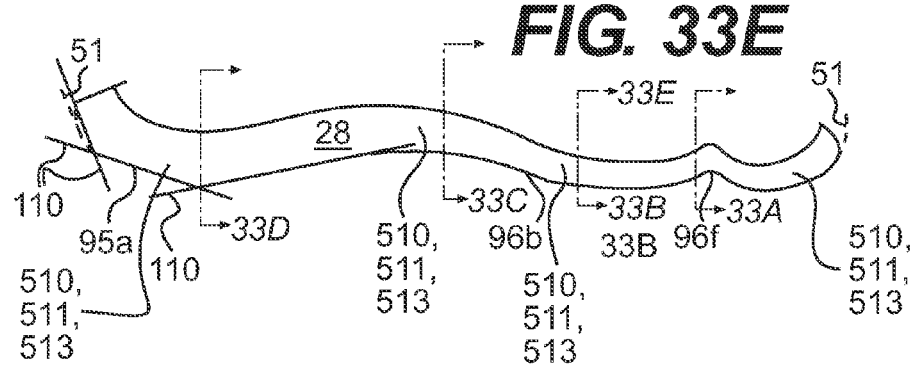
Figure 34:
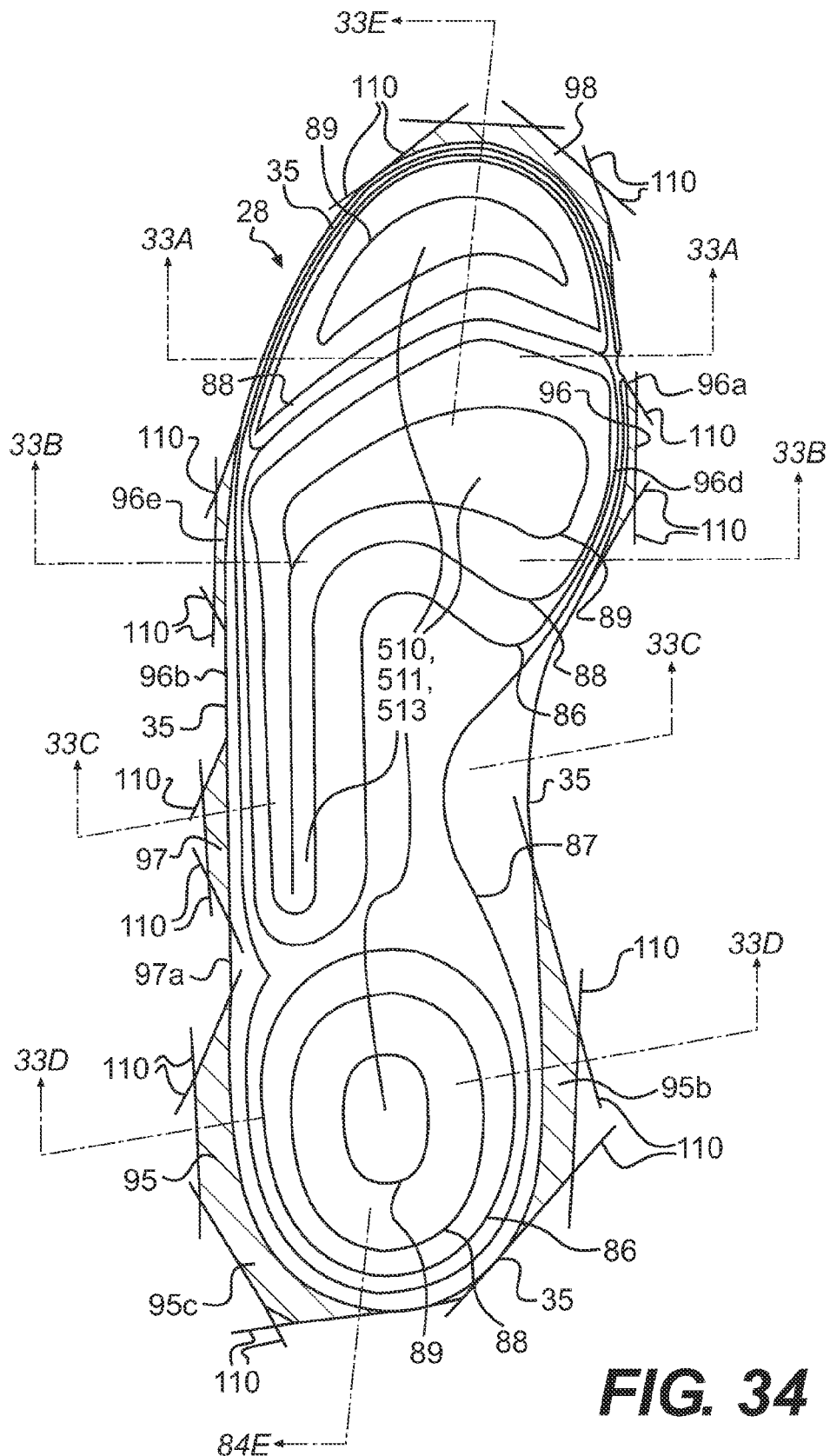
Figure 35:
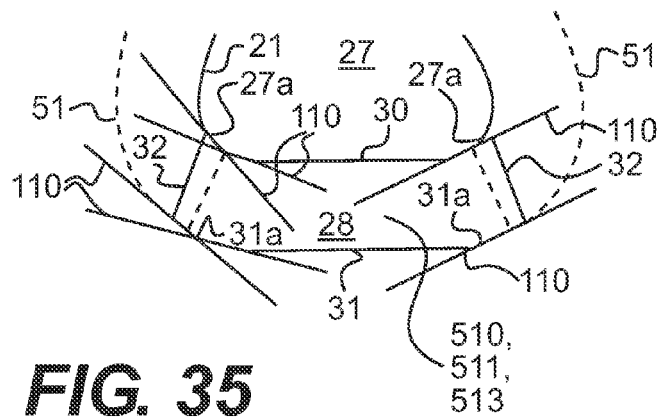

FIG. 32A shows an example of a prior art artificial spinal or intervertebral disk. FIG. 32B shows an example of an artificial spinal or intervertebral disk 560, including any artificial joint disk or any other surgical or prosthetic device for human or animal with one or more internal sipes 505 of any 510/511/513 form previously described within this application located anywhere within the outer surface of disk 560 (or connecting to the outer surface of 500). The artificial disk 560 can be located between endplates 561, as in the example shown in FIG. 32B.

FIGS. 33A-33E and 34-35 show examples of shoe soles 22 or 28 or midsole insert or orthotics 145 with several planar sides to approximate curvature from the applicant's WIPO publication No. WO 02,09547, which can be combined with the flexible insert or components 510, 511, or 513, including with the examples shown in FIGS. 1-32 and 36-79.

Also, any inventive combination that is not explicitly described above in the example shown in FIGS. 29-35 is implicit in the overall invention of this application and, consequently, any part of the example embodiments shown in preceding FIG. 29-35 and/or associated textual specification can be combined with any other part of any one or more other elements of each other or the invention or prior art examples described in FIGS. 1-28 and 36-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 36:
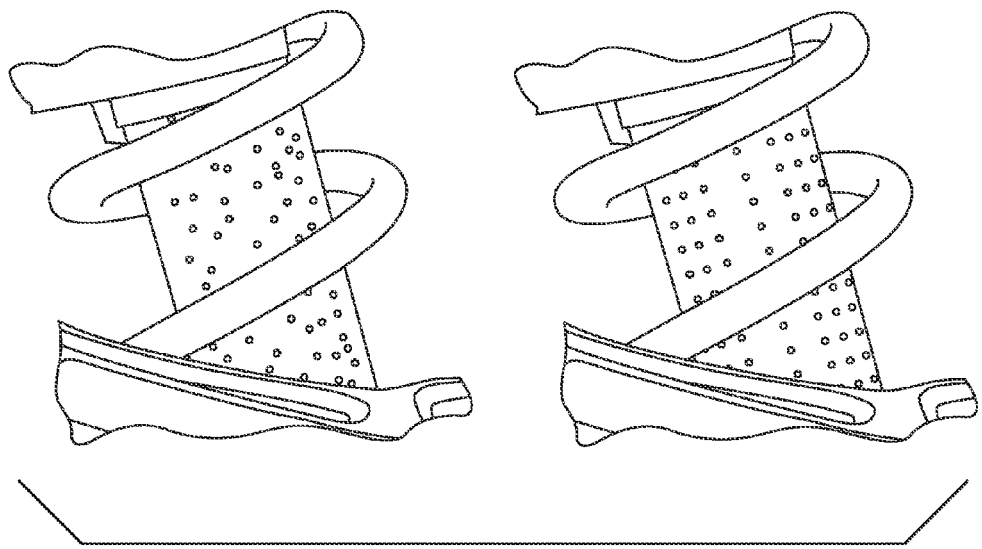
Figure 37:
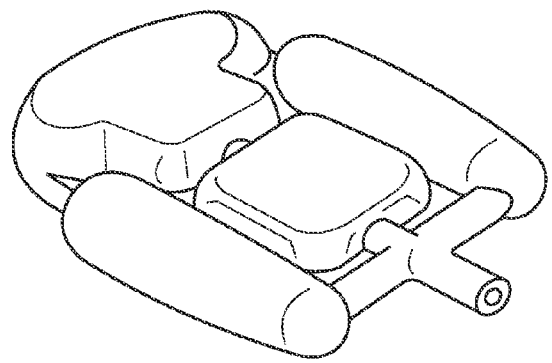
Figure 38:
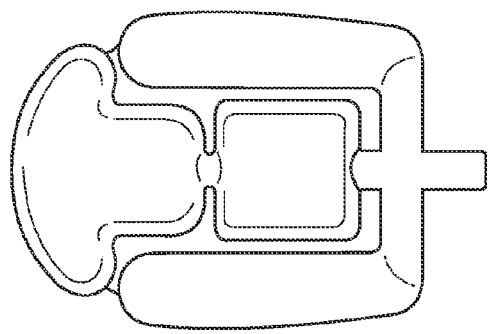
Figure 39:
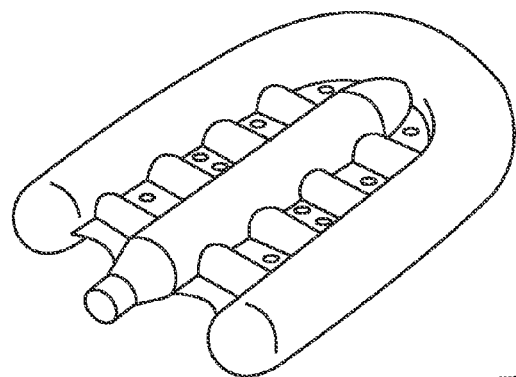
Figure 40:
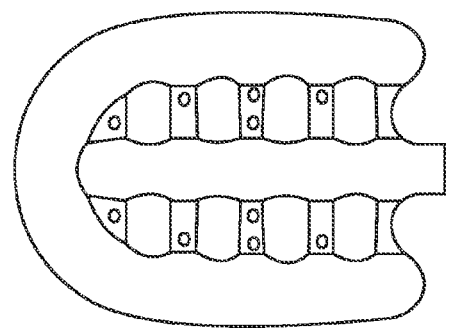
Figure 41:
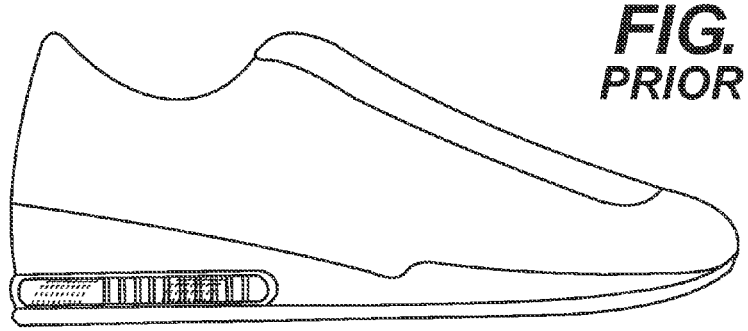
Figure 42:
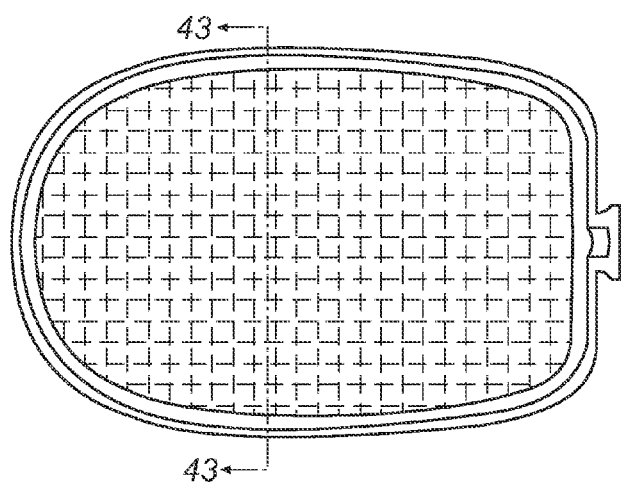
Figure 43:
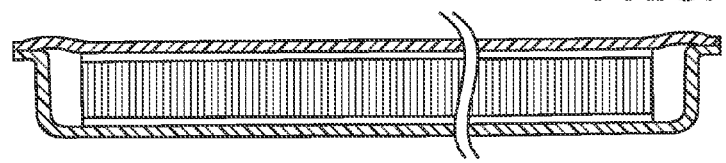

FIG. 36 shows background information from the automotive industry relating to FIGS. 98 and 99.

FIGS. 37-43 show prior art examples gas bladders of Nike Air™ (119-123), which are FIGS. 12-16 of U.S. Pat. No. 6,846,534 and Zoom Air™ (124-126), which are FIGS. 1-3 of published U.S. Patent Application 2005/0039346 A1.

Figure 44:
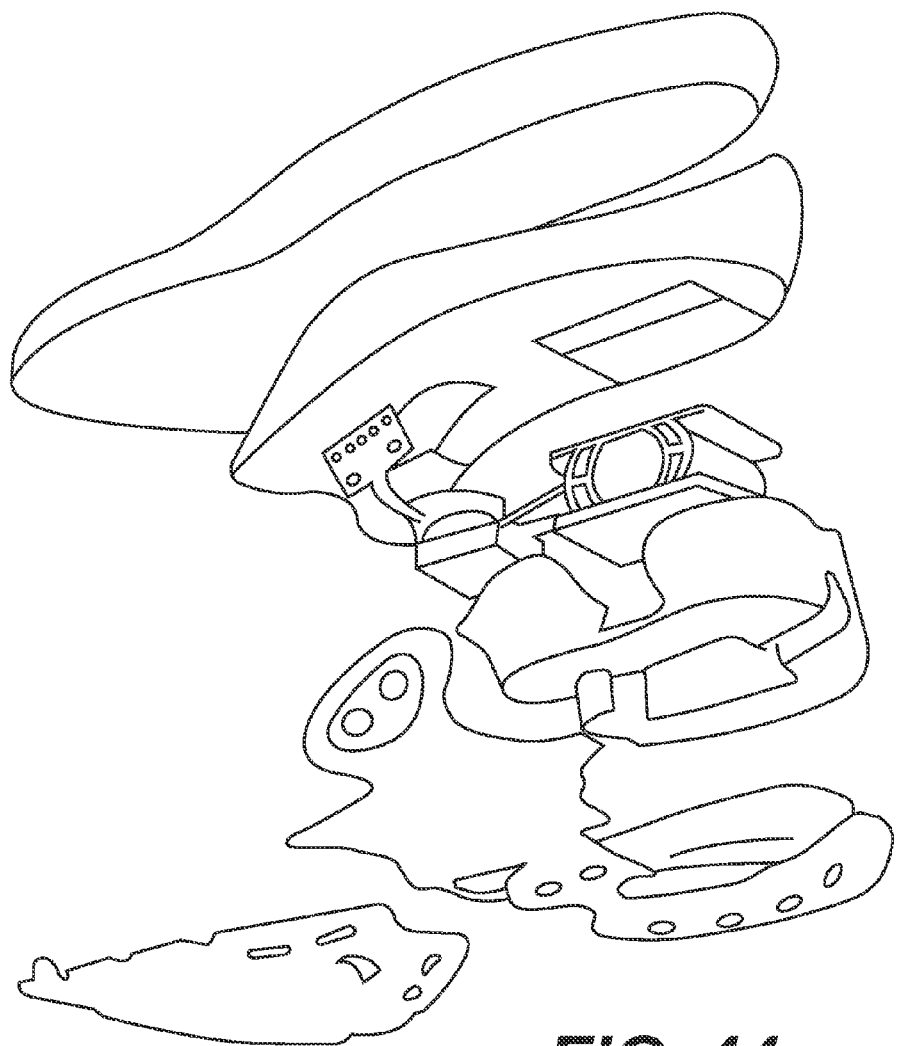
Figure 45:
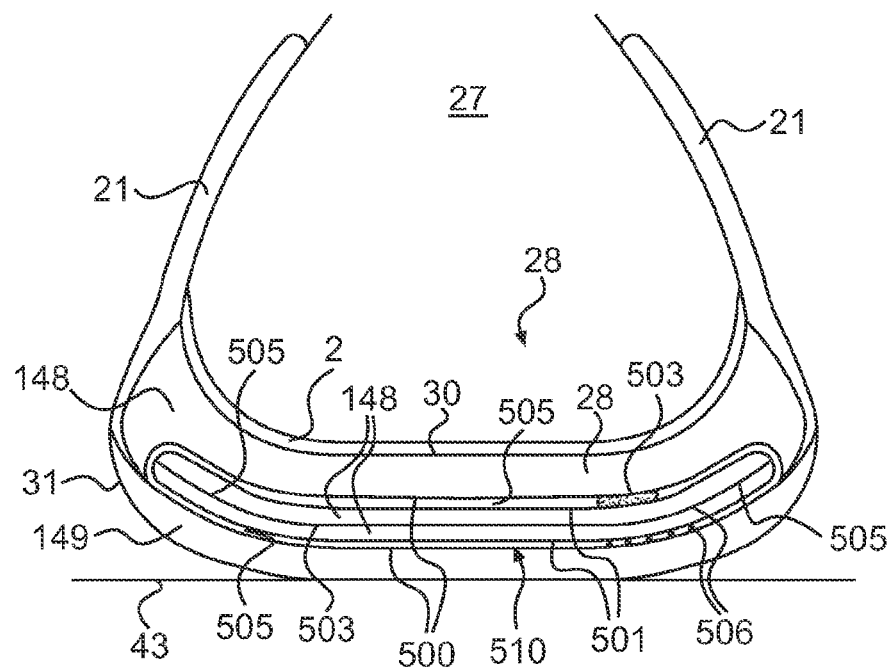
FIG. 45 shows a shoe sole or orthotic frontal plane cross-section of a siped compartment 510 with an inner compartment 501 having multiple midsole layers.

FIG. 44 shows Adidas 1 shoe sole electronic or electromechanical cushioning system (pg. 96 Popular Science, December 4).

Reference numeral 28 refers to the applicant's footwear sole inventions in this and prior footwear/orthotic applications and patents, but reference numeral 28 also refers to orthotics and/or corrective footwear in this application, as well as in the applicant's prior footwear applications and patents that are incorporated by reference herein. This is because footwear soles 28 themselves can be custom modified in a manner conventional to the orthotic and/or corrective shoe art with individualized correction made to the footwear sole 28 as if the entire sole 28 were an orthotic device, rather than just to an orthotic insert 145; potentially included are differing corrections between right and left footwear soles 28 as necessary, as is conventional in the orthotic/corrective shoe art.

Reference numeral 148 refers to midsole, a middle sole layer between the bottom sole and the shoe upper; the midsole has been in commercial use for about forty years, primarily to provide cushioning in modern footwear in the form of relatively soft foamed plastic or other elastomeric material that compresses relatively easily under the body weight load of a wearer of a footwear/orthotic sole 28. Standard midsole material in the footwear art is the use of a foamed plastic like EVA or PU, as well as other foamed elastomeric materials indicated in paragraph number 0178 of the '087 application incorporated by reference herein earlier or equivalent materials.

Since the primary function of midsole 148 in the footwear art is to provide cushioning, such foamed plastics in general use are relatively soft, ranging typically from a fairly soft 30 durometers on a Shore A Hardness Scale to a relatively harder 60 durometers and about 40-70 durometers on the Asker C Hardness Scale.

It is the applicant's view that these standard ranges of midsole hardness are excessively soft in order to compensate for the general commercial use of a non-optimal, not sufficiently anthropomorphic shape for the basic structure of footwear/orthotic soles 28. That is, the softness of the midsole material allows conventional footwear/orthotics 22, especially the sides, to bend up more easily into a shape more like that of a wearers foot sole subjected to a body weight load. The applicant's firm view that the more direct and effective approach is to obviate the need to compensate by using an anthropomorphically shaped footwear/orthotic sole 28 structure, as described previously by the applicant in this and the applicant's prior footwear applications and patents incorporated by reference herein. Moreover, recent human biomechanics research indicates a counter-intuitive result: that softer midsole cushioning actually causes higher impact forces for a wearer.

Consequently, based on the foregoing, the only direct way to achieve a lower, more natural level of impact forces on a wearer is to form a new combination of significantly firmer midsole material together with the correct, anthropomorphic footwear/orthotic sole 28 shape previously described by the applicant. However, increased firmness alone results in instability, since footwear/orthotic soles 28 that are rounded and that do not flatten easily like the rounded sole of an unloaded wearer's foot does under a body weight load will function instead roughly like a rigid rocking chair, not a foot sole, which is rounded but flattens easily under body weight.

Therefore, increased material firmness must be newly combined with increased structural flexibility provided by the applicant's internal sipe inventions 510/511/513 in order to create footwear/orthotic soles 28, or removable midsole/orthotic inserts 145, that are both rounded like the shape of a wearer's unloaded foot sole and deformable so as to flatten like that wearer's rounded foot sole flattens under a body weight load. As a direct result, at the same time impact forces on a wearer are reduced to a natural, bare foot level, while "energy return" is increased to a natural, bare foot level, instead of the relative energy loss (actually, "negative energy return") of conventional athletic shoe soles compared to the bare foot.

The use of midsole 148 material that is firmer than that which is standard in the footwear art therefore has significant functional benefits in combination with the applicant's internal sipe inventions. Such relatively firm or hard midsole 148 material for footwear/orthotic soles 28 and inserts 145 can usefully be on a Shore A Hardness Scale, for example, greater than 60 durometers, such as at least 65 durometers, at least 70 durometers, at least 75 durometers, at least 80 durometers, at least 85 durometers, at least 90 durometers, at least 95 durometers, or 100 durometers; or midsole 148 material that is on a Shore D Hardness Scale at least 20 durometers or at least 30 durometers or at least 40 durometers or at least 50 durometers or at least 60 durometers or at least 70 durometers or at least 80 durometers or at least 90 durometers; or midsole material that is on the Asker C Hardness Scale greater than 70 durometers or over 75 durometers or over 80 durometers or over 85 durometers or over 90 durometers or over 95 durometers or 100 durometers. Accordingly, for each of the embodiments disclosed in this application, the midsole material 148 may be designed with this increased firmness/hardness as discussed in this paragraph above (for example, a hardness of greater than 60 durometers).

The midsole 148 used in the applicant's footwear or orthotic inventions can have multiple layers, each with different durometers (of either scale), such varying from a firmest nearest to an outsole and a least firm nearest to a wearer's foot sole.

Also, since the applicant's view outlined above is that the function of midsole 148 material is to provide flexibility, not to provide cushioning, then the use of conventional foamed material is no longer required, given that the injection of gas to create cells within conventional midsole 148 material as identified earlier is done to produce an unnecessary cushioning property into the 148 material. Therefore, reduced foam or non-foamed plastic or other reduced foam or non-foamed elastomeric (or non-elastomeric materials) or combination thereof can be usefully employed with improved function in the footwear/orthotic soles 28 and removable midsole/orthotic inserts 145 of this application or the applicant's prior footwear applications and patents incorporated by reference herein above. Similarly, reduced cell (open or closed) or non-cell plastic or other reduced cell (open or closed) or non-cell elastomeric (or reduced or non-elastomeric) materials or combination thereof can be usefully employed with improved function in the footwear/orthotic soles 28 and removable midsole/orthotic inserts 145 of this application or the applicant's prior footwear applications and patents incorporated by reference herein above.

Note that the above reduced foam or non-foam and/or reduced cell or non-cell elastomeric (or reduced or non-elastomeric) midsole 148 material described in this paragraph can be otherwise the same as those remaining midsole 148 materials (but without foam and/or cells or reduced foam and/or reduced cells in terms of size or number) indicated previously in paragraph 0178 of the '087 application. Associated with this reduction would be a cessation or reduction in the gas injected in the midsole 148 manufacturing or injection process. Note the reduction in cells above can be in number (per unit volume, for example) or size or both, and reduced foam and/or cells can be measured in increased weight per unit such as volume of material, for example.

In summary, it is the use of the applicant's insertable internal sipe inventions, including the 510/511/513 inventions of this application, not midsole 148 foamed or cellular material, that can provide natural flexibility and impact force reduction like the foot sole of the wearer. In combination with the applicant's novel insertable internal sipe invention, this new to the footwear art midsole 148 material described above uniquely provides a new capability for footwear/orthotic soles 28 to function in the same manner and with the same performance characteristics as a wearer's foot sole—an important capability unavailable with conventional foamed or celled midsole 148 material. And this beneficial new combination can also be combined usefully with any of the applicant's prior footwear/orthotic sole 28 and removable midsole/orthotic insert 145 to produce other new invention with improved, more natural performance characteristics.

The bottom or outer sole 149 is often made, at least in one or more parts, with blown rubber for cushioning and flexibility, so that it is similar in structure and function to foamed, celled midsole 148 material described previously. For the same reasons described previously then, the use of non-blown rubber (or reduced cell/foam rubber) combined with the applicant's internal sipe inventions, such as the 510/511/513 inventions of this application, provide useful improvements to footwear/orthotics 28 and removable midsole/orthotic inserts 145, and can also usefully be employed in conjunction with the reduced foam or non-foam and/or reduced cell or non-cell midsole 148 material described in the previous paragraph.

For both reduced foam or non-foam and/or reduced cell or non-cell midsole 148 or bottom sole 149 materials, the new materials share the new property of less or no substantial reduction in thickness under compression from a body weight load of a wearer, while rigidity is avoidable through the flexibility provided by the applicant's internal sipes inventions, including the 510/511/513 inventions of this application. Incompressible solids, that is, materials that can be deformed but do not change in volume are described by the Mooney-Rivlen equation, which can be useful in identifying material properties with optimal material characteristics desired by the applicant, which is minimal thickness reduction under compression, but with maximal flexibility.

The additional use of fiber, including inelastic but flexible fiber, is beneficial in assisting the new midsole 148 (or bottom sole 149) to reduce compression deformation while maintain flexibility of the footwear/orthotic 28 or insert 145, especially if the fiber 518 is located or oriented substantially in a plane at least roughly paralleling the inner surface of the sole 28 or insert 145 which should follow the outer surface of the wearer's foot sole.

The firm or hard material described above for midsole 148 and bottom sole 149 provides better responsiveness than softer materials, a desirable characteristic for athletic shoes particularly and generally better stability for any footwear/orthotic soles 28 or inserts 145. Similarly, reduced foam or non-foam and/or reduced cell or non-cell sole 148 or 149 material allows for thinner footwear/orthotic soles 28 or inserts 145, which reduces the torque inherent in the thickness of the sole 28 or insert 145, thereby also increasing responsiveness and decreasing instability, such as related to ankle sprains or over-pronation.

Moreover, the applicant's 510/511/513 are uniquely designed to reduce shear forces, rather than compression force (which as noted above is probably unnecessary), since most artificial surfaces like concrete or asphalt significantly increase shear forces above a natural level, compared to a natural surface like grass or dirt (either loose or packed). In addition, the potentially excessive bulkiness of the applicant's curved stability sides shown in this and earlier applications and patents incorporated by reference herein above is reduced by the thinner sole 28 or insert 145.

Potential midsole 148 and outsole 149 materials include elastomers, rubber, and plastic, as noted above, including polymers (used singularly or in combination); examples are polyolefins, fluoropolymers, and vinyls, as well as polypropylene, polystyrene, nylon, polycarbonate and acrylics, including in the form of fibers. Also, materials with a flexural modulus higher or much higher than is standard in the art is beneficial.

The new firm or hard, reduced foam or non-foam and/or reduced cell or non-cell 148 or 149 materials described above on this and the previous three pages can be used beneficially with footwear/orthotic soles 28 and uppers 21, as well as removable midsole/orthotic inserts 145, and also with any other of the previously or later described non-footwear/orthotic products, including, for example, helmets 550, balls 530, tires 535, implants or external pads or other protection 540, structural elements 550 including golf clubs 550, artificial joints like spinal disks 560, and many other products described or listed in this or previous applications and patents previously incorporated by reference herein.

The same logic described above that indicates the improvements provided by using firm-to-hard, reduced foam or non-foam and/or reduced cell or non-cell 148 or 149 material also applies to materials used in the applicant's internal sipe inventions, including the 510/511/513 inventions of this application, including for example midsole material used in either the 504 or the 502 components (or both) of the siped compartment 510 and 511 inventions.

By the same logic, any gas or "air" used in the 510/511/513 or earlier inventions is less beneficial, although still a useful improvement to the prior art. Furthermore, by this logic, either compartment/chamber/bladder 500 or 501 can contain a firm-to-hard, reduced foam or non-foam and/or reduced cell or non-cell midsole 148 material, either in a single layer or multiple layers separated by internal sipes 505 (one or more) between layers, for example a single sipe 505 between two midsole 148 material layers, such as in the example embodiment shown in FIG. 45, wherein the inner compartment 501 contains two midsole layers. Any practical number of midsole layers of any shape and associated sipes 505 of any shape is possible, with each additional associated sipe 505 providing additional flexibility to the compartment/chamber/bladder 500 or 501.

Figure 46:
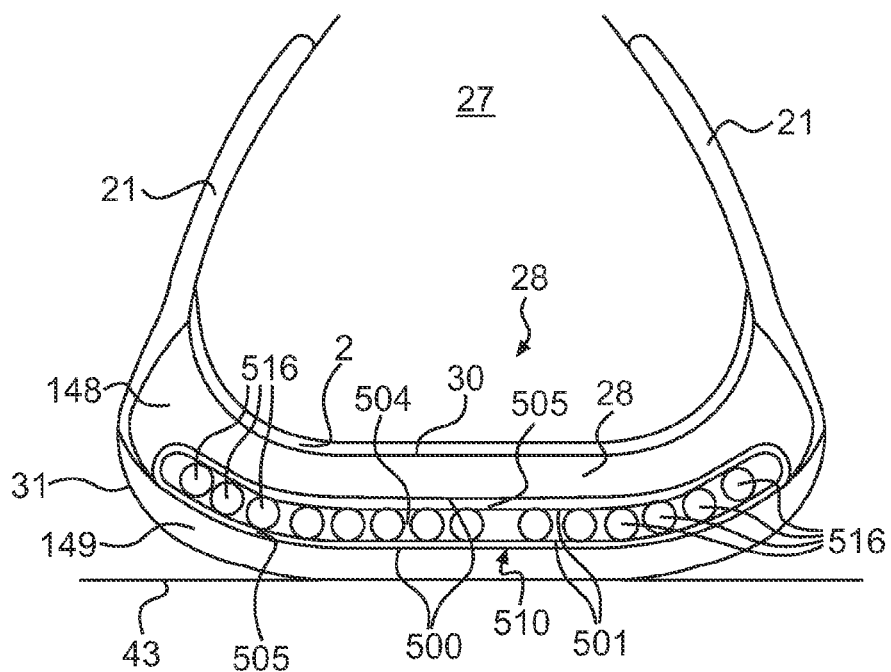
FIG. 46 shows a show sole or orthotic frontal plane cross-section of a siped compartment 510 with an inner compartment 501 having a multitude of ball bearing-like structures.

FIG. 46 shows a different example embodiment wherein the inner compartment/chamber/bladder 501 shown contains a multitude of ball bearing-type structures made of a midsole 148 material that is firm-to-hard, reduced foam or non-foam and/or reduced cell or non-cell, as described above. The ball bearings 516 can be fixed or free-moving within the inner compartment 501, so that for example if the ball bearings 516 are sufficiently firm-to-hard, the bearings 516 can create significant pressure points against a wearer's foot sole since the bearings 516 would not compress significantly under a wearer's body weight load, but if relatively free-moving within compartment 501 (or alternatively, with compartment/chamber/bladder 500, such as free-moving within a sipe 505, for example), the ball bearing 516 pressure points can move sufficiently within the compartment/chamber/bladder 501 to provide thereby a foot massage to a wearer of the footwear/orthotic sole 28 or removable midsole or orthotic insert 145 with a compartment/chamber/bladder 501 or sipe 505 with sufficiently firm-to-hard ball bearings 516, which also assist in developing healthy protective calluses (rather than potentially blisters if the ball bearings 516 were fixed in the same positions so that the point pressure did not move, such as randomly, which protects the foot sole)

The control system 300 receives pressure data from the pressure sensing system and controls the fluid pressure system in accordance with predetermined criteria which can be implemented via electronic circuitry, software or other conventional means. The pressure sensing system may include a pressure sensing device 104 disposed in the sole of the shoe at each zone. As the pressure increases above a threshold, the control system opens (perhaps only partially) a flow regulator to allow fluid to escape from the fluid bladder. Thus, the release of fluid from the fluid bladders 188 may be employed to reduce the impact of the user's foot on the ground. Point pressure under a single bladder 188, for example, can be reduced by a controlled fluid outflow to any other single bladder or any combination of other bladders.

Control system 300, which preferably includes a programmable microcomputer having conventional RAM and/or ROM, receives information from the pressure sensing system indicative of the relative pressure sensed by each pressure sensing device 104. Control system 300 receives digital data from pressure sensing system. Control system 300 is also in communication with fluid valves 210 to vary the opening of fluid valves 210 and thus control the flow of fluid. As the fluid valves 210 of this embodiment are solenoids (and thus electrically controlled), control system 300 is in electrical communication with fluid valves 210. An analog electronic control system 300 with other components being analog is also possible.

The preferred programmable microcomputer of control system 300 selects (via a control line) one of the digital-to-analog (D/A) converters to receive data from the microcomputer to control fluid valves 210. The selected D/A converter receives the data and produces an analog voltage proportional to the digital data received. The output of each D/A converter remains constant until changed by the microcomputer (which can be accomplished using conventional data latches, which is not shown). The output of each D/A converter is supplied to each of the respective fluid valves 210 to selectively control the size of the opening of fluid valves 210.

Control system 300 also can include a cushion adjustment control to allow the user to control the level of cushioning response from the shoe. A control device on the shoe can be adjusted by the user to provide adjustments in cushioning ranging from no additional cushioning (fluid valves 210 never open) to maximum cushioning (fluid valves 210 open wide). This is accomplished by scaling the data to be transmitted to the D/A converters (which controls the opening of fluid valves 210) by the amount of desired cushioning as received by control system 300 from the cushioning adjustment control. However, any suitable conventional means of adjusting the cushioning could be used.

Figure 47:
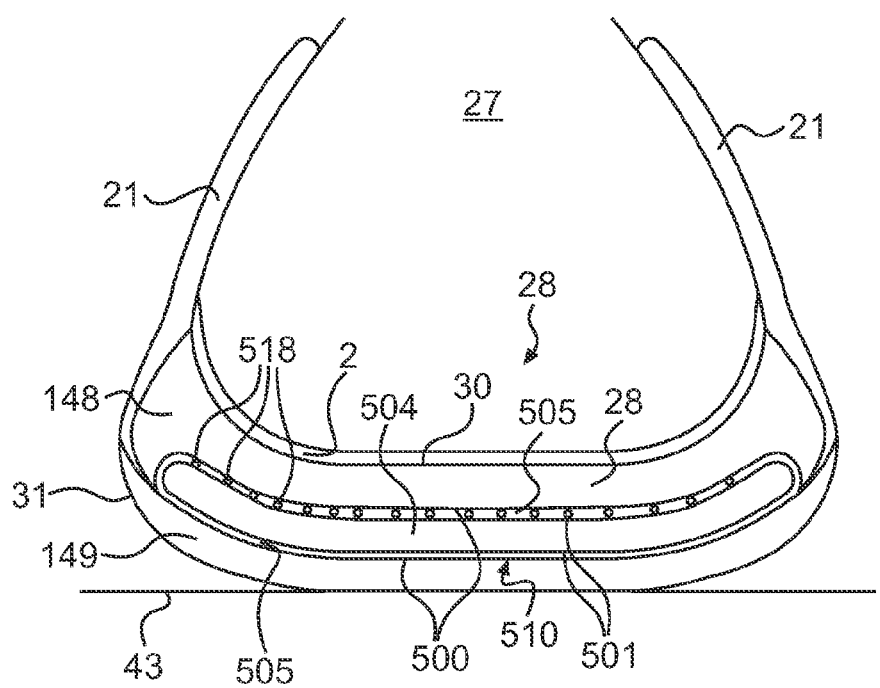
FIG. 47 shows a shoe sole or orthotic frontal plane cross-section of a siped compartment 510 with fiber reinforcing an inner or outer compartment.

FIG. 47 shows an embodiment example wherein flexible fiber is used to reinforce one or more compartment/chamber/bladders 500 or 501, as shown, wherein elastic or inelastic fibers 518 can be used to help stabilize the size and shape of the one or more compartments/chambers/bladders 500 or 501, such as for example under a body weight load of a wearer, to reduce compression of the sole. Note the fiber 518 shown parallel the shape of the inner surface 30 of the footwear/orthotic sole 28, which parallels the shape of a wearer's foot sole.

Figure 48A:
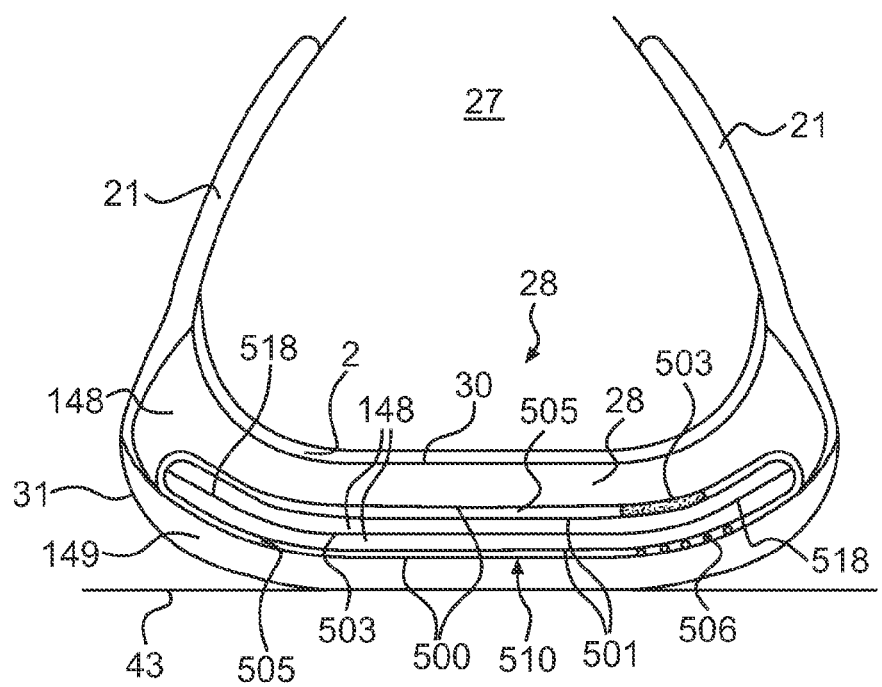
FIG. 48A shows a shoe sole or orthotic frontal plane cross-section of a siped compartment 510 with fiber sandwiched between two separate layers of midsole.
Figure 49:
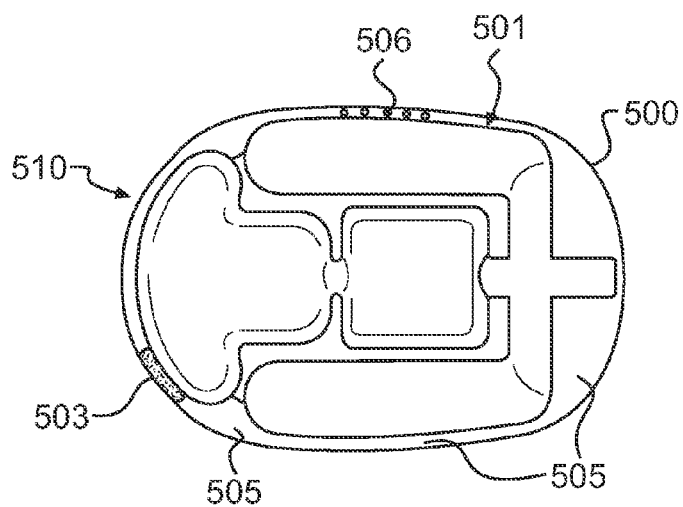
Figure 50:
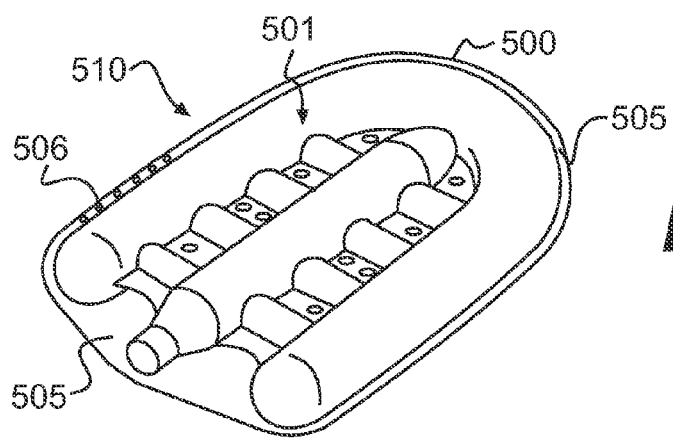

FIG. 48A shows another example embodiment with fiber 518 wherein the fiber 518 is sandwiched between two separate layers of midsole 148 (or bottom sole 149) material, including firm-to-hard, reduced foam or non-foam and/or reduced cell or non-cell; alternatively, the fiber 518 can be embedded within the midsole 148, as shown in FIG. 48B, or bottom sole 149 material; multiple layers of fiber and/or midsole 148 can be a useful improvement, again as shown in FIG. 48B.

Figure 73A:
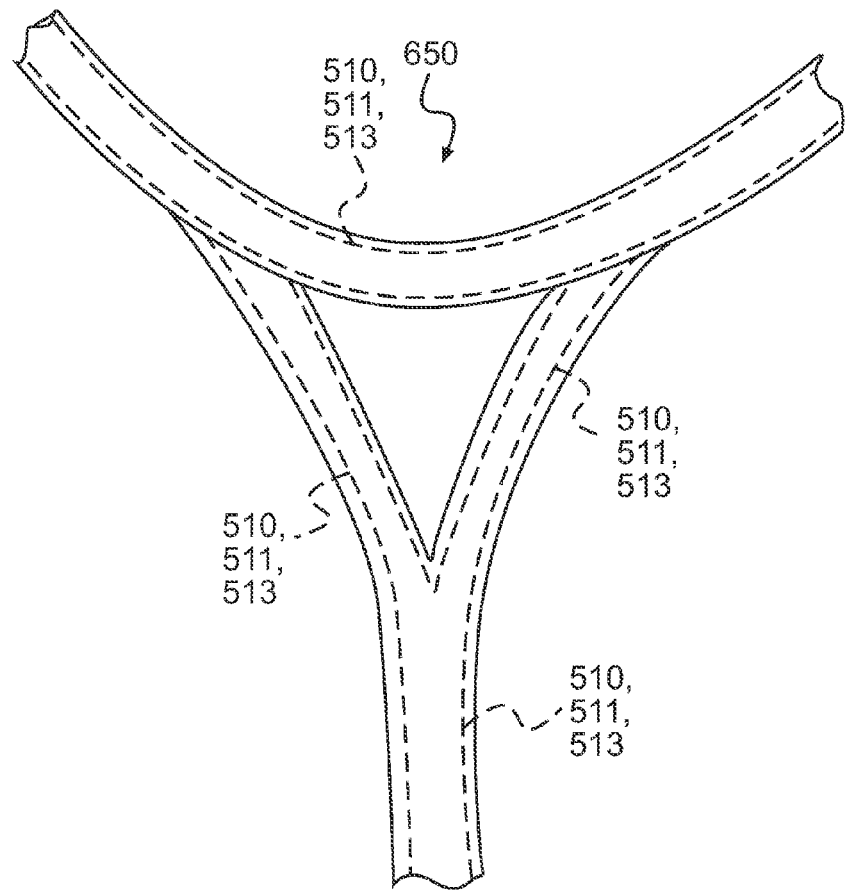
FIGS. 73A-73B shows a tennis racquet with the 510/511/513 inventions.
Figure 73B:
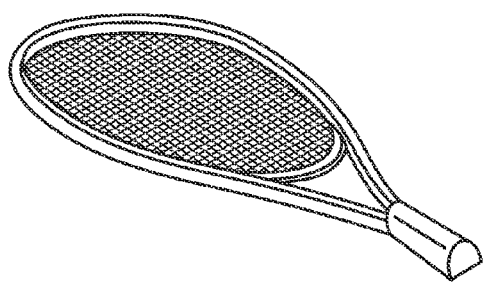
Figure 74:
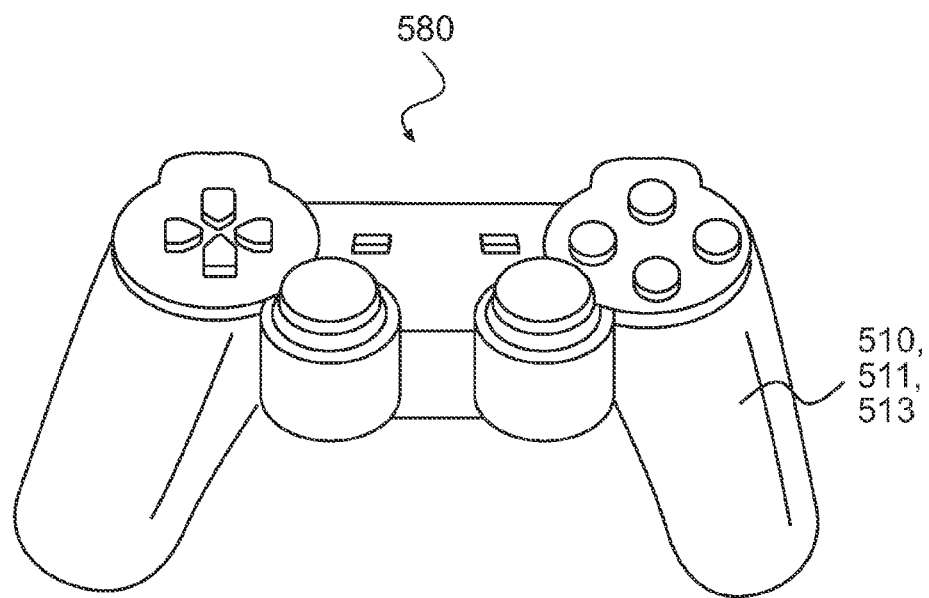
FIGS. 74-79 show additional examples of the 510/511/513 inventions applied to electronic game controllers, manual tools, electric tools, bicycle, and cell phone.

FIGS. 48C-48E show alternate embodiment examples of shoe sole material incorporating vertical sipes based on FIGS. 73A-73C of the '665 application that would be incorporated in shoe soles in the manner shown in FIGS. 25B and 26B for FIG. 48C and FIGS. 25A and 26A for FIGS. 48D and 48E.

FIGS. 49-50 and 51A-51B show examples of embodiments of the useful improvement of applicant's siped compartment/chamber/bladder 510 invention combined with the gas bladders 501 well known in the art as made by Nike™ and marketed as Nike Air™ (and shown previously as FIGS. 38-40). FIG. 52 is a similar example embodiment incorporating a New Balance N-ergy™ cartridge as a compartment/chamber/bladder 501 in the applicant's siped compartment 510 invention.

Figure 51A:
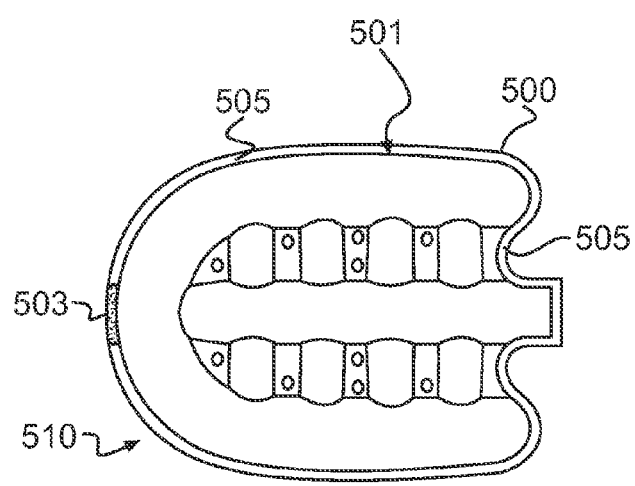

FIG. 51B shows a side view of the same insertable device 510 shown in FIG. 51A, the device using an example conventional commercial gas bladder as inner bladder or compartment or chamber 500; the device 510 is shown located in a shoe sole 28 or 22.

Any one or more parts of FIGS. 45-47, 48A-48E, 51A-51B and 52A-C can be combined with any one or more parts of one or more of the previous Figures of this or the applicant's prior footwear applications or patents incorporated by reference herein. Also, any inventive combination that is not explicitly described above in the example shown in FIGS. 45-47, 48A-48E, 51A-51B and 52A-C is implicit in the overall invention of this application and, consequently, any part of the example embodiments shown in preceding FIGS. 45-47, 48A-48E, 51A-51B and 52A-C and/or associated textual specification can be combined with any other part of any one or more other elements of each other or the inventive and prior art examples described in FIGS. 1-44 and 53-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

FIG. 53 is a example of a wheel/tire combination, the Michelin™ "Tweel" with the wheel 533 including the 510/511/513 invention and FIG. 54 is a prior art example of a conventional tire.

FIG. 52B shows a detailed frontal plane cross section of an example conventional commercial gas bladder/compartment/chamber shown as inner bladder or compartment or chamber 501 in schematic perspective in FIG. 52A. FIG. 52C shows the same detailed cross sectional view of the same inner bladder or compartment or chamber 501 enveloped by an outer bladder or compartment or chamber 500 forming an insertable siped compartment 510, including wherein all or part of the sipe 505 is a slit.

Figure 55:
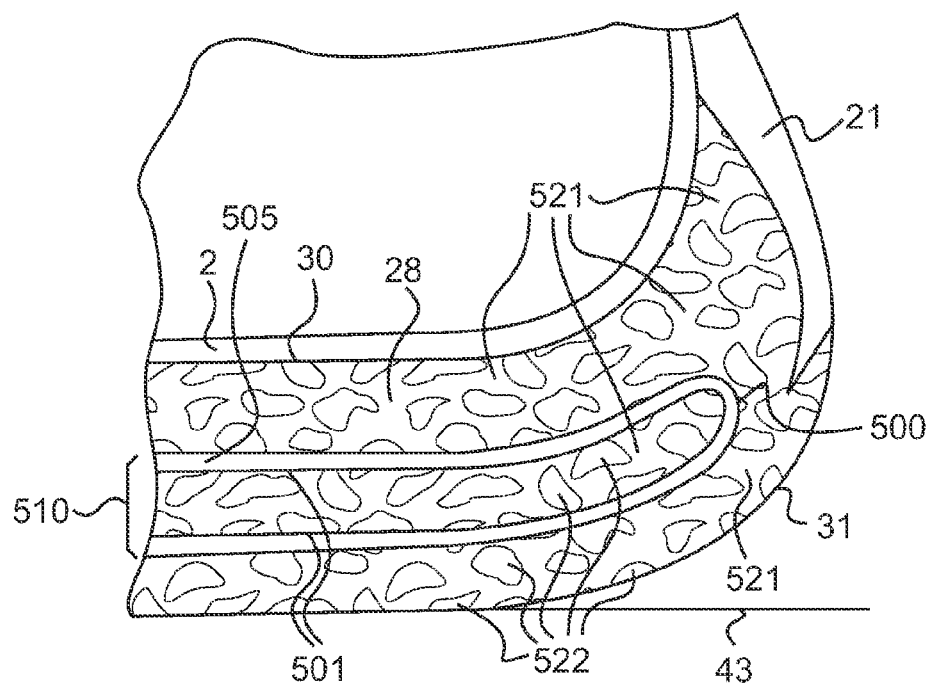
FIG. 55 shows a shoe sole or orthotic frontal plane cross-section of a siped compartment 510 with a mixture plastic and rubber compounds.

FIG. 55 is cross-section enlarged view of slightly more than half of a footwear/orthotic sole 28 comprising at least in part or entirely a mixture or mixtures of any kind of plastic 521 polymers and elastomers and rubber 522 or compounds and combinations thereof, including mixtures including particles or components (including microscopic or at the molecular level) of any number (per unit volume, for example), size, or shape, including compounds with minimal or no substantial or no compression under a body weight load, and can include liquid or gel injection molding. The benefit of the mixture material is create a single material with more flexibility than a typical bottom sole 149 material, while at the same time providing better durability than a typical midsole material 148, including new forms of those materials described by the applicant previously. Optionally, the applicant's 510 and 511 inventions can also in the same manner include the same mixture or another mixture as described in this paragraph, as can removable midsole/orthotic inserts 145.

Figure 56:
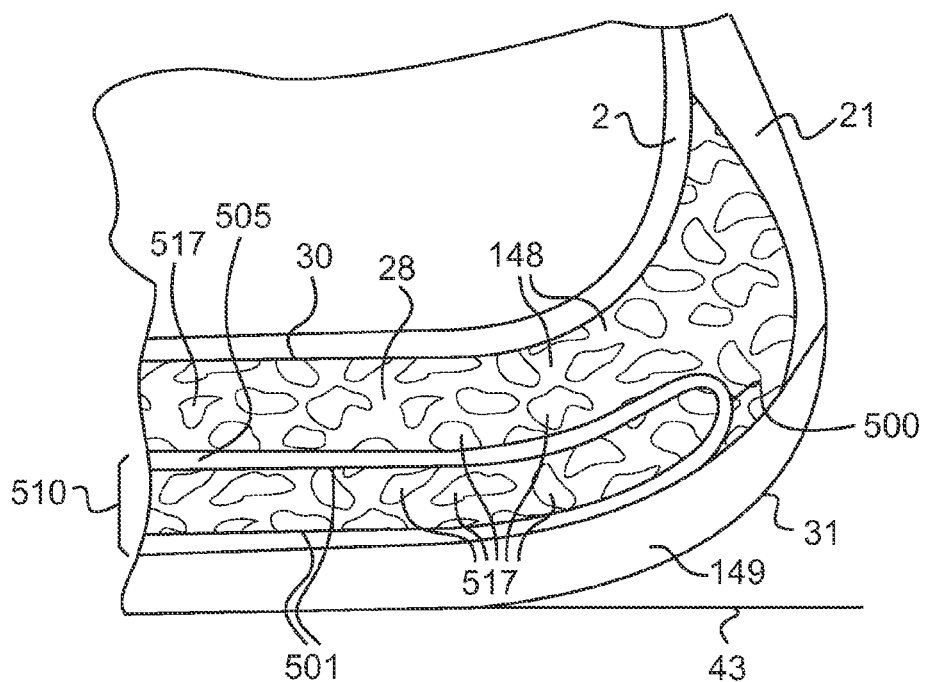
FIG. 56 shows a shoe sole or orthotic frontal plane cross-section of a siped compartment 510 with a mixture of liquid or gel cells.

FIG. 56 is a similar cross-section to FIG. 55 showing a portion of a footwear/orthotic sole 28 comprising at least in part or entirely a midsole 148 material including cells 517 that include a liquid or gel, either partially or substantially or completely. The liquid or gel cells 517 can be of any number (per unit of volume, for example), or size, or shape, and the midsole 148 material surrounding the cells can be non-compressible or not substantially compressible or minimally compressible. The benefit of this material structure is that the liquid or gel cell would be at least minimal compression under a body weight load, in marked contrast to the substantial compression and associated degraded performance of conventional midsole 148 materials with convention gas cells. Liquid or gel injection molding can be utilized therefore in place of gas injection molding.

Any one or more parts of FIGS. 55-56 can be combined with any one or more parts of one or more of the previous Figures of this or the applicant's prior footwear applications or patents incorporated by reference herein. Also, any inventive combination that is not explicitly described above in the example shown in FIGS. 55-56 is implicit in the overall invention of this application and, consequently, any part of the example embodiments shown in preceding FIGS. 44-56 and/or associated textual specification can be combined with any other part of any one or more other elements of each other or the invention and prior art examples described in FIGS. 1-54 and 57-79 and/or associated textual specification and/or, in addition, can be combined usefully with each other or any one or more other elements of the inventive or prior examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 57:
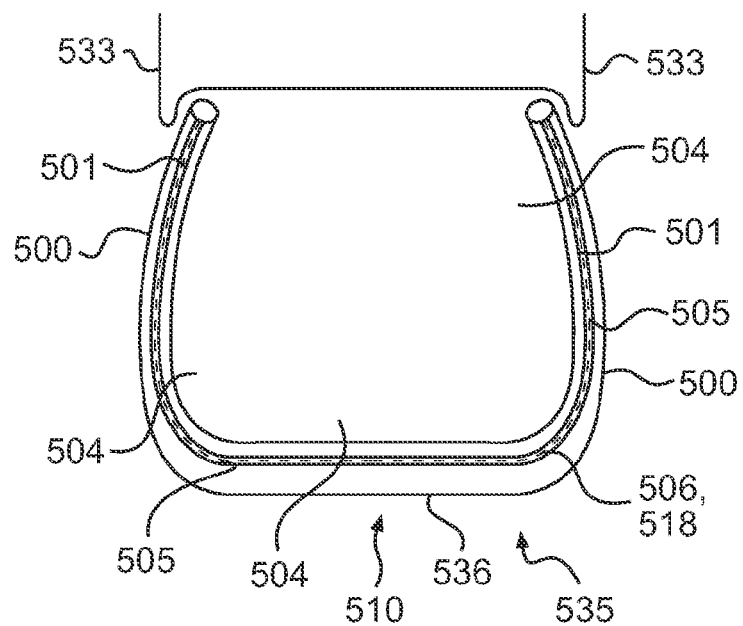
FIG. 57 shows a tire with an internal sipe 505 with a media 506 and/or fiber 516 between and inner and outer tires.
Figure 58:
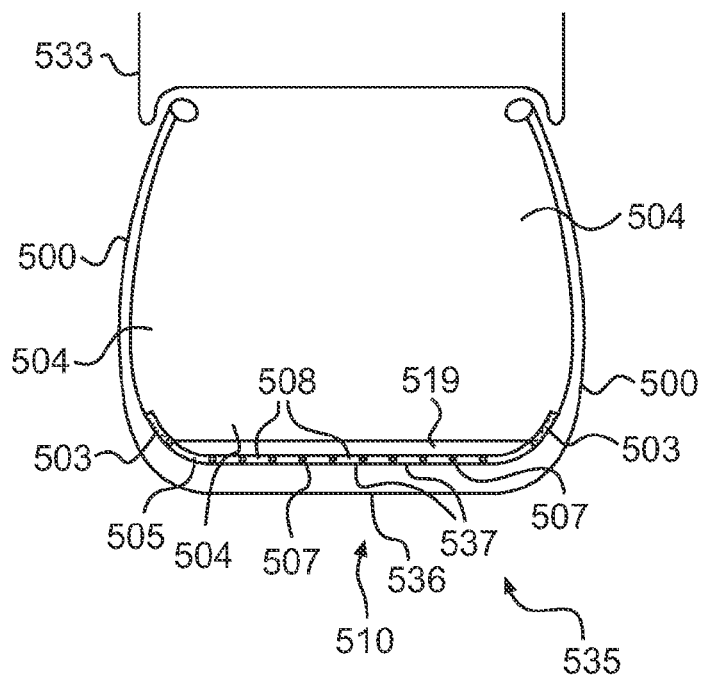
FIG. 58 shows a tire with magnetorheological fluid 508 and piezoelectric 519 components

FIGS. 57 and 58 are additional examples of embodiments of the applicant's 510/511/513 inventions applied to tire 535 design, as were earlier FIGS. 28A and 28B. FIG. 57 shows a cross-section of a tire 535 embodiment with an outer tire 500 and an inner tire 501, with an internal sipe 505 between the two tires 500 and 501; and the sipe 505 shown includes media 506 and/or fiber 518, such as Kevlar™ and/or carbon fiber or any other fiber (or steel or other metal cable), on for example the outer surface of the inner tire 501 (or embedded therein or thereon).

FIG. 58 shows an example embodiment of a tire 535 with an internal sipe 505 above the tread 526 area and, for one example, above steel belts 537; the internal sipe 505 includes a Magnetorheoloical Fluid 508 and in proximity to the sipe 505, such as directly above as shown, can be Piezoelectric components 519 that can provide activating current under stress such as tire deformation to the magnetic fluid 508 to make it resistant to further deformation; i.e., the greater the stress deformation, the greater the resistance to further deformation, making the tire 535 a self-powered active suspension component.

Any one or more parts of FIGS. 53 and 57-58 can be combined with any one or more parts of one or more of the previous Figures of this or the applicant's prior footwear applications or patents incorporated by reference herein. Also, any inventive combination that is not explicitly described above in the example shown in FIGS. 53 and 57-58 is implicit in the overall invention of this application and, consequently, any part of the example embodiments shown in preceding FIGS. 53 and 57-58 and/or associated textual specification can be combined with any other part of any one or more other elements of each other or the invention and prior art examples described in FIGS. 1-52, 54-56, and 59-79 and/or associated textual specification and/or, in addition, can be combined usefully any one or more other elements of each other or the inventive examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 59:
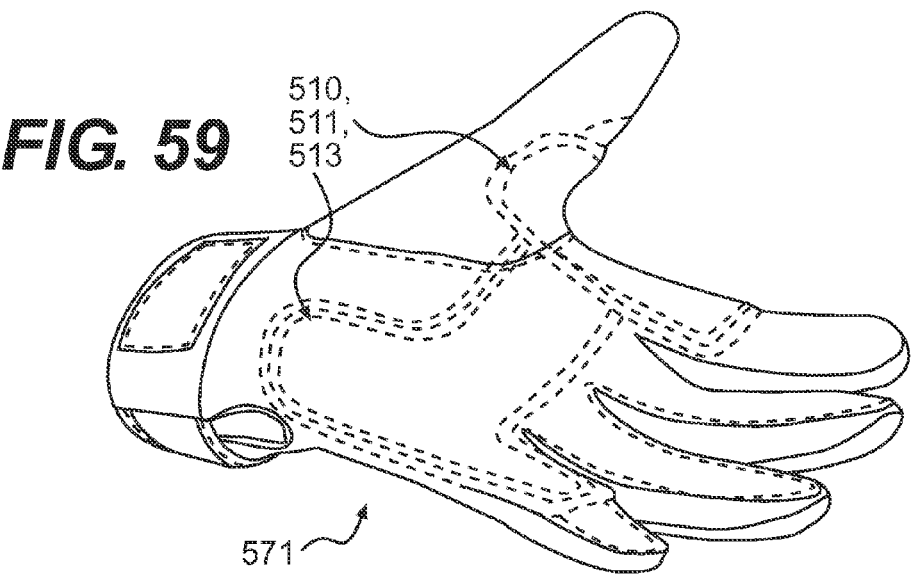
FIG. 59 shows a glove with the 510/511/513 inventions.

FIG. 59 shows a perspective view of a glove 571 (or mitten or mitt, such as a baseball mitt, with an example embodiment of the applicant's 510 or 511 or 513 invention in two areas; any of the inventions can be used in any area of the glove or any number or in combination with each other and can be asymmetrical between right and left, or any other of the previously described variations can be used beneficially.

Figure 60C:
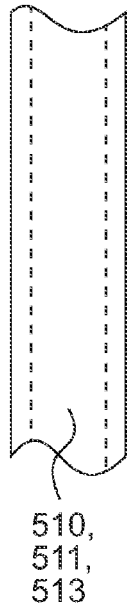
FIGS. 60A-60C shows apparel with the 510/511/513 inventions.
Figure 60A:
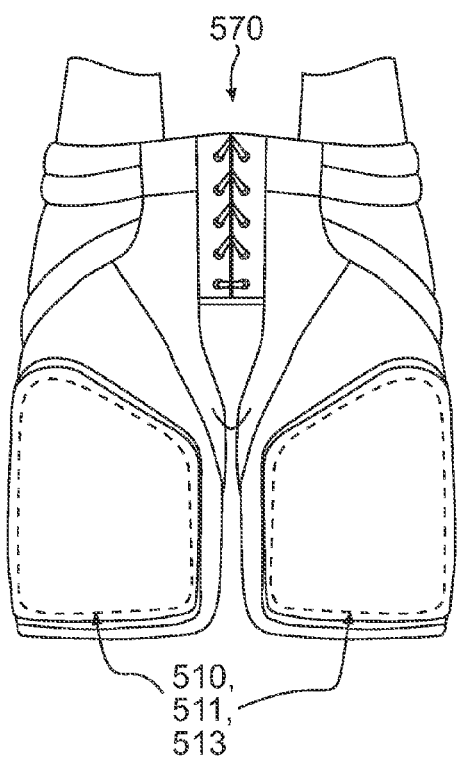
Figure 60B:
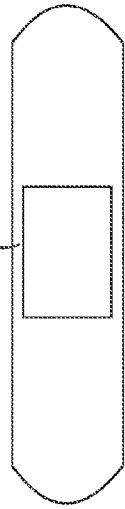

FIG. 60A shows a perspective view of example embodiments of protective apparel or clothing 570 such as pant or shorts with the applicant's 510 or 511 or 513 invention used in two areas. Similarly, FIGS. 60B and 60C show exemplary embodiments including dressings, as well as bandages and tape with the applicant's 510 or 511 or 513 invention. It is understood that other protective apparel, clothing, and dressing embodiments with any of the previously described variations can be used beneficially.

Any one or more parts of FIGS. 59 and 60A-60C can be combined with any one or more parts of one or more of the previous Figures of this or the applicant's prior footwear applications or patents incorporated by reference herein. Also, any inventive combination that is not explicitly described above in the example shown in FIGS. 59 and 60A-60C is implicit in the overall invention of this application and, consequently, any part of the example embodiments shown in preceding FIGS. 59 and 60A-60C and/or associated textual specification can be combined with any other part of any one or more other elements of each other or the invention and prior art examples described in FIGS. 1-58 and 61-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 61A:
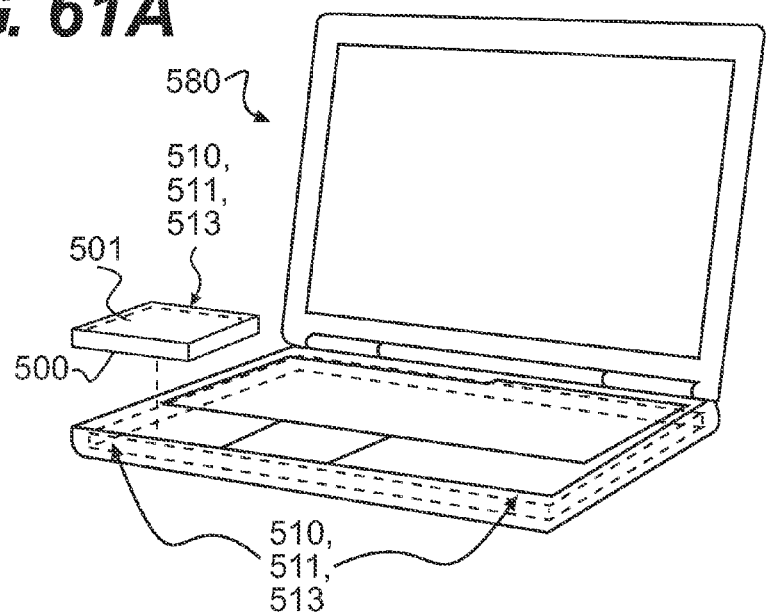
FIG. 61A shows a computer laptop with the 510/511/513 inventions and FIG. 61B shows a semiconductor microchip with the 510/511/513 inventions.
Figure 61B:
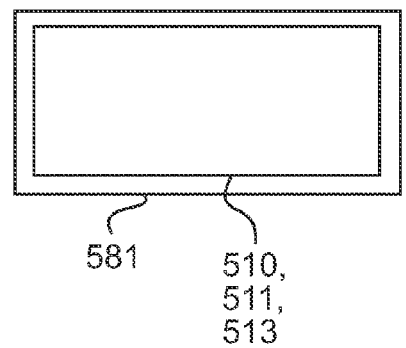

FIG. 61A shows a perspective view of a laptop personal computer 580 or any other electronic device with one of a potential multitude of potential example embodiments of the applicant's 510 or 511 or 513 inventions described above are used in two areas, but other useful embodiments with any of the previously described variations can be employed beneficially. For example, as shown, the 510/511/513 inventions can be used for cushioning selected corners of the laptop or can be integrated in the laptop frame in the same or other areas; and/or individual components of the laptop computer such as a harddrive can be protected by being mounted in a protected 510/511/513, such as the housing of the harddrive forming an inner compartment 501 of the 510 siped compartment invention. FIG. 61B shows a semiconductor microchip device 581 example including a part of a die or an entire die or multiple dies assembled together using the applicant's 510/511/513 invention; other devices 581 can include other micro- and nanotechnology devices, including microelectromechanical systems (MEMS), field-programmable gate arrays (FPGA's) and faraday cages, photovoltaic cells, fuel cells, batteries, and including devices assembled at the molecular or anatomic scale.

Any one or more parts of FIGS. 61A-61B can be combined with any one or more parts of one or more of the previous Figures of this or the applicant's prior footwear applications or patents incorporated by reference herein. Also, any inventive combination that is not explicitly described above in the example shown in FIGS. 61A-61B is implicit in the overall invention of this application and, consequently, any part of the example embodiments shown in preceding FIGS. 61A-61B and/or associated textual specification can be combined with any other part of any one or more other elements of each other or the invention and prior art examples described in FIGS. 1-60 and 62-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 62:
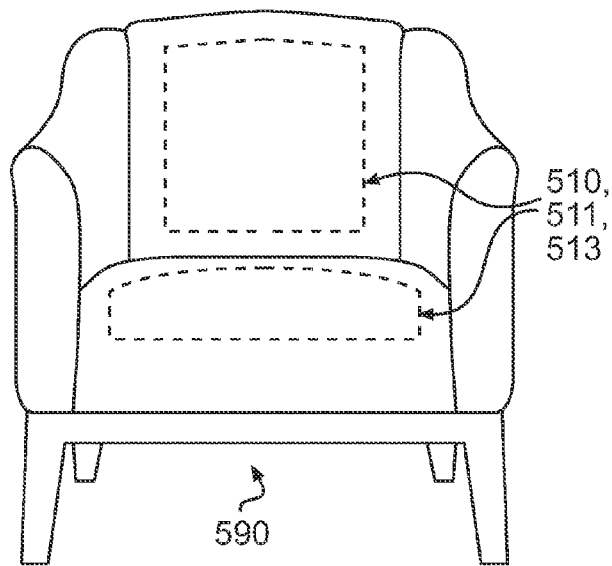
FIG. 62 shows a chair with the 510/511/513 inventions.

FIG. 62 shows a perspective view of a piece of cushioned furniture 590, such as the chair shown, with an example embodiment of the applicant's 510 or 511 or 513 invention shown in the seat cushion and the back cushion, but many other embodiments with any of the previously described variations can be usefully employed.

FIG. 63 shows a perspective view of a bed with a mattress 591 having an example embodiment of the applicant's 510 or 511 or 513 invention, which can also be used as a separate mattress topper, and either can be in the form of many other embodiments with any of the previously described variations.

FIGS. 64 and 65 show perspective view of a pillow 591 and a wedge cushion 591, respectively, each with an example embodiment of the applicant's 510 or 511 or 513 invention, and many other embodiments with any of the previously described variations can be usefully employed with either.

Any one or more parts of FIGS. 62-65 can be combined with any one or more parts of one or more of the previous Figures of this or the applicant's prior footwear applications or patents incorporated by reference herein. Also, any inventive combination that is not explicitly described above in the example shown in FIGS. 62-65 is implicit in the overall invention of this application and, consequently, any part of the example embodiments shown in preceding FIGS. 62-65 and/or associated textual specification can be combined with any other part of any one or more other elements of each other or the invention and prior art examples described in FIGS. 1-61 and 66-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 66:
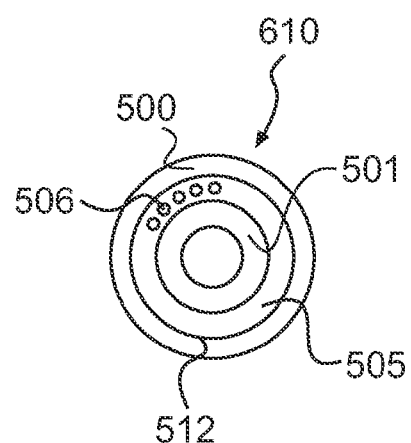
FIG. 66 shows a cable with the 510/511/513 inventions.

FIG. 66 shows a cross-section through radius view of the roughly circular example embodiment of a cable 610 of wire or optical fiber or waveguide (including optical omniguide), for example, with inner and outer layers (such as 501 and 500 or 512) and an internal sipe 505 between layers, as one example of the applicant's 510 or 511 or 513 inventions; alternatively, FIG. 66 can show a hose schematically, with the center hollow and proportionately larger. Many other useful embodiments of either with any of the previously described variations are potentially beneficial.

Any one or more parts of FIG. 66 can be combined with any one or more parts of one or more of the previous Figures of this or the applicant's prior footwear applications or patents incorporated by reference herein. Also, any inventive combination that is not explicitly described above in the example shown in FIG. 66 is implicit in the overall invention of this application and, consequently, any part of the example embodiments shown in preceding FIG. 66 and/or associated textual specification can be combined with any other part of any one or more other elements of the invention and prior art examples described in FIGS. 1-65 and 67-79 and/or associated textual specification and/or, in addition, can be combined usefully with any one or more other elements of the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 67:
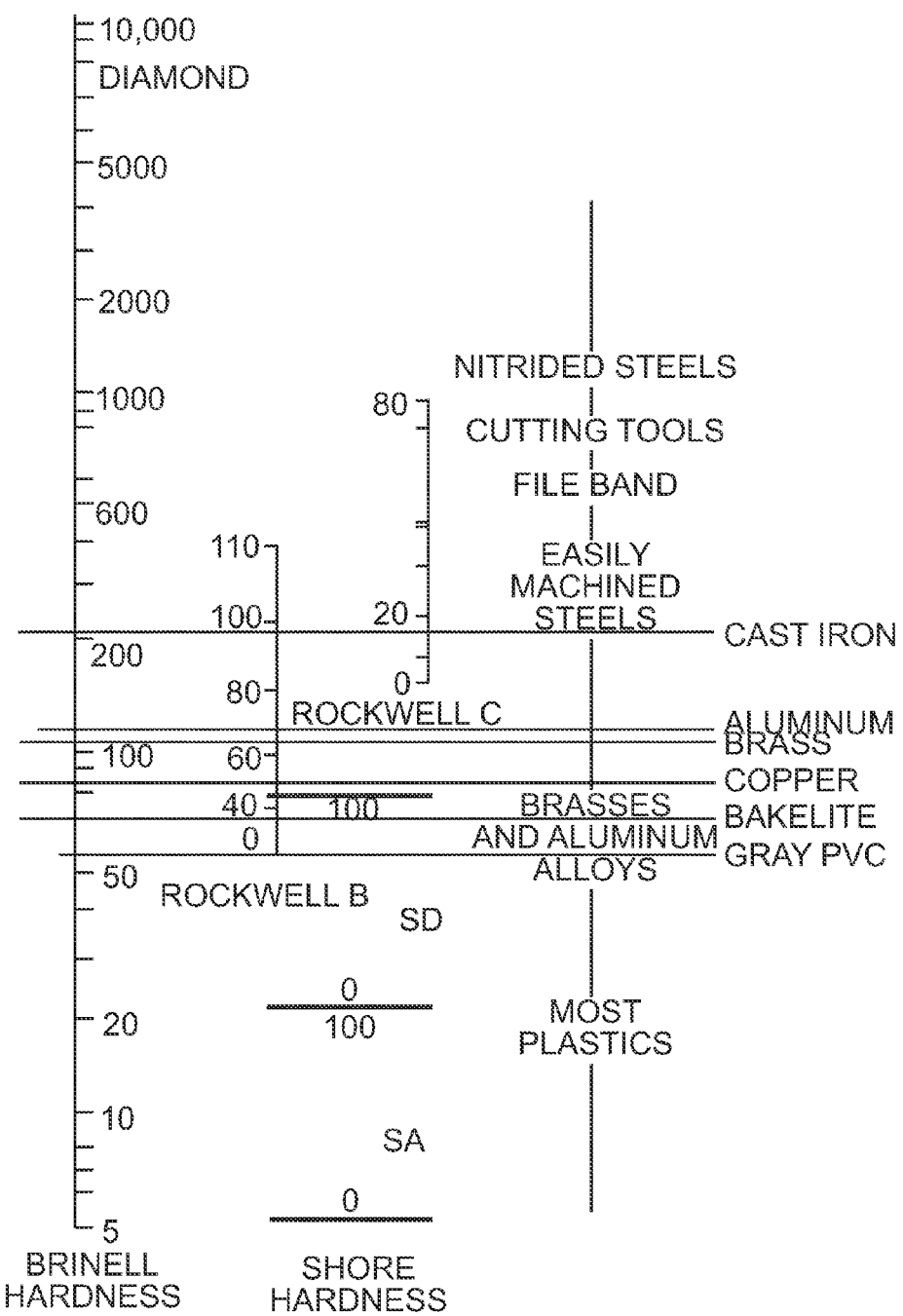
FIG. 67 is a chart showing approximate comparison of hardness scales.

FIG. 67 shows a chart displaying "Approximate Comparison of Hardness Scales". Products using the 510 or 511 or 513 inventions can be made of any material and any material hardness shown in chart, including Rockwell C and B Scales and Brinell Hardness Scale, including metallic and ceramic, generally for non-cushioning, relatively rigid structural elements into which a degree of flexibility is to be introduced using the applicant's 510/511/513 inventions, specific examples of which are shown in FIGS. 24C-24D, 30A-30C, 31B, 32B, 61, 68, 69, 71, and 73A.

Figure 68:
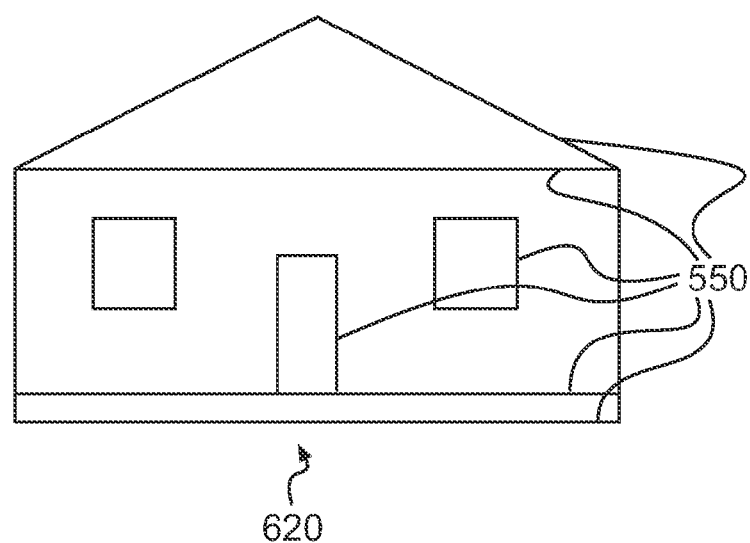
FIG. 68 shows a building with the 510/511/513 inventions.

FIG. 68 shows an example of a building 620 such as a house including a foundation, the building including a multitude of architectural components including any structural component with any of the applicant's 510/511/513 inventions, including foundation, wall, flooring, door, ceiling, window, and roof components.

Figure 69:
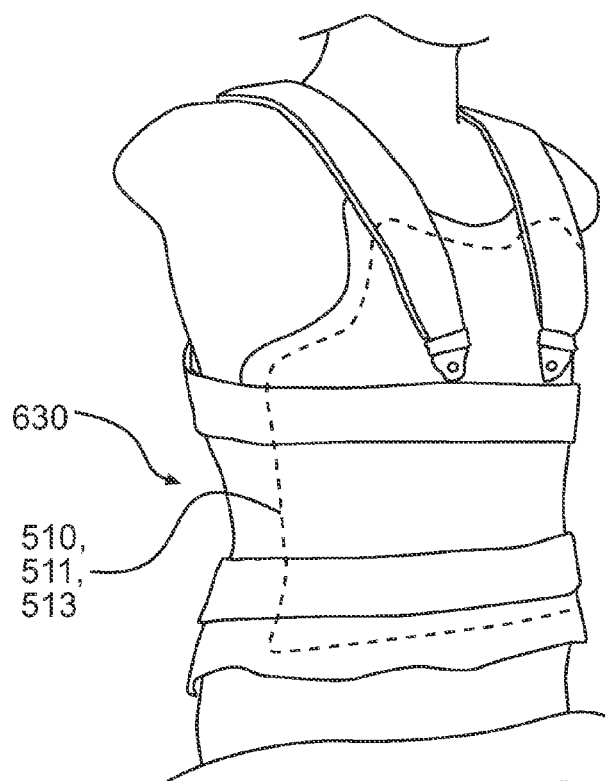
FIGS. 69-70 shows torso and knee braces.

FIG. 69 shows an example of a human torso brace 630 with any of the applicant's 510/511/513 inventions with cushioning components and/or more rigid protective components.

Figure 70:
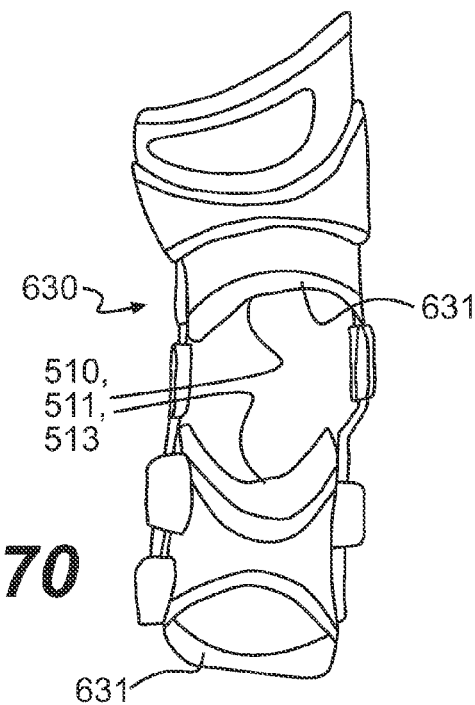

FIG. 70 shows an example of a knee brace 630 with inner pads 631 with any of the applicant's 510/511/513 inventions.

Any one or more parts of FIGS. 69-70 can be combined with any one or more parts of one or more of the previous Figures of this or the applicant's prior footwear applications or patents incorporated by reference herein. Also, any inventive combination that is not explicitly described above in the example shown in FIGS. 69-70 is implicit in the overall invention of this application and, consequently, any part of the example embodiments shown in preceding FIGS. 69-70 and/or associated textual specification can be combined with any other part of any one or more other elements of each other or the invention and prior art examples described in FIGS. 1-68 and 71-79 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 71:
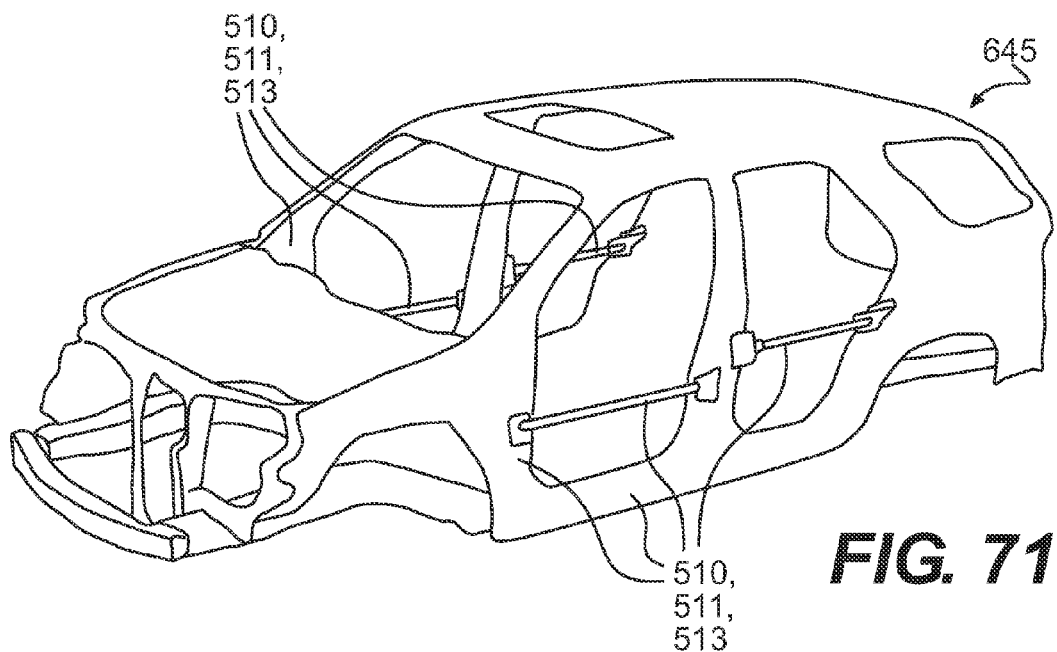
FIGS. 71-72 shows automobile examples of the 510/511/513 inventions.

FIG. 71 shows that any of the structural components of an example of a transportation vehicle 645 such as a automobile, bus, truck, motorcycle, boat, barge, airplane, helicopter, blimp, or any other transportation or work vehicle can beneficially incorporate any of the applicant's 510/511/513 inventions.

Figure 72:
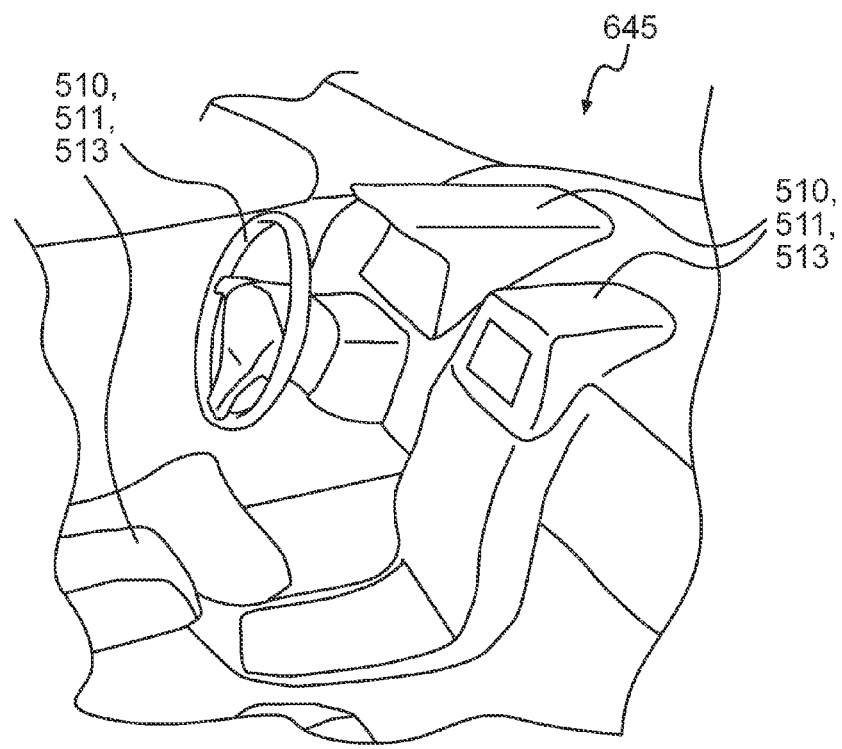

FIG. 72 shows that any of the cushioning components of an example of an interior 646 of a transportation vehicle such as a automobile, bus, truck, motorcycle, boat, barge, airplane, helicopter, blimp, or any other transportation or work vehicle can beneficially incorporate any of the applicant's 510/511/513 inventions.

FIG. 73B shows a prior art tennis racquet and FIG. 73A shows an example of a tennis or other sports racquet 550 or sports stick for hockey or lacrosse or golf club shaft that can beneficially incorporates any of the applicant's 510/511/513 inventions.

FIGS. 74-79 show other examples such as electronic game controllers or any other remote controllers 580, manual tools 550, power tools 550, household tools 550 like electric irons, bicycles 640 and cell phones 580 that can beneficially incorporates any of the applicant's 510/511/513.

Any one or more parts of FIGS. 68 and 71-79 can be combined with any one or more parts of one or more of the previous Figures of this or the applicant's prior footwear applications or patents incorporated by reference herein. Also, any inventive combination that is not explicitly described above in the example shown in FIGS. 68 and 71-79 is implicit in the overall invention of this application and, consequently, any part of the example embodiments shown in preceding FIGS. 68 and 71-79 and/or associated textual specification can be combined with any other part of any one or more other elements of each other or the invention and prior art examples described in FIGS. 1-67 and 69-70 and/or associated textual specification and/or, in addition, can be combined usefully with any one or more other elements of each other or the inventive or prior art examples shown in prior published FIGS. 1-75 of the '869 patent and the '087, '034 and '665 applications, as well as additional FIGS. 76-80, 81A-81D and 82A-82C of the '665 application, and also added FIGS. 1-43 of the '887 application.

Figure 80A:
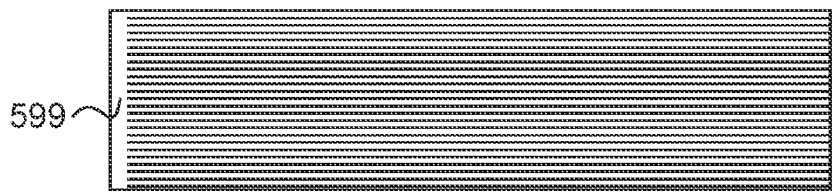
FIGS. 80A-80C show a large urban telephone book lying flat, solid wooden block, and an upright very thick book to illustrate basic concepts of sipe flexibility and stability.
Figure 80B:
Figure 80C:
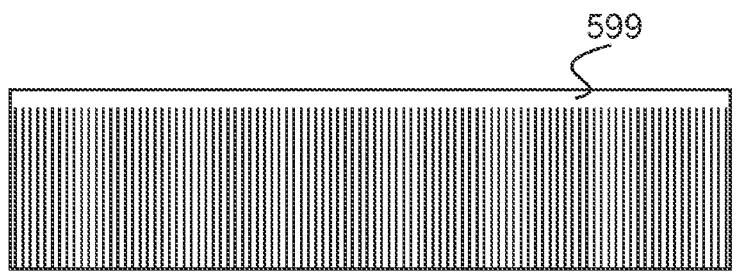

FIG. 80A shows that, in an analogous way, especially to the thicker heel portion of a typical shoe sole, a thick urban area telephone book has in effect hundreds of mostly "internal sipes", each page being in effect separated by a horizontal internal slit from each adjacent page, each of which thereby is able to move freely relative to each other, resulting in a flexible telephone book that bends quite easily as is well known by all, while at the same time relatively stable when a vertical force like body weight is applied. FIG. 80B shows, in contrast, if the same wood fiber material with the same dimensions as a thick telephone book were formed instead into a single piece of wood with no pages, like a solid particle board, it would be quite rigid with little flexibility, although it will support a body weight stably. FIG. 80C shows if, instead, the sipes were rotated 90 degrees into vertical slits and open to the bottom, so that the spine of a much wider telephone book with shorter pages is on top (in the form of a shoe sole with deep open external sipes, those external sipes would also provide a substantial amount of flexibility like that of the human foot sole, but at the cost of excessive instability when a vertical force like body weight is applied, as is obvious from common experience, since the pages will splay out uncontrollably.

Figure 81A:
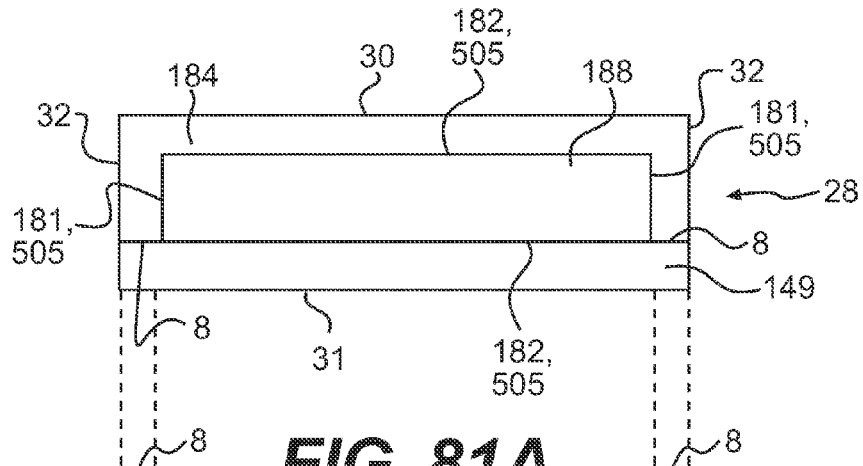
FIGS. 81A-81D show the much larger and more conventional attachment area between midsole and bottomsole for a shoe sole or orthotic with the 510/511/513 invention of FIGS. 81C-81D compared to prior shoe sole sipe inventions of FIGS. 81A-81B.
Figure 81B:

FIGS. 81A-81D shows the a significant benefit of the applicant's insertable sipe component 510/511/513 compared to the applicant's earlier sipe invention, which is shown in FIG. 81A (which is FIG. 12B of the '665 application), wherein sipes are indicated by numerals 181 and 182, which allows an inner midsole section 188 to move freely inside outer midsole sections 184 and a bottom sole 149. The sipes are created by not gluing the three sections together during assembly of the shoe sole except where the outer midsole sections 184 join the bottom sole 149 at numeral 8. FIG. 81B highlights the very small area of the glue joint, which requires a delicate and new manufacturing glue step of great accuracy during assembly and a resulting relatively weak joint between bottom sole and midsole, for example.

Figure 81C:
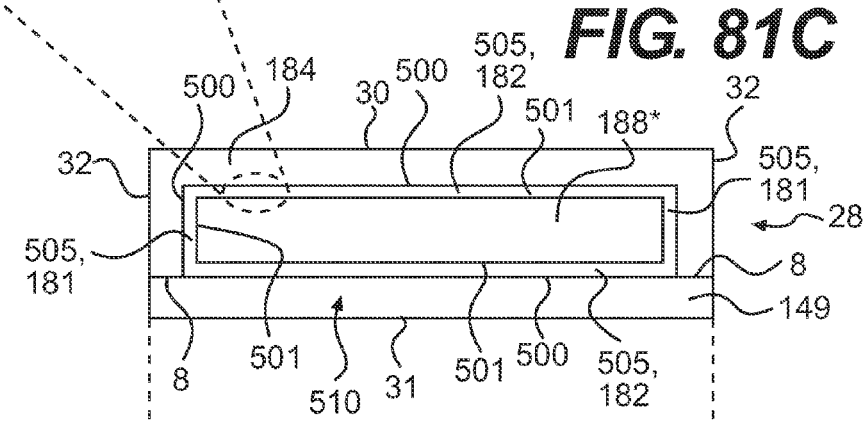
Figure 81D:
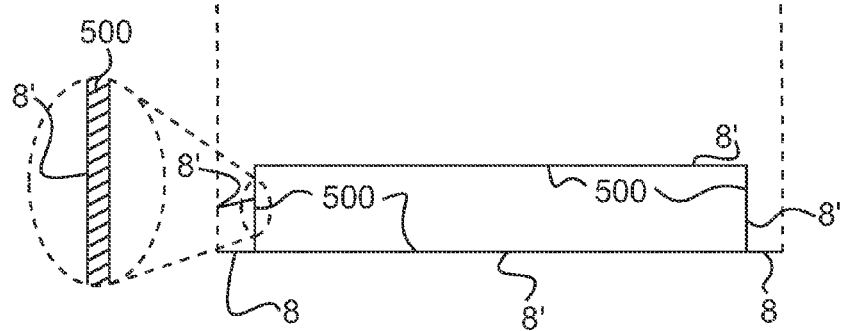

FIG. 81C shows an example of the applicant's 510 invention that illustrates the much larger glue joint between midsole and bottomsole surfaces allowed through the use of the outer chamber 500 component, all of which can be glued to the surrounding midsole and bottomsole in a conventional assembly fashion, so that manufacturing of a shoe sole with the 510 invention is much simpler and unchanged from normal current practice for assembling conventional shoe soles with gas bladders like Nike Air™ and the resulting bond between bottomsole and midsole is much more secure, similar to that of a conventional shoe sole. FIG. 81D shows the very much larger surface area 8 used for gluing the bottom sole 149 to the outer midsole 184 (compared to the small glue area 8 shown in FIG. 81B and resulting much weaker joint between sole components in the earlier FIG. 81A sipe invention than in conventional shoe soles).

FIGS. 82A-82C, 83A-83C, 84A-84F, 85A-85D, 86A-86E and 87 illustrate further embodiments of the use of internally siped compartments or chambers (510) and/or flexible inserts and internal sipe components (511 and 513) with different shoe sole or orthotic configurations. FIG. 82A-82C, 83A-83C, 84A-84F, 85A-85D, 86A-86E and 87 are example embodiments of the 510 or 511 or 513 inventions in the embodiments shown in FIG. 11A-11C, 21-23, 39A-39E & 40, 49A-49D, 51A-51E, and 62 of U.S. application Ser. No. 11/282,665, filed Nov. 21, 2005 and published on Nov. 9, 2006, on Pub. No. US 2006/0248749 A1, which is incorporated by reference in this application.

Any example of a new invention shown in the preceding FIGS. 1-81 and/or associated textual specification can be combined with any other part of any one or more other of the prior art or the applicant's prior invention examples shown in FIGS. 1-3, 5-7, 9, 11-42, 44-52, 55-62, 64-82 from prior published FIGS. 1-75 of the '087, '034 and '665 applications and '869 patent, and FIGS. 76-80, 81A-81D and 82A-82C of the '665 application, as well as FIGS. 1-43 of the '887 application (all of which have been herein incorporated by reference), and/or combined with any one or more other of subsequent new inventions shown in the examples described in FIGS. 1-79 and/or associated textual specification of this application to make new and useful improvements over the existing art.

The many preceding examples of embodiments of the applicant's inventions, devices or flexible inserts or components 510, 511, and 513, have many useful applications. Generally, the resilient inserts 510, 511, and 513 can be used for cushioning an object or a user, including cushioning equipment and apparel for athletic or non-athletic, occupational, recreational, medical, and other uses, including a footwear sole or upper or orthotic or orthotic upper, as well as over-the-counter footwear inserts, such as pads, insoles or arch supports.

The flexible inserts or components 510, 511, and 513 can be used in any protective clothing, like flexible insert 510 in the interior of the helmet shown in FIG. 24 that can be employed for any typical helmet applications, examples including sports like American football, biking, climbing or hockey and others; occupational, like construction or military or others; and transportation, like motorcycle, bicycle, automobile, or other; the flexible insert 510 (or 511 or 513 as useful alternatives) is shown as padding inside a relatively hard or semi-hard outer shell protective material including materials like plastic, carbon-fiber, ceramic, or other composites or metal or combinations thereof. The flexible inserts 510, 511, and 513 can be used in a similar shell construction for athletic or military protective equipment like face masks (which can be attached or integrated into the helmet), neck, shoulder, chest, hip, knee or elbow, shin and forearm guards, thigh or biceps guards, groin, hand, foot, and other guards, pads, or protectors.

Alternatively, flexible inserts or components 510, 511, and 513 can be used as padding alone or with a soft or relatively soft outer surface (without a hard shell) for medical uses (prescriptive or over the counter) like generally in the field of orthopaedics (like braces, such as back or leg or ankle braces and replacement spinal or other disks for spinal or other joint surgery or non-joint surgery), plastic surgery (including breast and other fatty deposit replacement/enhancement implants), prosthetics and podiatrics, and elderly or recuperative care to protect the above noted anatomical structures and for dental applications, like mouth guards (athletic teeth protectors and night guards and braces); in addition, similar padding can be used on artificial limbs and other prosthetic devices or braces and handles or grips, such as for crutches, walkers, canes; or in sports rackets or tools, like hammers, including powered, and handlebars, and guns and rifles and other devices with recoil shock; or for safety padding for crash protection, such padding for automobile dashboards or seat backs (including in airplanes, buses, and crash safety inflatable air bags.

Broadly, the flexible inserts or components 510, 511, and 513 can be usefully employed anywhere that cushioning already is being used, including bed and other furniture cushioning (including for special seating needs, like bicycle or other seats), packaging for shipping, luggage, playground and other flooring, protective padding or cases for equipment of any sort, including portable devices like PC laptops or video players and/or games, cell phones, personal digital assistants (PDA's), and personal digital music players like Apple Ipods™ and MP3 players, as examples, such as the mounting of delicate electronic (or other) components like hard-drives or for vibration dampening, such as in automobile structural and body components and connections.

Figure 82A:
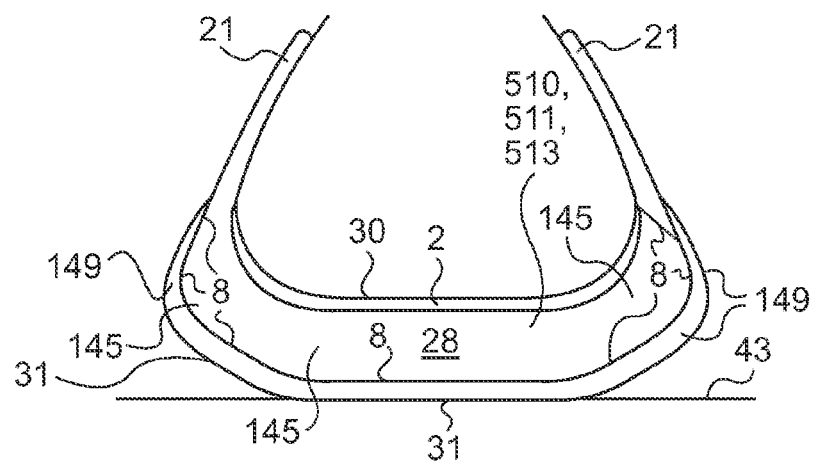
FIGS. 82A-82C, 83A-83C, 84A-84F, 85A-85D, 86A-86E and 87 illustrate further embodiments of the use of siped compartments or chambers (510) and/or flexible inserts and internal sipe components (511 and 513) with different shoe sole configurations.
Figure 82B:
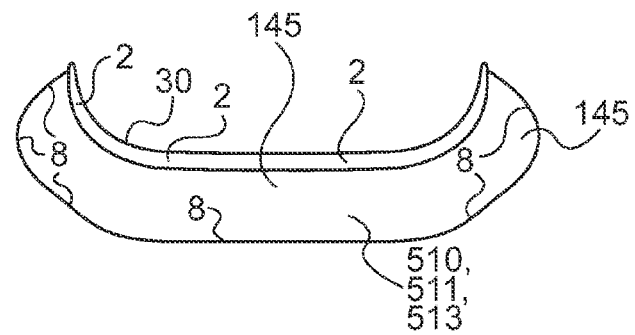
Figure 82C:
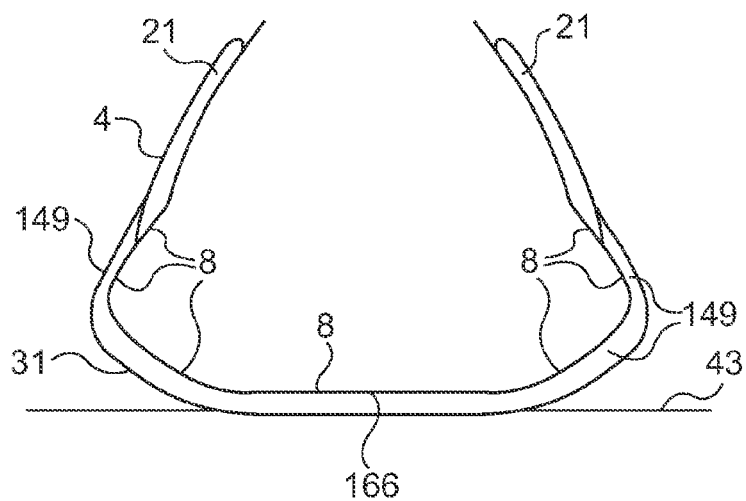
Figure 83A:
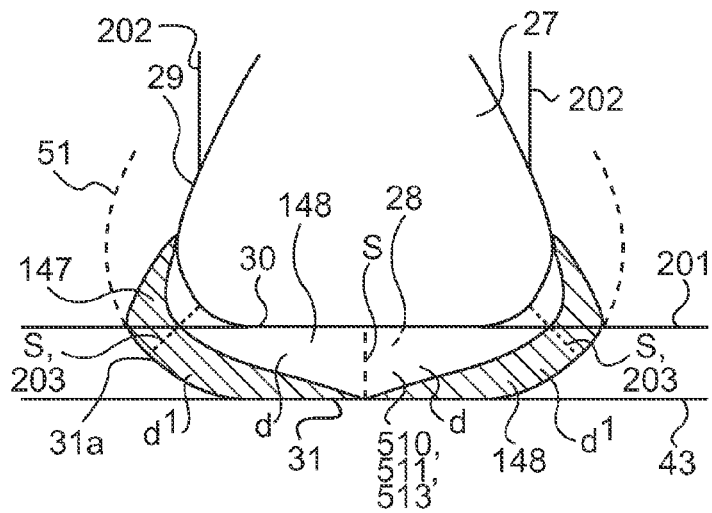
Figure 83B:
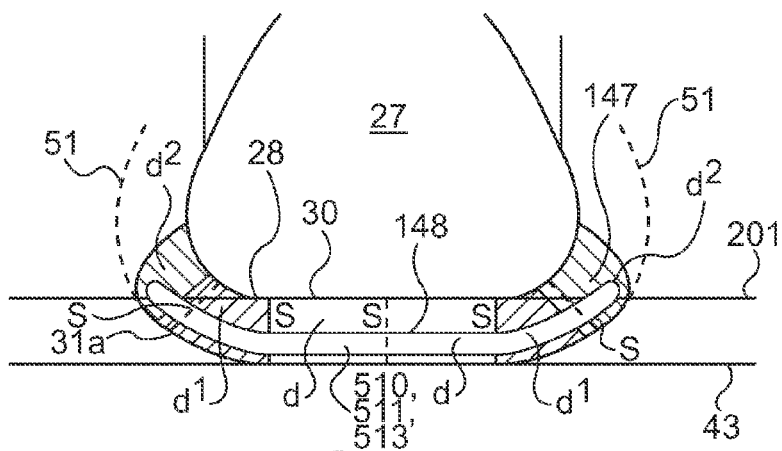
Figure 83C:
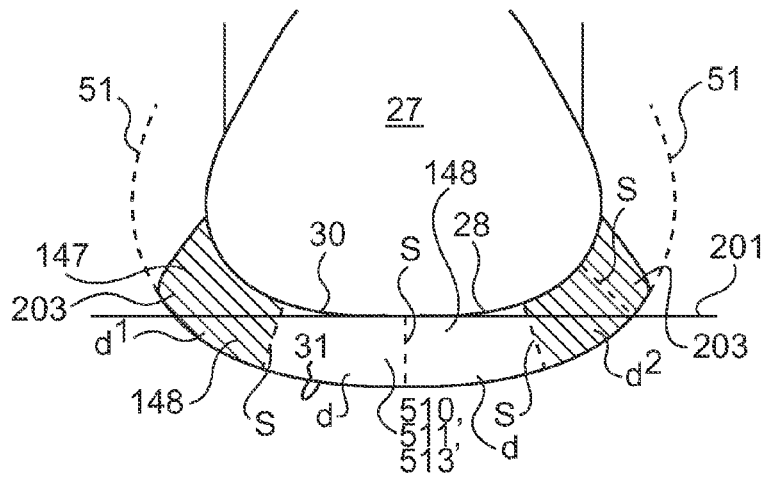
Figure 84A:
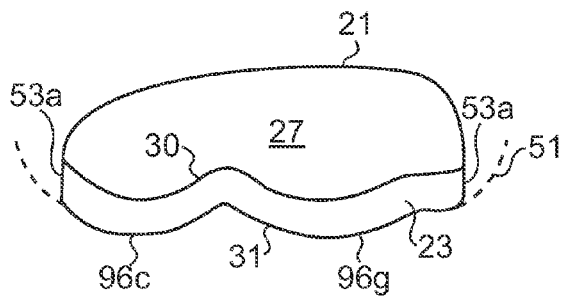
Figure 84B:
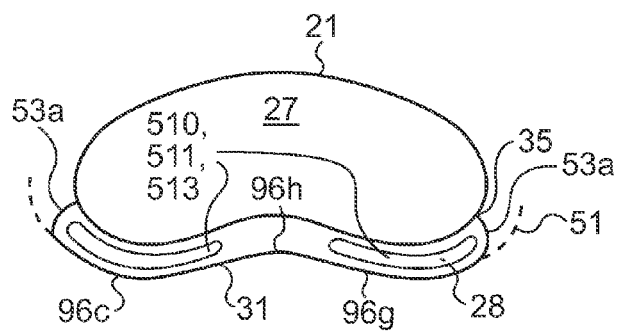
Figure 84C:
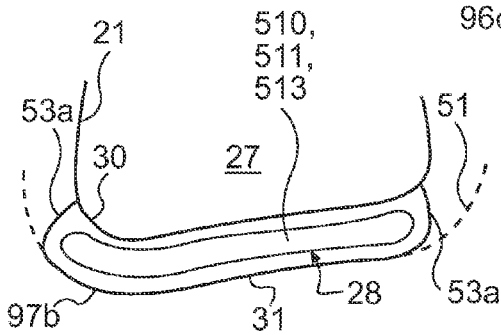
Figure 84D:
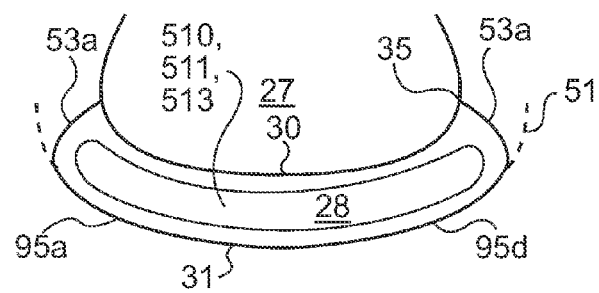
Figure 84E:
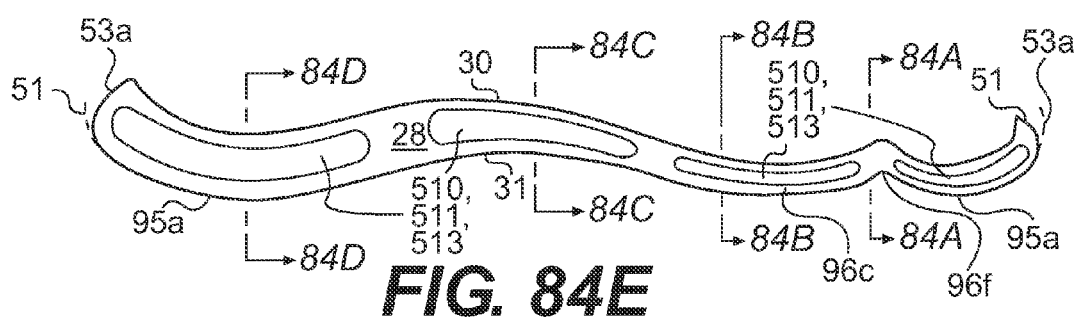
Figure 84F:
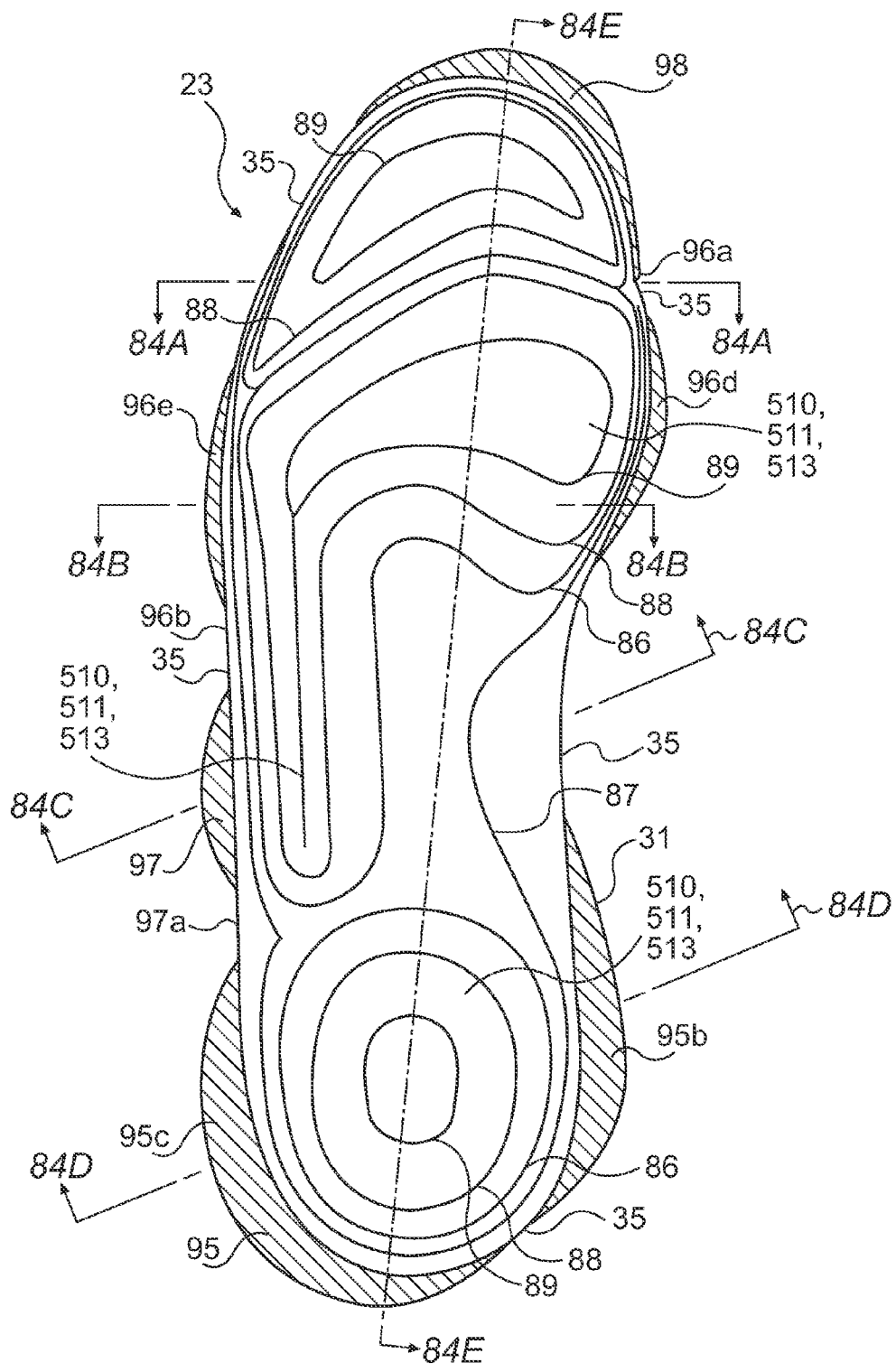
Figure 85A:
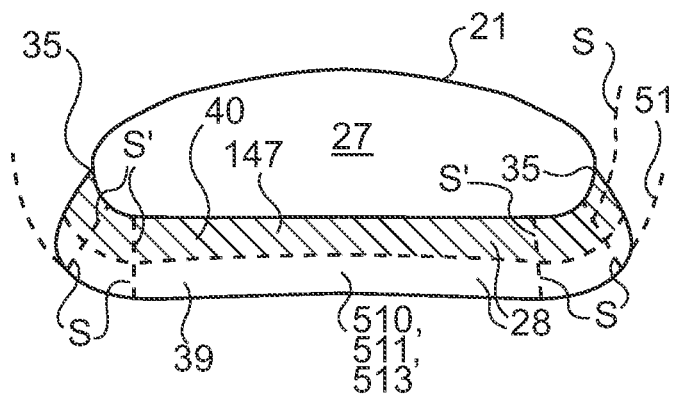
Figure 85B:
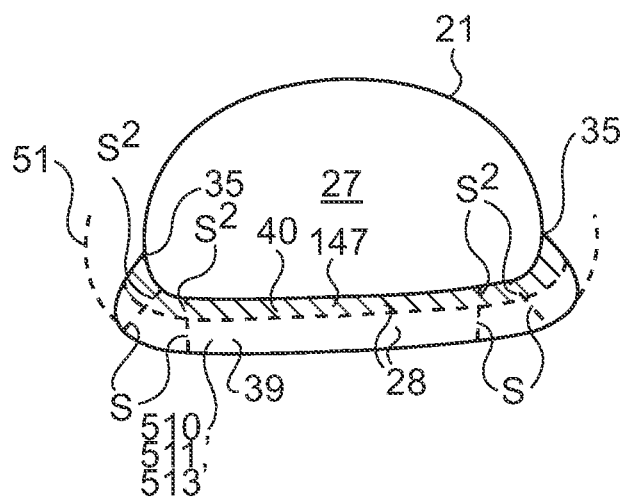
Figure 85C:
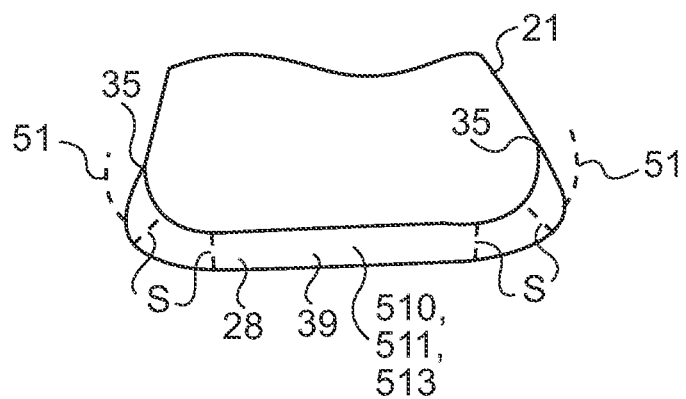
Figure 85D:
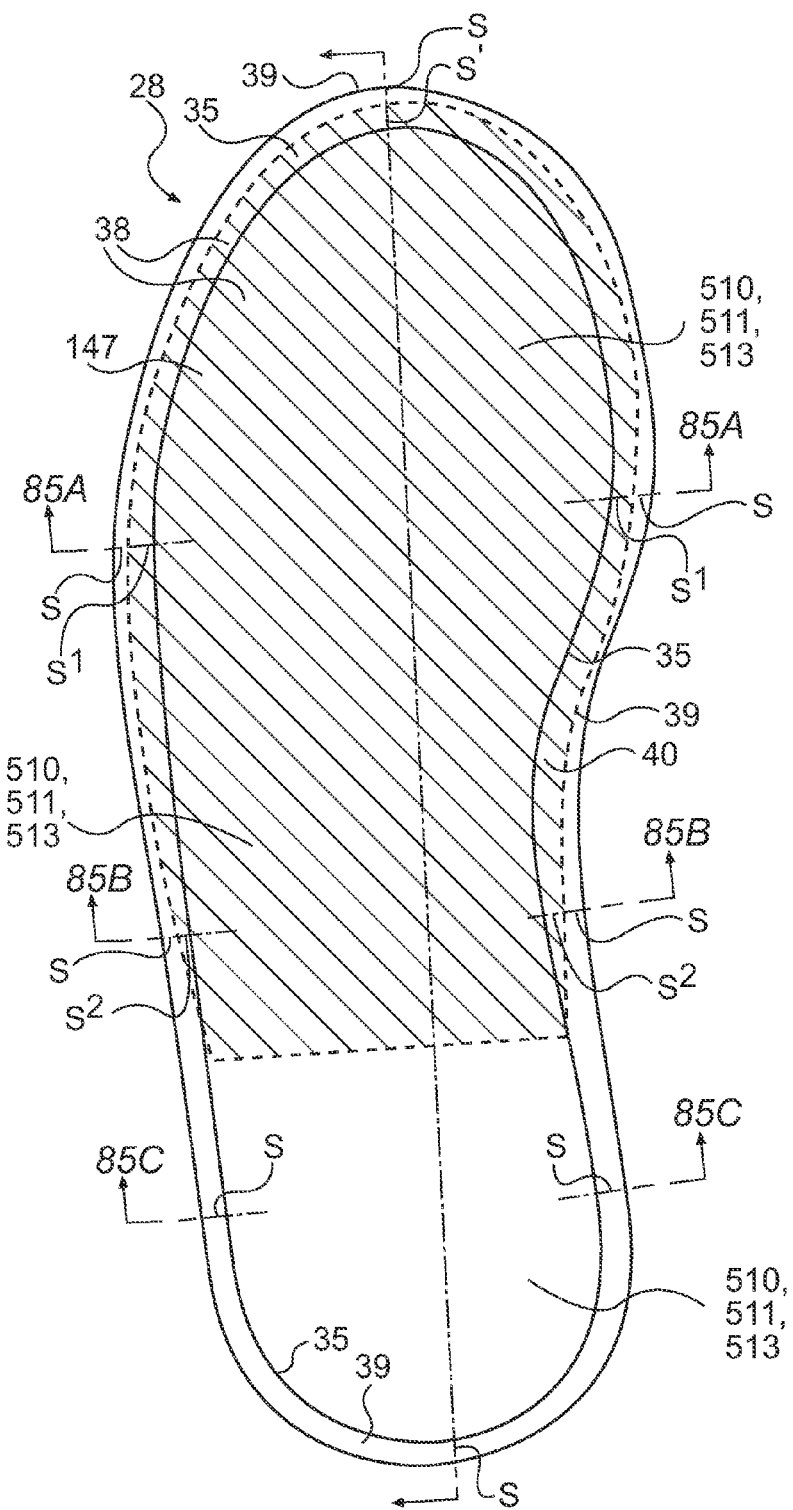
Figure 86A:
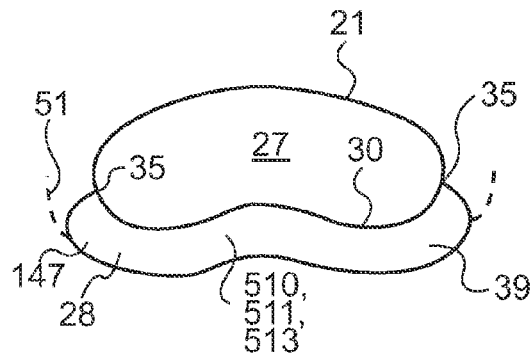
Figure 86B:
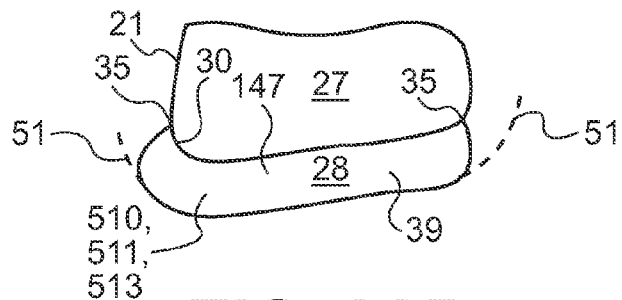
Figure 86C:
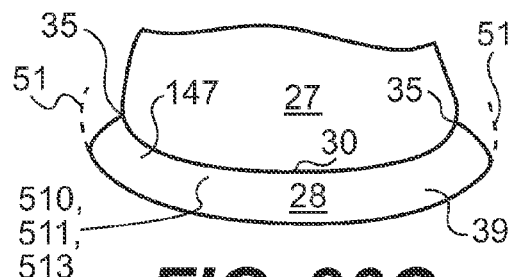
Figure 86E:
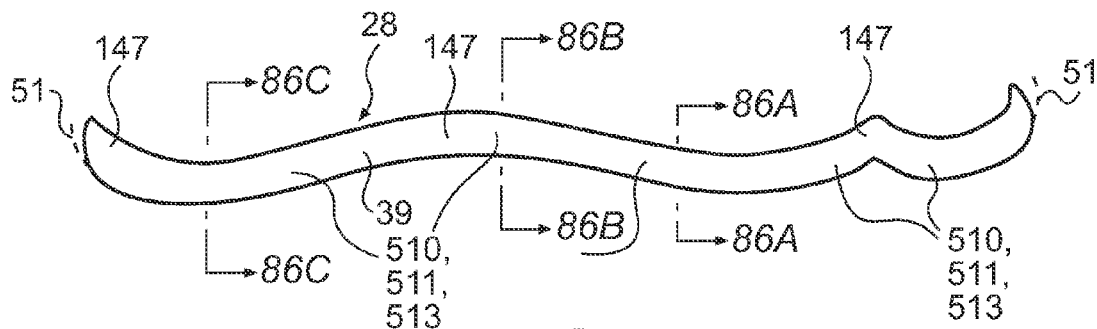
Figure 86D:
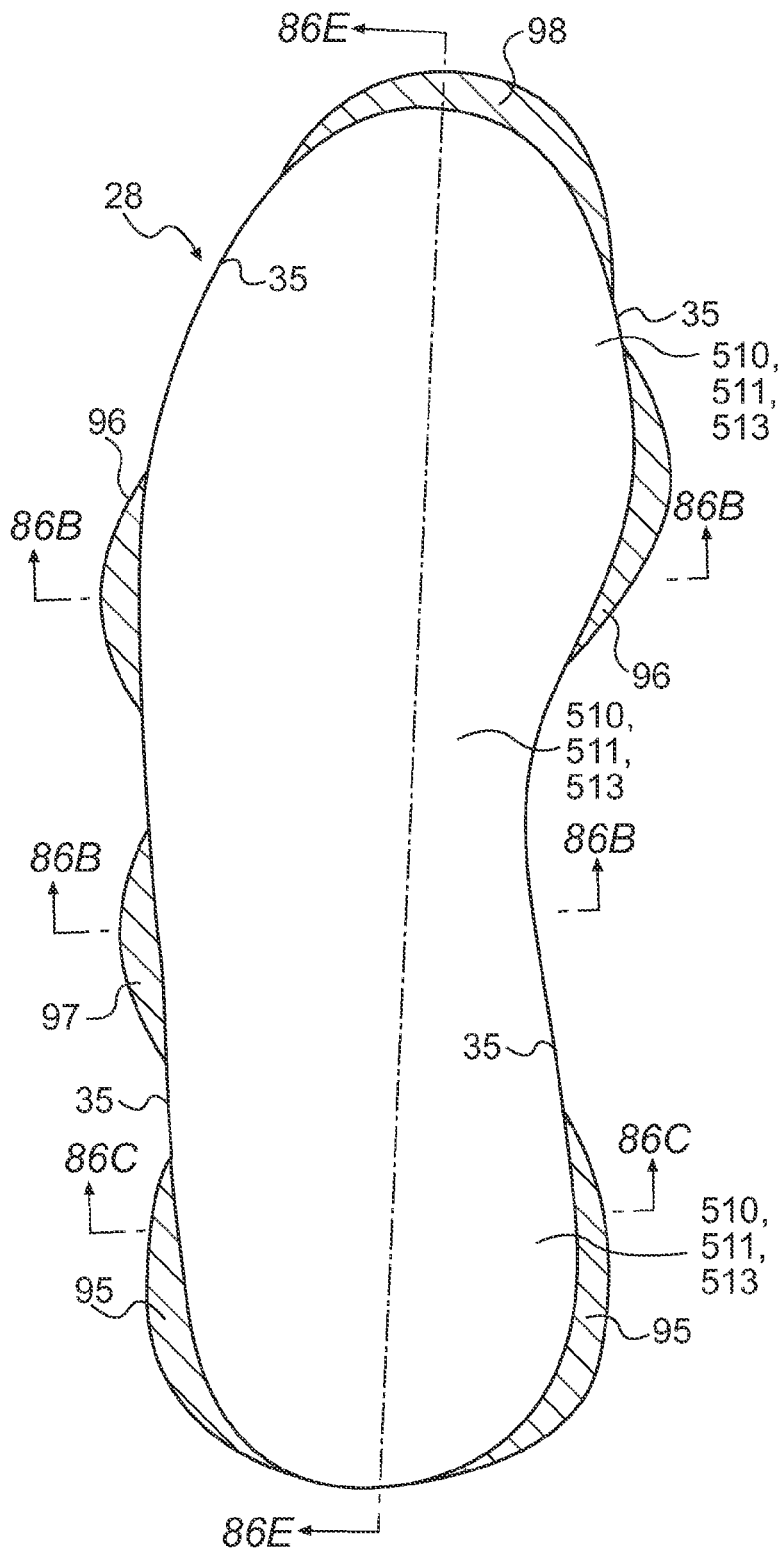

In addition, if not otherwise shown in this application, one or more features or components of the example embodiments of the applicant's new footwear inventions shown in the preceding new FIGS. 1-23 and 25-26 and associated textual specification can be usefully employed in novel combination, for example, with one or more features or components of the applicant's previous inventive shoe soles and orthotics as described in FIGS. 1-82 of U.S. application Ser. No. 11/282,665 published as Publication No. US 2006/0248749 A1 on Nov. 9, 2006, as well as PCT Application Number PCT/US2005/042341WIPO which was published on 1 Jun. 2006 as International Publication No. WO 2006/058013, which are each independently hereby explicitly incorporated by reference herein in its entirety for completeness of disclosure, including but not limited to those combinations that: incorporate uppers that envelope the midsole and/or outsole and/or other features shown in published application '665 prior FIGS. 5-7 and 13; incorporate anthropomorphic shapes and/or chambers and/or other features shown in prior FIGS. 9 and 10; incorporate integral or insertable orthotics or microprocessor-controlled variable pressure and/or other features shown in prior FIG. 11; incorporate sipes and/or other features shown in prior FIG. 12; use uniform thickness (measured in frontal plane cross-sections) in rounded sole side or sole bottom portions, especially at essential support and stability elements and/or other features shown in prior FIGS. 14-16, 29-46 and 76-77; use increased or decreased (or variable) thickness in rounded sole side portions and/or other features shown in prior FIGS. 17-20, 24, and 27-28; use increased or decreased density or firmness in rounded sole side or bottom portions and/or other features shown in prior FIGS. 21-23 and 25-26; use rounding of the outer surface of the midsole on a sole side and/or other features shown in prior FIG. 43A; employ bent-in rounded sides and/or other features shown in prior FIG. 47; uses bulges with or without uniform thickness, at important support or propulsion areas and/or features shown in prior FIGS. 48 and 75; incorporates a flat heel (meaning no heel lift) and/or other features shown in prior FIGS. 51A-51E; incorporates negative heel embodiments and/or other features shown in prior FIGS. 49A-49D and 50A-50E; use rounded sides with variable thickness and firmness and/or other features shown in prior FIG. 52; employs sipes and/or other features shown in prior FIGS. 53-57, 70-71 and 73A-73B; incorporates fiber and/or multiple layers of chambers and/or other features shown in prior FIGS. 58-60; employ shoe soles or orthotics with sufficient width throughout or at specific portions to support a wearer's bone structures throughout a full range of motion and/or other features shown in prior FIGS. 61-65 and 72; uses relatively planar sides with rounded underfoot sole portions and/or other features shown in prior FIGS. 66 and 67; uses similarly shaped rounding on sole sides of different thickness at different parts of the sole and/or other features shown in prior FIG. 69; uses a variation of heel or forefoot lifts and/or other features shown in FIG. 74; and/or other features shown in prior FIGS. 78-80, 81A-81D and 82A-82C.

The prior published FIGS. 1-75 in the preceding paragraph are the same FIGS. 1-75 of the applicant's two earlier applications, U.S. application Ser. No. 11/190,087 published as Publication No. US 2005/0268487 A1 on Dec. 8, 2005 describing footwear and U.S. application Ser. No. 11/108,034 published as Publication No. US 2005/0217142 A1 on Oct. 6, 2005 describing orthotics, as well as U.S. Pat. No. 7,010,869, issued Mar. 14, 2006 (of which the '034 application is a continuation). Both of those '087 and '034 applications and their U.S. publications and the '869 patent are hereby expressly incorporated by reference in its entirety for completeness of disclosure of the applicant's combination of one or more features or components of those prior published FIGS. 1-75 with one or more features or components of FIGS. 1-23 and 25-26 of the present application, as described in the preceding paragraph.

In addition, one or more features or components of FIGS. 1-23 and 25-26 of the present application can be usefully combined with one or more features or components of FIGS. 1-43 of the applicant's earlier application Ser. No. 11/179,887 published as Publication No. US 2005/0241183 A1 on Nov. 3, 2005 describing footwear. The '887 is hereby expressly incorporated by reference in its entirety for completeness of disclosure of such novel combinations of any part or parts of this application, including any one or more features or components of new FIGS. 1-23 and 25-26 described in this application, and any one or more features or components of prior FIGS. 1-43 from any part or parts of the '887 application (and/or additionally combined with any part or parts of the preceding '087 and/or '034 applications or the '665 application). More explicitly, any one or more features or components of new FIGS. 1-23 and 25-26 described in this application can be usefully combined with any one or more features or components of '887 FIGS. 5-7 with uppers that envelope the midsole and/or outsole and/or other features shown; '887 FIGS. 9-10, 12E, 12F, 13E, and 14A with anthropomorphic shapes and/or chambers and/or other features shown; '887 FIGS. 11, 12A-12D and 13A-D with footwear soles incorporating fibers and/or other features shown; '887 FIGS. 16A-D through 27 with footwear sole internal sipes and/or other features shown; '887 FIGS. 28-30 with sufficient width in the form of rounded sides to support neutrally the full range of a wearer's ankle and foot motion and/or other features shown; '887 FIGS. 31 and 32A-32M with footwear sole support, including for women's high heel pumps, at one or more of the applicant's essential stability elements and/or other features shown; '887 FIGS. 35-40 with footwear sole sipes in the form of slits and channels and/or other features shown; '887 FIGS. 41-42 with footwear soles having uniform frontal plane thickness (measured in a frontal plane cross-section) and natural flattening deformation under a wearer's body weight and/or others features shown; and '887 FIG. 43 with footwear soles having rounded sides with higher density midsole sides and/or other features shown.

Any combination that is not explicitly described above is implicit in the overall invention of this application and, consequently, any part of the inventions shown in the examples shown in preceding FIGS. 1-79 and/or textual specification can be combined with any other part of any one or more other inventions shown in FIGS. 1-79 and/or associated textual specifications and also can be combined with any one or more other inventive examples of published '665 application prior FIGS. 1-82 and/or textual specification of this application to make new and useful improvements over the existing art.

Published '665 application prior FIGS. 1-82 and associated textual specification are also the same—verbatim—as the applicant's PCT application No. PCT/US01/13096, published by WIPO as WO 01/80678 A2 on 1 Nov. 2001; for completeness of disclosure, WO 01/80678 A2 in its entirety is also herein incorporated by reference into this application, as is PCT/US01/23865, published by WIPO as WO 02/09547 A2 on Feb. 7, 2002, both of which are available to the public in English on the WIPO Web Site in their entirety. Also incorporated by reference herein is published PCT Application No. PCT/US2005/042341, which is the same in its entirety as the '665 application.

The '547 WIPO publication, titled "Shoe Sole Orthotic Structures and Computer Controlled Compartments", is also incorporated herein by reference to provide additional information on the applicant's prior orthotic inventions, which can usefully be combined with the orthotic inventions described and claimed in this application. However, the applicant's insertable midsole orthotic 145 in the '547 Publication (and the above referenced '034 application on orthotics) is very similar to the applicant's removable midsole insert 145 as described in this application and can generally be understood to be the same in structure and materials, although with a principal difference. Typically, an orthotic 145 is designed specifically for an individual wearer, unlike almost all footwear, which is mass-produced using lasts based on average foot shapes for specific populations; the only exception is custom footwear, which is relatively rare and simply cobbled more directly to the individual shape of the wearer's feet. The principal difference is that typically orthotics 145 are designed to be prescribed, for example, by a qualified expert like a health care professional such as a doctor or podiatrist in order to treat a wearer's diagnosed footwear-related problem; generally, orthotics 145 are for prescriptive, therapeutic, corrective, or prosthetic uses.

The applicant's other footwear U.S. Pat. Nos. 4,989,349; 5,317,819; 5,544,429; 5,909,948; 6,115,941; 6,115,945; 6,163,982; 6,308,439; 6,314,662; 6,295,744; 6,360,453; 6,487,795; 6,584,706; 6,591,519; 6,609,312; 6,629,376; 6,662,470; 6,675,498; 6,675,499; 6,708,424; 6,729,046; 6,748,674; 6,763,616; 6,789,331; 6,810,606; 6,877,254; 6,918,197; 7,010,869; 7,082,697; 7,093,379; 7,127,834; 7,168,185; and 7,174,658 are hereby incorporated by reference herein in their entirety into this application for completeness of disclosure of the applicant's novel and useful combination of one or more of any of the features or components of any of the figures of this application with one or more of any of the features of any one or more of the preceding applicant's patents listed above in this paragraph.

The applicant's other footwear U.S. applications with Publication Numbers US 20020000051; 20020007571; 20020007572; 20020014020; 20020014021; 20020023373; 20020073578; 20020116841; 20030046830; 20030070320; 20030079375; 20030131497; 20030208926; 20030217482; 20040134096; 20040250447; 20050016020; 20050086837; 20050217143; and 20060032086 are hereby incorporated by reference herein in their entirety into this application for completeness of disclosure of the applicant's novel and useful combination of one or more of any of the features or components of any of the figures of this application with one or more of any of the features of any one or more of the preceding applicant's published U.S. applications listed above in this paragraph.

The applicant's non-footwear patents on global network computers, U.S. Pat. Nos. 6,167,428; 6,732,141; 6,725,250; 7,024,449; 7,035,906, and 7,047,275 are hereby incorporated by reference herein in their entirety into this application for completeness of disclosure of the applicant's novel and useful combination of one or more of any of the features or components of any of the figures of this application with one or more of any of the features of any one or more of the preceding applicant's patents listed above in this paragraph.

The applicant's non-footwear applications on global network computers, U.S. application Ser. Nos. 09/085,755; 09/884,041; 09/935,779; 10/663,911; 11/196,527; 11/329,423; and 11/338,887, as well as U.S. application Ser. Nos. 10/802,049 and 10/684,657 with U.S. Publication Numbers US 2004/0215931 published Oct. 28, 2004 and US 2005/0180095 published Aug. 18, 2005, respectively, are hereby incorporated by reference herein in their entirety into this application for completeness of disclosure of the applicant's novel and useful combination of one or more of any of the features or components of any of the figures of this application with one or more of any of the features of any one or more of the preceding applicant's applications, including published applications, listed above in this paragraph.

To avoid confusion, any numeral in the above listed non-footwear patents or applications relating to computers that is the same as a numeral in the above listed footwear patents or applications should have (or be presumed to have) a prefix numeral of "1" added to the numeral (the equivalent of adding "1000" to the numeral, so that all the numerals of both sets of applications and patents remain unique).

In the following claims, the term "chamber" means a compartment 161 or a chamber 188 or a bladder and the term "sipe" means a sipe 505 or a slit or a channel or a groove as described in the textual specification above and associated figures of this application.

The foregoing shoe designs meet the objectives of this invention as stated above. However, it will clearly be understood by those skilled in the art that the foregoing description has been made in terms of the preferred embodiments and various changes and modifications may be made without departing from the scope of the present invention which is to be defined by the appended claims.

What is claimed is:

1. A shoe or other footwear comprising:
   a shoe upper and a shoe sole including at least a bottom sole portion;
   at least a portion of said shoe sole being formed by a sole section having an inner surface and an outer surface and wherein the sole section is separate from the bottom sole portion;
   at least a portion of the sides of said shoe upper being attached directly to the bottom sole portion such that the shoe upper envelopes, on the outside, at least the sole section of said shoe sole, such that the sole section of said shoe sole is located within a structure formed by a combination of said bottom sole portion and a portion of said shoe upper that is attached to said bottom sole portion, as viewed in a frontal plane cross-section when the shoe sole is upright and in an unloaded condition;
   the inner surface of the sole section including at least one convexly rounded portion, said convexity being determined relative to a portion of the sole section directly adjacent to the inner surface of the sole section, as viewed in a frontal plane cross-section when the sole section is upright and in an unloaded condition;

the outer surface of the sole section including at least one concavely rounded portion, said concavity being determined relative to a portion of the sole section directly adjacent to the outer surface of the sole section, as viewed in a frontal plane cross-section when the sole section is upright and in an unloaded condition;

each said concavely rounded portion of the outer surface of the sole section being located on the sole section at a location corresponding to the location of at least one convexly rounded portion of the inner surface of the sole section so as to define a rounded portion of the sole section located between said convexly rounded portion of the inner surface of the sole section and said concavely rounded portion of the outer surface of the sole section, as viewed in a frontal plane cross-section when the sole section is upright and in an unloaded condition;

the sole section including at least two inner bladders, each inner bladder containing at least one fluid, and wherein at least a part of each of said at least two inner bladders is located in a single frontal plane cross-section of the shoe sole when the shoe sole is upright and in an unloaded condition;

at least one duct and/or valve providing fluid communication between said at least two inner bladders;

at least one electronic control system including a microprocessor that controls the fluid communication;

the sole section further comprising at least one outer bladder, said inner bladders being located inside said outer bladder; and said bladder and said inner bladders being separated at least in part by an internal sipe; and wherein said internal sipe is formed by at least a portion of an inner surface of said bladder and at least a portion of an outer surface of each of said inner bladders; and the inner and outer surface portions forming the sipe oppose each other and therefore can move relative to each other in a sliding motion.

2. The shoe or other footwear as claimed in claim 1, wherein at least a rounded part of each said rounded portion of the sole section between parallel rounded portions of the outer and inner surfaces of the sole section has a uniform thickness, as viewed in a frontal plane cross-section when the sole section is upright and in an unloaded condition, and said rounded part of the sole section having uniform thickness extends from at least a centerline of the sole section to proximate at least one sidemost extent of the sole section, as viewed in a frontal plane cross-section when the sole section is upright and in an unloaded condition.

3. The shoe or other footwear as claimed in claim 1, wherein at least a rounded part of each said rounded portion of the sole section between parallel rounded portions of the outer and inner surfaces of the sole section has a uniform thickness, as viewed in a frontal plane cross-section when the sole section is upright and in an unloaded condition, and said rounded part of the sole section having uniform thickness extends to proximate both sidemost extents of the of the sole section, as viewed in a frontal plane cross-section when the sole section is upright and in an unloaded condition.

4. The shoe or other footwear as claimed in claim 1, wherein at least a rounded part of each said rounded portion of the sole section between parallel rounded portions of the outer and inner surfaces of the sole section has a uniform thickness, as viewed in a frontal plane cross-section when the sole section is upright and in an unloaded condition, and the sole section includes at least two rounded parts having a uniform thickness, and wherein one said rounded part of the sole section which has a uniform thickness is located on a side of the sole section and extends at least proximate to a sidemost extent of the side of the sole section, as viewed in a first frontal plane cross-section when the sole section is upright and in an unloaded condition, and a second said rounded part of the sole section which has a different uniform thickness is located on a side of the sole section and extends at least proximate to a sidemost extent of the side of the sole section, as viewed in a second, different frontal plane cross-section when the sole section is upright and in an unloaded condition.

5. The shoe or other footwear as claimed in claim 1, wherein said at least two bladders contain at least one liquid, gas or gel.

6. The shoe or other footwear as claimed in claim 1, wherein the sole section comprises:

at least three inner bladders, and wherein at least a part of each of said at least three inner bladders is located in a single frontal plane cross-section of the sole section when the sole section is upright and in an unloaded condition; and said shoe sole comprises two or more ducts providing fluid communication between said at least three inner bladders.

7. The shoe or other footwear as claimed in claim 1, wherein at least a portion of the surface portions forming said internal sipe are in contact with each other in an unloaded condition.

8. The shoe or other footwear as claimed in claim 7, wherein the at least one internal sipe partially or completely encapsulates a portion of the sole section, as viewed in a frontal plane cross-section when the sole section is upright and in an unloaded condition.

9. The shoe or other footwear as claimed in claim 1, wherein at least a rounded part of each said rounded portion of the sole section between parallel rounded portions of the outer and inner surfaces of the sole section has a uniform thickness, as viewed in a frontal plane cross-section when the sole section is upright and in an unloaded condition, and said rounded part of the sole section which has a uniform thickness extends from a lowest point of the sole section to at least proximate a sidemost extent of the side of the sole section, as viewed in a frontal plane cross-section when the sole section is upright and in an unloaded condition.

10. The shoe or other footwear as claimed in claim 1, further comprising a midsole including an elastomeric foam layer of midsole material located outside of and separate from said at least one outer bladder, as viewed in a frontal plane cross-section.

11. The sole section as claimed in claim 10, wherein the sole section further comprises an elastomeric foam layer of midsole material located outside of and separate from said at least one outer bladder, as viewed in a frontal-plane cross section.

12. The sole section as claimed in claim 10, wherein the sole section is adapted to be an orthotic and/or removable from the shoe or other footwear.

13. The shoe or other footwear as claimed in claim 1, wherein the sole section is adapted to be an orthotic an/or removable from the shoe or other footwear.

14. The shoe or other footwear as claimed in claim 1, wherein the shoe sole further includes at least an elastomeric foam layer of midsole and/or insole that is located between said at least one outer bladder and a foot sole of a wearer, as viewed in a frontal plane cross-section.

15. A sole section of a sole of a shoe or other footwear, comprising:
    at least two inner bladders, each said inner bladder containing at least one fluid, and wherein at least a part of each of said at least two inner bladders is located in a single frontal plane cross-section of the sole when the sole is upright and in an unloaded condition;
    at least one duct and/or valve providing fluid communication between said at least two inner bladders;
    at least one electronic control system including a microprocessor that controls the fluid communication;
    at least one outer bladder, outside said inner bladders being located inside said outer bladder;
        said outer bladder and said inner bladders being separated at least in part by an internal sipe; and
    wherein said internal sipe is formed by at least a portion of an inner surface of said outer bladder and at least a portion of an outer surface of each of said inner bladders; and the inner and outer surface portions forming the sipe oppose each other and therefore can move relative to each other in a sliding motion; and
    said sole section being adapted for use in a shoe sole including at least a bottom sole portion.

16. The sole section as claimed in claim 15, comprising:
    at least three inner bladders, and wherein at least a part of each of said at least three inner bladders is located in a single frontal plane cross-section of the sole when the sole is upright and in an unloaded condition; and
    two or more ducts and/or valves providing fluid communication between said at least three inner bladders.

17. The sole section as claimed in claim 15, wherein at least a portion of said surface portions that form said at least one internal sipe are in contact with each other in an unloaded condition.

18. The sole section as claimed in claim 17, wherein the at least one internal sipe partially or completely encapsulates a portion of the sole, as viewed in a frontal plane cross-section when the sole is upright and in an unloaded condition.

19. The sole section as claimed in claim 15, wherein the sole section further includes at least an elastomeric foam layer of midsole and/or insole, the sole layer being located between said at least one outer bladder and a foot sole of a wearer of the shoe or other footwear, as viewed in a frontal plane cross-section.

20. The sole section as claimed in claim 15, further comprising a secondary outersole and the bladders are separate from the secondary outer sole of the sole section.

21. A shoe or other footwear comprising:
    a shoe upper having sides, and
    a shoe sole including a bottom sole portion, and
    a sole section that is separate from the bottom sole portion;
    at least a portion of the sides of said shoe upper being attached directly to the bottom sole portion, such that upper envelopes, on the outside, at least the sole section of said shoe sole, such that the sole section of said shoe sole is located within a structure formed by a combination of said bottom sole portion and a portion of said upper that is attached to said bottom sole portion, as viewed in a frontal plane cross-section when the shoe sole is upright and in an unloaded condition;
    at least two inner bladders, each inner bladder containing at least one fluid, and wherein at least a part of each of said at least two inner bladders is located in a single frontal plane cross-section of the sole when the shoe sole is upright and in an unloaded condition;
    one or more ducts and/or valves providing fluid communication between said at least two inner bladders;
    at least one electronic control system including a microprocessor that controls the fluid communication; and
    the sole section further including at least one outer bladder, said inner bladders being located inside said outer bladder; and
        said outer bladder and said inner bladders being separated at least in part by an internal sipe; and
    wherein said internal sipe is formed by at least a portion of an inner surface of said outer bladder and at least a portion of an outer surface of each of said inner bladders; and the inner and outer surface portions forming the sipe oppose each other and therefore can move relative to each other in a sliding motion.

22. The shoe or other footwear as claimed in claim 21, wherein the at least two inner bladders, the ducts and/or valves and said at least one electronic control system are located in the sole section.

23. A shoe or other footwear as claimed in claim 21, wherein at least a portion of said internal sipe surfaces are in contact with each other in an unloaded condition, and wherein the at least one internal sipe partially or completely encapsulates a portion of the shoe sole, as viewed in a frontal plane cross-section when the shoe sole is upright and in an unloaded condition.

24. The shoe or other footwear as claimed in claim 21, wherein the sole further comprises an elastomeric foam layer of midsole located outside of and separate from said at least one outer bladder.

25. The shoe or other footwear as claimed in claim 21, wherein the sole section is adapted to be an orthotic removable from the shoe or other footwear.

26. The shoe or other footwear or orthotic as claimed in claim 21, wherein the sole further includes at least an elastomeric foam layer of midsole and/or insole located between said at least one outer bladder and a foot sole of a wearer of the shoe, as viewed in a frontal plane cross-section.

* * * * *